US008675867B2

(12) United States Patent
Sakumoto et al.

(10) Patent No.: US 8,675,867 B2
(45) Date of Patent: Mar. 18, 2014

(54) KEY GENERATION ALGORITHM USING SECRET POLYNOMIAL OVER FINITE RING AND TRANSFORMATION

(75) Inventors: Koichi Sakumoto, Tokyo (JP); Taizo Shirai, Kanagawa (JP); Harunaga Hiwatari, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/510,843

(22) PCT Filed: Sep. 21, 2010

(86) PCT No.: PCT/JP2010/066312
§ 371 (c)(1),
(2), (4) Date: May 18, 2012

(87) PCT Pub. No.: WO2011/061994
PCT Pub. Date: May 26, 2011

(65) Prior Publication Data
US 2012/0233704 A1 Sep. 13, 2012

(30) Foreign Application Priority Data

Nov. 19, 2009 (JP) ................................ P2009-264242

(51) Int. Cl.
*H04L 9/28* (2006.01)
*H04L 9/26* (2006.01)
(52) U.S. Cl.
USPC ............................................ 380/28; 713/180
(58) Field of Classification Search
None
See application file for complete search history.

(56) References Cited

U.S. PATENT DOCUMENTS 5,790,675 A * 8/1998 Patarin .......................... 713/180

FOREIGN PATENT DOCUMENTS

JP    09-46333       2/1997
JP    2005-253107    9/2005

OTHER PUBLICATIONS

Multi-recipient Public-Key Encryption from Simulators in Security Proofs. Hiwatari et al.LNCS 2009.*

(Continued)

*Primary Examiner* — Venkat Perungavoor
(74) *Attorney, Agent, or Firm* — Finnegan, Henderson, Farabow, Garrett & Dunner, LLP

(57) ABSTRACT

Provided is an information processing apparatus for realizing an electronic signature system of the MPKC signature method capable of safety certification with respect to chosen-message attack. An information processing apparatus including a first inverse transformation unit that transforms an element y of a finite ring $K^n$ containing elements constituted of n numbers into an element y' of the finite ring $K^n$ by an inverse transformation $T^{-1}$ of a first secret polynomial T, an element computation unit that considers the element y' of the finite ring $K^n$ obtained here as an element Y of an n-order extension A of a finite ring K and computes an element $X \in \{Z | f(Z) = Y\}$ of an inverse image of mapping f: A→A represented by a predetermined multivariable polynomial by using the element Y, an element selection unit that selects one element X of the inverse image with a probability p proportional to a number of elements α of the inverse image and outputs an exception value with a probability (1-p), and a second inverse transformation unit that considers the element X selected here as an element x' of the finite ring $K^n$ and transforms the element x' of the finite ring $K^n$ into an element x of the finite ring $K^n$ by an inverse transformation $S^{-1}$ of a second secret polynomial S is provided.

18 Claims, 31 Drawing Sheets

(56) References Cited

OTHER PUBLICATIONS

The 128-Bit Blockcipher CLEFIA(Extended Abstract). Shirai et al. LNCS 2007.*
Handbook of Applied Cryptography. Menezes et al. CRC Press. 1997.*
Jacques Patarin; "Asymmetric Cryptography with a Hidden Monomial", Springer-Verlag, pp. 45-60, (1998).
Jacques Patarin; "Quartz, 128-Bit Long Digital Signatures", D. Naccache (Ed.): CT-RSA 2001, LNCS 2020, pp. 282-297, (2001).
International Search Report from the European Patent Office for International Application No. PCT/JP2010/066312, mailing date Jan. 11, 2011.
Coron, J., "Optimal Security Proofs for PSS and Other Signature Schemes", Gemplus Card International, Aug. 6, 2011.

* cited by examiner

PROPERTIES OF ONE-WAY FUNCTION $F_t$ WITH TRAPDOOR

(A) COMPUTATIONAL ALGORITHM ON FORWARD DIRECTION OF $F_t$
(CAN BE EXECUTED BY ANYONE)

$X \qquad Y = F_t(X)$ (B) COMPUTATIONAL ALGORITHM ON BACKWARD DIRECTION OF $F_t$
(DIFFICULT TO EXECUTE WITHOUT KNOWING TRAPDOOR)

BIJECTION OF RSA FUNCTION $F_t$

PROPERTIES OF HFE FUNCTION $F_t$ $F_t : K^n \rightarrow K^n , y = F_t(x)$

PROBABILITY OF RANDOMLY SELECTING ELEMENT OF CODOMAIN NUMBER OF WHOSE INVERSE IMAGES IS $\lambda \approx 1/(\lambda e)$

NON-UNIFORM DISTRIBUTIVE PROPERTY OF HFE FUNCTION

PROPERTIES OF FIRST EXTENDED HFE FUNCTION
(EXTENSION A)

PROPERTIES OF Oil-Vinegar FUNCTION $F_t$

Oil VARIABLE $ox=(ox_1,...,ox_o)$, Vinegar VARIABLE $vx=(vx_1,...,vx_v)$,
IF Vinegar VARIABLE IS DECIDED, THE FUNCTION BECOMES
LINEAR FUNCTION CONCERNING Oil VARIABLE.

SPACE OF $ox \in K^o$    $F_t(vx,\cdot)$    RANGE
SPACE OF $y \in K^m$
CODOMAIN

MAGNITUDE OF RANGE OF $F_t(Vx,\cdot)$
DEPENDS ON Vinegar VARIABLE vx

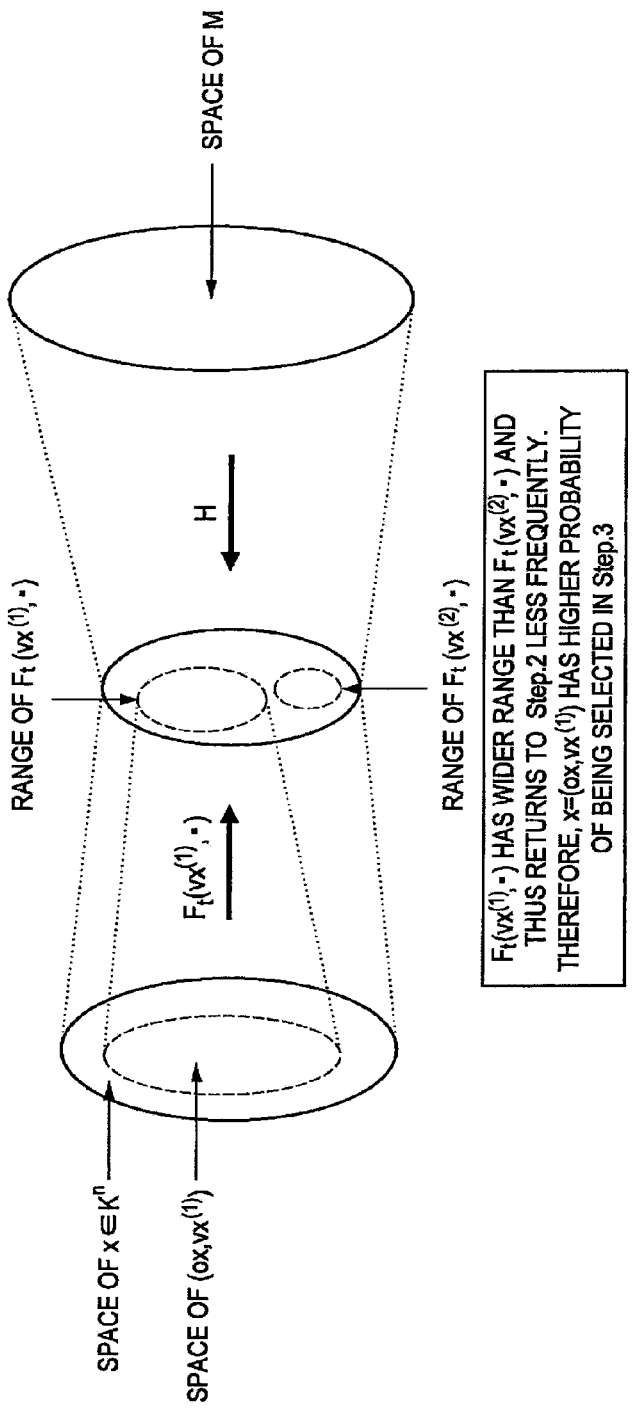

FIG.11

FIRST EXTENDED OV SIGNATURE METHOD
(EXTENSION B)

<OV+FDH SIGNATURE METHOD>
Step.1: y←H(M)
Step.2: SELECT Vinegar VARIABLE vx ◄─────────────────┐
Step.3: SELECT ONE ox ∈ {z| $F_t$(vx,z)=y} AND IF ox ∉ $F_t$ (vx,·), PROCEED TO Step.2 ($F_t$:OV
       FUNCTION)
Step 4: OUTPUT ELECTRONIC SIGNATURE σ=x=(ox,vx)

<EXTENDED OV+FDH SIGNATURE METHOD>
Step.1: SELECT Vinegar VARIABLE vx
Step.2: SELECT RANDOM NUMBER r ◄─────────────────┐
Step.3: y←H(M,r)
Step.4: SELECT ONE ox ∈ {z| $F_t$(vx,z)=y} AND IF ox ∉ $F_t$(vx,·), PROCEED TO Step.2 ($F_t$:OV
       FUNCTION)
Step 4: OUTPUT ELECTRONIC SIGNATURE σ=x=(ox,vx,r)

PROPERTIES OF HFE+OV=HFEv FUNCTION $F_t$ $F_t : K^n \to K^m$, $y = F_t(x)$

PROBABILITY OF RANDOMLY SELECTING ELEMENT OF CODOMAIN NUMBER OF WHOSE INVERSE IMAGES IS $\lambda \approx 1/(N_!e)$

SYSTEM CONFIGURATION

KEY GENERATION ALGORITHM USING SECRET POLYNOMIAL OVER FINITE RING AND TRANSFORMATION

CROSS-REFERENCE TO RELATED APPLICATIONS

This application is a national phase application of PCT/JP2010/066312, filed on Sep. 21, 2010, and claims priority to Japanese Application 2009-264242, filed on Nov. 19, 2009. The disclosures of the above-referenced applications are expressly incorporated by reference herein by reference to their entireties.

TECHNICAL FIELD

The present invention relates to an information processing apparatus, a key generation apparatus, a signature verification apparatus, an information processing method, a signature generation method, and a program.

BACKGROUND ART

With rapid development of information processing technology and communication technology, documents, regardless of official documents or private documents, are being converted into electronic form rapidly. Accordingly, many individuals and enterprises show great interest in safety control of electronic documents. With such growing interest, safety from tampering acts such as wiretapping and forgeries of electronic documents is increasingly discussed more actively in various quarters. Safety from wiretapping of electronic documents can be secured by, for example, encrypting electronic documents. Safety from forgeries of electronic documents can be secured by, for example, using an electronic signature. However, it is necessary for encryption and electronic signatures to have sufficient resistance to tampering.

An electronic signature is used to identify the author of an electronic document. Thus, the electronic signature should be made creatable only by the author. If a malicious third party should be able to create the same electronic signature, the third party can pretend to be the author of the electronic document. That is, an electronic document is forged by a malicious third party. To prevent such a forgery, safety of an electronic signature has been discussed in various ways. Electronic signature methods currently used widely include, for example, a method of using the RSA signature method or the DSA signature method.

The RSA signature method grounds safety thereof on "difficulty of factorization into prime components of a large composite number (hereinafter, referred to as a problem of factorization into prime components)". The DSA signature method grounds safety thereof on "difficulty of a solution of a discrete logarithm problem". These grounds are ascribable to the fact that an algorithm that efficiently solves a problem of factorization into prime components or a discrete logarithm problem by using a classic computer does not exist. That is, the above difficulty means computational difficulty for a classic computer. The classical computer here means a computer that is not a so-called quantum computer. A quantum computer is said to be able to efficiently compute a solution of a problem of factorization into prime components or a discrete logarithm problem.

Thus, attention is being focused on an algorithm or protocol having a different ground for safety from the ground of the RSA signature method or the DSA signature method. One leading candidate thereof is the multivative public key cryptography (MPKC) signature method that grounds safety on "difficulty of a solution to a multivariable polynomial (hereinafter, referred to as a multivariable polynomial problem)". No algorithm that efficiently solves a multivariable polynomial problem by a quantum computer is said to exist. When compared with the RSA signature method or the DSA signature method, the amount of information to be held for the MPKC signature method to secure the same level of safety is smaller. Thus, the MPKC signature method is also appropriate for the use of a device with less operation capabilities or memory capacity.

As the MPKC signature method, for example, methods based on MI (Matsumoto-Imai cryptography), HFE (Hidden Field Equation cryptography; see, for example, Non-Patent Literature 1), OV (Oil-Vinegar signature scheme), and TTM (Tamed Transformation Method cryptography) are widely known. As derivative forms of the HFE signature method, a combination of the HFE signature method and the OV signature method (hereinafter, referred to as an HFEv signature method) and a combination of the HFE signature method and a PFDH (Probabilistic Full Domain Hash) signature method (hereinafter, referred to as an HFE+PFDH method; see, for example, Non-Patent Literature 2) are known.

CITATION LIST

Non-Patent Literature

Non-Patent Literature 1: Jacques Patarin Asymmetric Cryptography with a Hidden Monomial. CRYPTO 1996, pp. 45-60.

Non-Patent Literature 2: Patarin, J., Courtois, N., and Goubin, L. QUARTZ, 128-Bit Long Digital Signatures. In Naccache, D., Ed. Topics in Cryptology-CT-RSA 2001 (San Francisco, Calif., USA, April 2001), vol. 2020 of Lecture Notes in Computer Science, Springer-Verlag., pp. 282-297.

SUMMARY OF INVENTION

Technical Problem

As described above, the MPKC signature method such as the HFE signature method and the OV signature method has superior characteristics such as being resistant to tampering acts using a quantum computer and having, compared with the RSA signature method, less operation loads and memory usage. However, a one-way function f with trapdoor used in the MPKC signature method such as the HFE signature method and the OV signature method is not bijective. Thus, the MPKC signature method does not secure safety from chosen-message attacks (CMA). The chosen-message attack is an act attempting to forge an electronic signature in circumstances in which an attacker can freely acquire, in addition to public information such as a verification key, an electronic signature to any electronic document.

The present invention is made in view of the above problem and it is desirable to provide a novel and improved information processing apparatus capable of realizing bijection or properties close to bijection of mapping corresponding to a one-way function with trapdoor used in the MPKC signature method, a key generation apparatus, a signature verification apparatus, an information processing method, a signature generation method, and a program.

Solution to Problem

According to the first aspect of the present invention in order to achieve the above-mentioned object, there is provided an information processing apparatus, including: a first inverse transformation unit that transforms an element y of a finite ring $K^n$ containing elements constituted of n numbers into an element y' of the finite ring $K^n$ by an inverse transformation $T^{-1}$ of a first secret polynomial T; an element computation unit that considers the element y' of the finite ring $K^n$ obtained by the first inverse transformation unit as an element Y of an n-order extension A of a finite ring K and computes an element $X \in \{Z \in A | f(Z)=Y\}$ of an inverse image of mapping f(f: A→A) represented by a predetermined multivariable polynomial by using the element Y; an element selection unit that selects one element X of the inverse image computed by the element computation unit with a probability p proportional to a number of elements α of the inverse image and outputs an exception value with the probability (1-p); and a second inverse transformation unit that considers the element X selected by the element selection unit as an element x' of the finite ring $K^n$ and transforms the element x' of the finite ring $K^n$ into an element x of the finite ring $K^n$ by an inverse transformation $S^{-1}$ of a second secret polynomial S.

According to the second aspect of the present invention in order to achieve the above-mentioned object, there is provided an information processing apparatus, including: a partial element selection unit that selects an element vx of a finite ring $K^v$ containing elements constituted of v numbers; a first inverse transformation unit that transforms an element y of a finite ring $K^m$ containing elements constituted of m elements into an element y' of the finite ring $K^m$ by an inverse transformation $T^{-1}$ of a first secret polynomial T; an element computation unit that considers the element y' of the finite ring $K^m$ obtained by the first inverse transformation unit as an element Y of an m-order extension A of a finite ring K and computes an element $X \in \{Z \in B | f(Z, vx)=Y\}$ of an inverse image of mapping f(f: A×$K^v$→B, B is an o-order extension of the finite ring K) represented by a predetermined multivariable polynomial by using the element Y and the element vx selected by the partial element selection unit; an element selection unit that selects one element X of the inverse image computed by the element computation unit with a probability p proportional to a number of elements α of the inverse image and outputs an exception value with the probability (1-p); and a second inverse transformation unit that considers the element X selected by the element selection unit as an element ox of a finite ring $K^o$ and transforms an element x'=(ox,vx) of the finite ring $K^n$(n=o+v) into an element x of the finite ring $K^n$ by an inverse transformation $S^{-1}$ of a second secret polynomial S.

The information processing apparatus may further include: a number generation unit that generates a number r; a data generation unit that generates the element y of the finite ring $K^n$ by using the number r generated by the number generation unit and electronic data M; and a signature generation unit that inputs the element y of the finite ring $K^n$ generated by the data generation unit into the first inverse transformation unit to generate an electronic signature σ containing the element x of the finite ring $K^n$ obtained by processing of the first inverse transformation unit, the element computation unit, the element selection unit, and the second inverse transformation unit. In this case, if an exception value is output by the element selection unit, the signature generation unit causes the number generation unit to generate the different number r and inputs the element y of the finite ring $K^n$ generated by the data generation unit based on the different number r into the first inverse transformation unit to generate the electronic signature σ containing the element x of the finite ring $K^n$ obtained by the processing of the first inverse transformation unit, the element computation unit, the element selection unit, and the second inverse transformation unit.

According to the third aspect of the present invention in order to achieve the above-mentioned object, there is provided a key generation apparatus, including: a secret key generation unit that generates a secret key used by a computational algorithm having a first inverse transformation unit that transforms an element y of a finite ring $K^n$ containing elements constituted of n numbers into an element y' of the finite ring $K^n$ by an inverse transformation $T^{-1}$ of a first secret polynomial T, an element computation unit that considers the element y' of the finite ring $K^n$ obtained by the first inverse transformation unit as an element Y of an n-order extension A of a finite ring K and computes an element $X \in \{Z \in A | f(Z)=Y\}$ of an inverse image of mapping f(f: A→A) represented by a predetermined multivariable polynomial by using the element Y, an element selection unit that selects one element X of the inverse image computed by the element computation unit with a probability p proportional to a number of elements α of the inverse image and outputs an exception value with the probability (1-p), and a second inverse transformation unit that considers the element X selected by the element selection unit as an element x' of the finite ring $K^n$ and transforms the element x' of the finite ring $K^n$ into an element x of the finite ring $K^n$ by an inverse transformation $S^{-1}$ of a second secret polynomial S and containing information about the first secret polynomial T, the second secret polynomial S, and the predetermined multivariable polynomial; and a public key generation unit that generates a public key containing information about composite mapping F constituted of the first secret polynomial T, the mapping f, and the second secret polynomial S.

According to the fourth aspect of the present invention in order to achieve the above-mentioned object, there is provided a key generation apparatus, including: a partial element selection unit that selects an element vx of a finite ring $K^v$ containing elements constituted of v numbers; a secret key generation unit that generates a secret key used by a computational algorithm having a first inverse transformation unit that transforms an element y of a finite ring $K^m$ containing elements constituted of m elements into an element y' of the finite ring $K^m$ by an inverse transformation $T^{-1}$ of a first secret polynomial T; an element computation unit that considers the element y' of the finite ring $K^m$ obtained by the first inverse transformation unit as an element Y of an m-order extension A of a finite ring K and computes an element $X \in \{Z \in B | f(Z, vx)=Y\}$ of an inverse image of mapping f(f: A×$K^v$→B, B is an o-order extension of the finite ring K) represented by a predetermined multivariable polynomial by using the element Y and the element vx selected by the partial element selection unit; an element selection unit that selects one element X of the inverse image computed by the element computation unit with a probability p proportional to a number of elements α of the inverse image and outputs an exception value with the probability (1-p); and a second inverse transformation unit that considers the element X selected by the element selection unit as an element ox of a finite ring $K^o$ and transforms an element x'=(ox,vx) of the finite ring $K^n$(n=o+v) into an element x of the finite ring $K^n$ by an inverse transformation $S^{-1}$ of a second secret polynomial S and containing information about the first secret polynomial T, the second secret polynomial S, and the predetermined multivariable polynomial; and a public key generation unit that generates a public key containing information about composite mapping F constituted of the first secret polynomial T, the mapping f, and the second secret polynomial S.

According to the fifth aspect of the present invention in order to achieve the above-mentioned object, there is provided an information processing apparatus, including: a partial element selection unit that selects an element vx of a finite ring $K^v$ containing elements constituted of v numbers; a number generation unit that generates a number r; a data generation unit that generates an element y of a finite ring $K^m$ containing elements constituted of m numbers by using the number r generated by the number generation unit and electronic data M; a first inverse transformation unit that transforms the element y of the finite ring $K^m$ generated by the data generation unit into an element y' of the finite ring $K^m$ by an inverse transformation $T^{-1}$ of a first secret polynomial T; an element computation unit that computes an element ox∈{Z∈$K^o$|f(Z,vx)=y'} of mapping f (f: $K^n$→$K^o$, n=o+v) represented by a predetermined multivariable polynomial by using the element y' of the finite ring $K^m$ obtained by the first inverse transformation unit and the element vx selected by the partial element selection unit; an element selection unit that selects the element ox of the inverse image computed by the element computation unit if the element of the inverse image exists and causes the number generation unit to generate the different number r and selects the element ox of the inverse image computed by processing of the data generation unit, the first inverse transformation unit, and the element computation unit by using the different number r if the element of the inverse image does not exist; a second inverse transformation unit that transforms an element x'=(ox,vx) of the finite ring $K^n$(n=o+v) containing the element ox selected by the element selection unit into an element x of the finite ring $K^n$ by an inverse transformation $S^{-1}$ of a second secret polynomial S; and a signature generation unit that generates an electronic signature σ containing the element x of the finite ring $K^n$ obtained by the second inverse transformation unit.

According to the sixth aspect of the present invention in order to achieve the above-mentioned object, there is provided an information processing apparatus, including: a data generation unit that generates an element y of a finite ring $K^m$ containing elements constituted of m numbers by using electronic data M; a partial element selection unit that selects an element vx of a finite ring $K^v$ containing elements constituted of v numbers; a first inverse transformation unit that transforms the element y of the finite ring $K^m$ generated by the data generation unit into an element y' of the finite ring $K^m$ by an inverse transformation $T^{-1}$ of a first secret polynomial T; an element computation unit that computes an element ox∈{Z∈$K^o$|f(Z,vx)=y'} of mapping f(f: $K^n$→$K^o$, n=o+v) represented by a predetermined multivariable polynomial by using the element y' of the finite ring $K^m$ obtained by the first inverse transformation unit and the element vx selected by the partial element selection unit; an element selection unit that selects the element ox of the inverse image computed by the element computation unit if the element of the inverse image exists and causes the partial element selection unit to select the different number vx and selects the element ox of the inverse image computed by processing of the first inverse transformation unit and the element computation unit by using the different number vx if the element of the inverse image does not exist; a second inverse transformation unit that transforms an element x'=(ox,vx) of the finite ring $K^n$(n=o+v) containing the element ox selected by the element selection unit into an element x of the finite ring $K^n$ by an inverse transformation $S^{-1}$ of a second secret polynomial S; and a signature generation unit that generates an electronic signature σ containing the element x of the finite ring $K^n$ obtained by the second inverse transformation unit, wherein the m satisfies a n≥m+β condition and the β satisfies a $q^{-β}$<<1 condition for a number of elements q of the finite ring K.

According to the seventh aspect of the present invention in order to achieve the above-mentioned object, there is provided an information processing apparatus, including: a data generation unit that generates an element y of a finite ring $K^m$ containing elements constituted of m numbers by using electronic data M; a partial element selection unit that selects an element vx of a finite ring $K^v$ containing elements constituted of v numbers; a first inverse transformation unit that transforms the element y of the finite ring $K^m$ generated by the data generation unit into an element y' of the finite ring $K^m$ by an inverse transformation $T^{-1}$ of a first secret polynomial T; an element computation unit that computes an element ox∈{Z∈$K^o$|f(Z,vx)=y'} of mapping f(f: $K^n$→$K^o$, n=o+v) represented by a predetermined multivariable polynomial by using the element y' of the finite ring $K^m$ obtained by the first inverse transformation unit and the element vx selected by the partial element selection unit; an element selection unit that selects the element ox of the inverse image computed by the element computation unit if the element of the inverse image exists and causes the partial element selection unit to select the different number vx and selects the element ox of the inverse image computed by processing of the first inverse transformation unit and the element computation unit by using the different number vx if the element of the inverse image does not exist; a second inverse transformation unit that transforms an element x'=(ox,vx) of the finite ring $K^n$(n=o+v) containing the element ox selected by the element selection unit into an element x of the finite ring $K^n$ by an inverse transformation $S^{-1}$ of a second secret polynomial S; and a signature generation unit that generates an electronic signature σ containing the element x of the finite ring $K^n$ obtained by the second inverse transformation unit, wherein the mapping f is represented for ox=($ox_1$, ..., $ox_o$) and vx=($vx_1$, ..., $vx_v$) as f($ox_1$, ..., $ox_o$, $vx_1$, ..., $vx_v$)= L($vx_1$, ..., $vx_v$)($ox_1$, ..., $ox_o$)$^T$+g($vx_1$, ..., $vx_v$), the L is represented as L($vx_1$, ..., $vx_v$)=$L_1$ $L_2$($vx_1$, ..., $vx_v$) $L_3$ where the $L_1$ and $L_3$ are non-singular matrices, and the $L_2$ is an upper or lower triangular matrix having a function $1_{ij}$($vx_1$, ..., $vx_v$) of $vx_1$, ..., $vx_v$ as an i-th row j-th column element and 1 as a diagonal component.

The second secret polynomial S may be identity mapping.

According to the eighth aspect of the present invention in order to achieve the above-mentioned object, there is provided a key generation apparatus, including: a secret key generation unit that generates a secret key used by a computational algorithm having a partial element selection unit that selects an element vx of a finite ring $K^v$ containing elements constituted of v numbers, a number generation unit that generates a number r; a data generation unit that generates an element y of a finite ring $K^m$ containing elements constituted of m numbers by using the number r generated by the number generation unit and electronic data M, a first inverse transformation unit that transforms the element y of the finite ring $K^m$ generated by the data generation unit into an element y' of the finite ring $K^m$ by an inverse transformation $T^{-1}$ of a first secret polynomial T, an element computation unit that computes an element ox∈{Z∈$K^o$|f(Z,vx)=y'} of mapping f (f: $K^n$→$K^o$, n=o+v) represented by a predetermined multivariable polynomial by using the element y' of the finite ring $K^m$ obtained by the first inverse transformation unit and the element vx selected by the partial element selection unit, an element selection unit that selects the element ox of the inverse image computed by the element computation unit if the element of the inverse image exists and causes the number generation unit to generate the different number r and selects the element ox of the inverse image computed by processing of the data generation unit, the first inverse transformation unit, and the element computation unit by using the different number r if the element of the inverse image does not exist, a second inverse transformation unit that transforms an element x'= (ox,vx) of the finite ring $K''$ (n=o+v) containing the element ox selected by the element selection unit into an element x of the finite ring $K''$ by an inverse transformation $S^{-1}$ of a second secret polynomial S, and a signature generation unit that generates an electronic signature σ containing the element x of the finite ring $K''$ obtained by the second inverse transformation unit and containing information about the first secret polynomial T, the second secret polynomial S, and the predetermined multivariable polynomial; and a public key generation unit that generates a public key containing information about composite mapping F constituted of the first secret polynomial T, the mapping f, and the second secret polynomial S.

According to the ninth aspect of the present invention in order to achieve the above-mentioned object, there is provided a signature verification apparatus, including; an acquisition unit that acquires information about composite mapping F constituted of a first secret polynomial T, mapping f, and a second secret polynomial S, an electronic signature σ, and electronic data M from a signature generation apparatus having a partial element selection unit that selects an element vx of a finite ring $K^v$ containing elements constituted of v numbers, a number generation unit that generates a number r; a first data generation unit that generates an element y of a finite ring $K^m$ containing elements constituted of m numbers by using the number r generated by the number generation unit and the electronic data M, a first inverse transformation unit that transforms the element y of the finite ring $K^m$ generated by the first data generation unit into an element y' of the finite ring $K^m$ by an inverse transformation $T^{-1}$ of the first secret polynomial T, an element computation unit that computes an element ox∈{Z∈$K^o$|f(Z,vx)=y'} of the mapping f(f: $K''→K^o$, n=o+v) represented by a predetermined multivariable polynomial by using the element y' of the finite ring $K^m$ obtained by the first inverse transformation unit and the element vx selected by the partial element selection unit, an element selection unit that selects the element ox of the inverse image computed by the element computation unit if the element of the inverse image exists and causes the number generation unit to generate the different number r and selects the element ox of the inverse image computed by processing of the first data generation unit, the first inverse transformation unit, and the element computation unit by using the different number r if the element of the inverse image does not exist, a second inverse transformation unit that transforms an element x'=(ox,vx) of the finite ring $K''$(n=o+v) containing the element ox selected by the element selection unit into an element x of the finite ring $K''$ by an inverse transformation $S^{-1}$ of the second secret polynomial S, and a signature generation unit that generates the electronic signature σ containing the element x of the finite ring $K''$ obtained by the second inverse transformation unit and the number r generated by the number generation unit; a second data generation unit that generates an element y1 of the finite ring $K^m$ by using the number r contained in the electronic signature σ and the electronic data M; a third data generation unit that generates an element y2 of the finite ring $K^m$ by applying the element x of the finite ring $K''$ contained in the electronic signature σ to the composite mapping F; and a verification unit that verifies whether the element y1 of the finite ring $K^m$ generated by the second data generation unit and the element y2 of the finite ring $K^m$ generated by the third data generation unit match.

According to the tenth aspect of the present invention in order to achieve the above-mentioned object, there is provided an information processing method, including: a first inverse transformation step of transforming an element y of a finite ring $K^n$ containing elements constituted of n numbers into an element y' of the finite ring $K^n$ by an inverse transformation $T^{-1}$ of a first secret polynomial T; an element computation step of considering the element y' of the finite ring $K^n$ obtained in the first inverse transformation step as an element Y of an n-order extension A of a finite ring K and computing an element X∈{Z∈A|f(Z)=Y} of an inverse image of mapping f(f: A→A) represented by a predetermined multivariable polynomial by using the element Y; an element selection step of selecting one element X of the inverse image computed in the element computation step with a probability p proportional to a number of elements α of the inverse image and outputting an exception value with the probability (1-p); and a second inverse transformation step of considering the element X selected in the element selection step as an element x' of the finite ring $K^n$ and transforming the element x' of the finite ring $K^n$ into an element x of the finite ring $K^n$ by an inverse transformation $S^{-1}$ of a second secret polynomial S.

According to the eleventh aspect of the present invention in order to achieve the above-mentioned object, there is provided an information processing method, including: a partial element selection step of selecting an element vx of a finite ring $K^v$ containing elements constituted of v numbers; a first inverse transformation step of transforming an element y of a finite ring $K^m$ containing elements constituted of m elements into an element y' of the finite ring $K^m$ by an inverse transformation $T^{-1}$ of a first secret polynomial T; an element computation step of considering the element y' of the finite ring $K^m$ obtained in the first inverse transformation step as an element Y of an m-order extension A of a finite ring K and computing an element X∈{Z∈B|f(Z,vx)=Y} of an inverse image of mapping f(f: A×$K^v$→B, B is an o-order extension of the finite ring K) represented by a predetermined multivariable polynomial by using the element Y and the element vx selected in the partial element selection step; an element selection step of selecting one element X of the inverse image computed in the element computation step with a probability p proportional to a number of elements α of the inverse image and outputting an exception value with the probability (1-p); and a second inverse transformation step of considering the element X selected in the element selection step as an element ox of a finite ring $K^o$ and transforming an element x'=(ox,vx) of the finite ring $K''$(n=o+v) into an element x of the finite ring $K''$ by an inverse transformation $S^{-1}$ of a second secret polynomial S.

According to the twelfth aspect of the present invention in order to achieve the above-mentioned object, there is provided a signature generation method, including: a partial element selection step of selecting an element vx of a finite ring $K^v$ containing elements constituted of v numbers; a number generation step of generating a number r; a data generation step of generating an element y of a finite ring $K^m$ containing elements constituted of m numbers by using the number r generated in the number generation step and electronic data M; a first inverse transformation step of transforming the element y of the finite ring $K^m$ generated in the data generation step into an element y' of the finite ring $K^m$ by an inverse transformation $T^{-1}$ of a first secret polynomial T; an element computation step of computing an element ox∈{Z∈$K^o$|f(Z,vx)=y'} of mapping f (f: $K''→K^o$, n=o+v) represented by a predetermined multivariable polynomial by using the element y' of the finite ring $K^m$ obtained in the first inverse transformation step and the element vx selected in the partial element selection step; an element selection step of selecting the element ox of the inverse image computed in the element computation step if the element of the inverse image exists and causes the number generation step to generate the different number r and selecting the element ox of the inverse image computed by processing of the data generation step, the first inverse transformation step, and the element computation step by using the different number r if the element of the inverse image does not exist; a second inverse transformation step of transforming an element x'=(ox,vx) of the finite ring $K^n$(n=o+v) containing the element ox selected in the element selection step into an element x of the finite ring $K^n$ by an inverse transformation $S^{-1}$ of a second secret polynomial S; and a signature generation step of generating an electronic signature σ containing the element x of the finite ring $K^n$ obtained in the second inverse transformation step.

According to the thirteenth aspect of the present invention in order to achieve the above-mentioned object, there is provided a program causing a computer to execute: a first inverse transformation step of transforming an element y of a finite ring $K^n$ containing elements constituted of n numbers into an element y' of the finite ring $K^n$ by an inverse transformation $T^{-1}$ of a first secret polynomial T; an element computation step of considering the element y' of the finite ring $K^n$ obtained in the first inverse transformation step as an element Y of an n-order extension A of a finite ring K and computing an element X∈{Z∈A|f(Z)=Y} of an inverse image of mapping f(f: A→A) represented by a predetermined multivariable polynomial by using the element Y; an element selection step of selecting one element X of the inverse image computed in the element computation step with a probability p proportional to a number of elements α of the inverse image and outputting an exception value with the probability (1-p); and a second inverse transformation step of considering the element X selected in the element selection step as an element x' of the finite ring $K^n$ and transforming the element x' of the finite ring $K^n$ into an element x of the finite ring $K^n$ by an inverse transformation $S^{-1}$ of a second secret polynomial S.

Advantageous Effects of Invention

According to the present invention, as described above, bijection or properties close to bijection of mapping corresponding to a one-way function with trapdoor used in the MPKC signature method can be realized. As a result, safety from chosen-message attacks can be secured for the MPKC signature method.

BRIEF DESCRIPTION OF DRAWINGS

FIG. 10 is an explanatory view providing an overview of the FDH signature method based on the OV function.

FIG. 11 is an explanatory view showing properties of the FDH signature method (extended OV signature method) based on the OV function to which technology according to a second embodiment of the present invention is applied.

DESCRIPTION OF EMBODIMENTS

Figure 1:
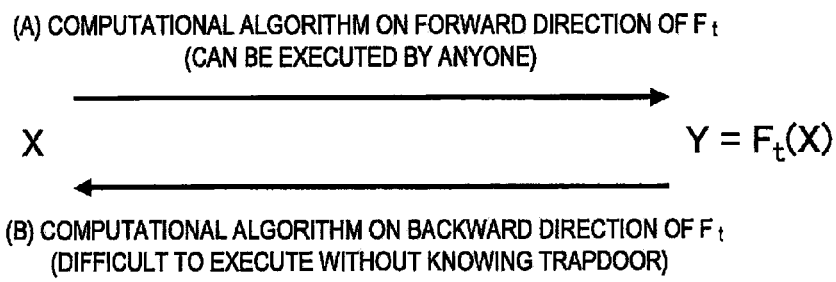
FIG. 1 is an explanatory view illustrating properties of a one-way function with trapdoor.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

[Flow of the Description]

The flow of the description about the embodiments of the present invention described below will briefly be mentioned. First, a one-way function with trapdoor and an electronic signature method using the function are briefly described with reference to FIGS. 1 to 4. In the description, an RSA function is cited as the one-way function with trapdoor and properties thereof are described and also the FDH signature method using the RSA function is briefly described. A system configuration example of an electronic signature system is briefly described with reference to FIG. 28.

Next, the one-way function with trapdoor according to the first embodiment of the present invention and the electronic signature method (hereinafter, referred to as the extended HFE signature method) using the function are described with reference to FIGS. 5 to 8, 14, 15, 18, and 19. In the description, a general HFE function and an electronic signature method using the HFE function are described, problems of the electronic signature method are pointed out with reference to FIG. 29, and improvement effects by application of technology according to the first embodiment of the present invention are described.

Next, the one-way function with trapdoor according to the second embodiment of the present invention and the electronic signature method (hereinafter, referred to as the extended OV signature method) using the function are described with reference to FIGS. 9 to 11, 16, 17, 22, 23, 26, and 27. In the description, a general OV function and an electronic signature method using the OV function are described, problems of the electronic signature method are pointed out with reference to FIG. 30, and improvement effects by application of technology according to the second embodiment of the present invention are described.

Next, the one-way function with trapdoor according to the third embodiment of the present invention and the electronic signature method (hereinafter, referred to as the extended HFEv signature method) using the function are described with reference to FIGS. 12, 13, 16, 17, 20, 21, 24, and 25. In the description, an HFEv signature method combining the general HFE signature method and OV signature method is described, problems of the electronic signature method are pointed out, and improvement effects by application of technology according to the third embodiment of the present invention are described. Next, a supplementary description about extension of the electronic signature methods according to the first to third embodiments of the present invention is provided.

Next, a hardware configuration example of various apparatuses contained in an electronic signature system capable of realizing electronic signature methods according to the first to third embodiments of the present invention is briefly described. Lastly, a technical idea of the first to third embodiments of the present invention is summarized and an operation effect obtained from the technical idea is briefly described.

(Description Items)

1. Introduction 1-1. Configuration Example of Electronic Signature System 1-2. Properties of One-Way Function with Trapdoor 1-3. Electronic Signature Method Based on One-Way Function with Trapdoor 1-4. RSA Signature Method 2. First Embodiment (Application Example to HFE Signature Method)

2-1. Properties of HFE Function 2-2. HFE Signature Method 2-3. Extended HFE Signature Method 3. Second Embodiment (Application Example to OV Signature Method)

3-1. Properties of OV Function 3-2. OV Signature Method 3-3. First Extended OV Signature Method 3-4. Second Extended OV Signature Method 4. Third Embodiment (Application Example to HFEv Signature Method)

4-1. Properties of HFEv Function 4-2. HFEv Signature Method 4-3. First Extended HFEv Signature Method 4-4. Second Extended HFEv Signature Method 5. Supplements 5-1. Extension to PSS Signature Method 5-2. Extension to Multilayer OV Signature Method 5-3. Minus Extension Method of HFE Function $F_t$ 6. Hardware Configuration Example 7. Conclusion

1. INTRODUCTION

First, before describing the embodiments of the present invention, the system configuration of an electronic signature system, properties of the one-way function with trapdoor used in an electronic signature method, and examples (the FDH signature method and RSA signature method) of the electronic signature method based on the one-way function with trapdoor will briefly be described.

[1-1. Configuration Example of Electronic Signature System]

Figure 28:
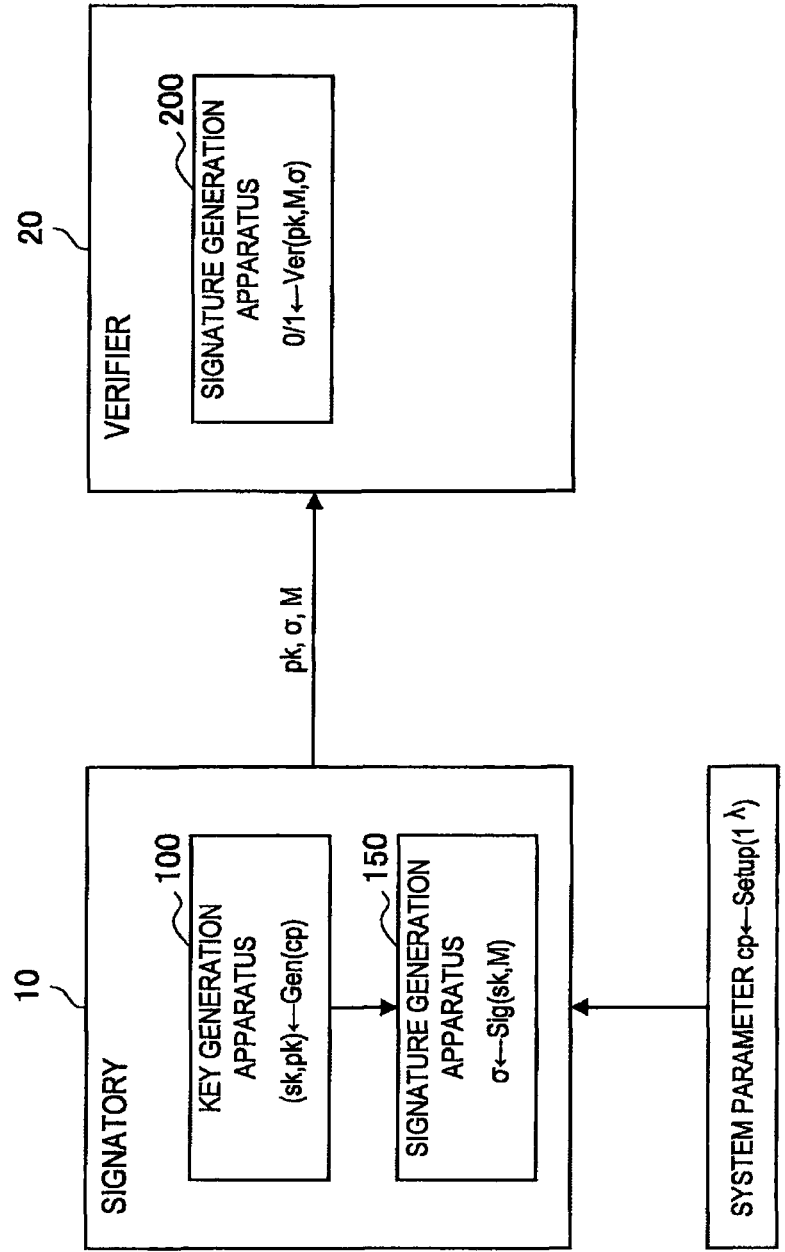
FIG. 28 is an explanatory view showing a configuration example of a system capable of realizing an electronic signature method according to the first to third embodiments of the present invention.

First, a system configuration example of the electronic signature system will be described with reference to FIG. 28. FIG. 28 is an explanatory view showing a system configuration example of the electronic signature system. For example, by concretely applying an operation algorithm of various electronic signature methods described later to the system configuration shown in FIG. 28, an electronic signature system based on the operation algorithm can be constructed.

As shown in FIG. 28, the electronic signature system includes two entities of a signatory 10 and a verifier 20. The function of the electronic signature system is realized by three algorithms of a key generation algorithm Gen, a signature generation algorithm Sig, and a signature verification algorithm Ver. The key generation algorithm Gen and the signature generation algorithm Sig are used by the signatory 10. The signature verification algorithm Ver is used by the verifier 20. In the example in FIG. 28, the key generation algorithm Gen is executed by a key generation apparatus 100. The signature generation algorithm Sig is executed by a signature generation apparatus 150. The signature verification algorithm Ver is executed by a signature verification apparatus 200.

A system parameter cp is given to the signatory 10. The system parameter cp is given by, for example, a system administrator of the electronic signature system. The system parameter cp is generated based on a security parameter $1^\lambda$. The key generation algorithm Gen outputs a pair of a signature key sk and a verification key pk specific to the signatory 10 for the input of the system parameter cp ((sk, pk)←Gen (cp)). The signature key sk is held in secret and used for generation of an electronic signature by the signatory 10. On the other hand, the verification key pk is released to the verifier 20 and used for verification of an electronic signature by the verifier 20.

The signature generation algorithm Sig outputs an electronic signature σ for the input of the signature key sk output from the key generation algorithm Gen and electronic data (hereinafter, a message) M to which an electronic signature is added (σ←Sig(sk, M)). The electronic signature σ is provided to the verifier 20 together with a message M and used to verify authenticity of the message M. The signature verification algorithm Ver outputs a verification result 0/1 for the input of the verification key pk released by the signatory 10, the message M provided by the signatory 10, and the electronic signature σ. If, for example, authenticity of the message M is certified by the electronic signature σ ((M,σ) is accepted), the signature verification algorithm Ver outputs 1. On the other hand, if authenticity of the message M is not certified by the electronic signature σ((M,σ) is rejected), the signature verification algorithm Ver outputs 0.

As described above, the electronic signature system mainly includes the key generation algorithm Gen, the signature generation algorithm Sig, and the signature verification algorithm Ver. These algorithms are different from electronic signature method to electronic signature method. The present specification focuses on the signature generation algorithm Sig and the signature verification algorithm Ver.

[1-2. Properties of One-Way Function with Trapdoor]

The functions of the signature generation algorithm Sig and the signature verification algorithm Ver are realized by using a one-way function with trapdoor $F_t$. As shown in FIG. 1, the one-way function with trapdoor $F_t$ is a function from which it is difficult to obtain an operation result ($X=F_t^{-1}(Y)$) in the backward direction if trapdoor is not known. That is, while a computational algorithm to efficiently compute without trapdoor exists for computation ($Y=F_t(X)$) in the forward direction of (A)$F_t$, no computational algorithm to efficiently compute without trapdoor does not exist for computation in the backward direction of (B)Ft. A function $F_t$ having such a property is called a one-way function with trapdoor.

In the present specification, expressions of the "computational algorithm in the forward direction" and "computational algorithm in the backward direction" will be used. The definition of the "computational algorithm in the forward direction" and "computational algorithm in the backward direction" will be described. The "computational algorithm in the forward direction" for mapping f:A→B is an algorithm that computes y∈B satisfying f(x)=y when x∈A is provided. On the other hand, the "computational algorithm in the backward direction" for mapping f:A→B is an algorithm that computes x∈A satisfying $f^{-1}(y)=x$ when y∈B is provided. In the computational algorithm in the forward direction, one output value f(x)=y is decided for the input x∈A. In the computational algorithm in the backward direction, on the other hand, a plurality of output values x may exist or no output value may exist for the input y∈B. Thus, the output value of the computational algorithm in the backward direction becomes A∪{err}, where err denotes an exception value.

[1-3. Electronic Signature Method Based on One-Way Function with Trapdoor]

Figure 2:
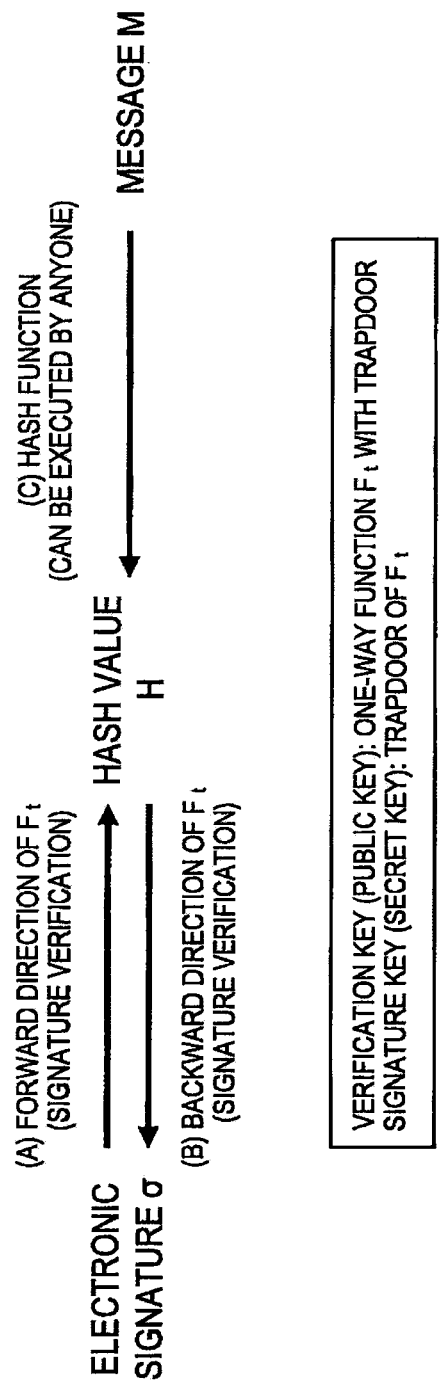
FIG. 2 is an explanatory view providing an overview of the FDH signature method using the one-way function with trapdoor.

The one-way function with trapdoor $F_t$ is applied to the signature generation algorithm Sig and the signature verification algorithm Ver in the form as shown in FIG. 2. FIG. 2 is an explanatory view providing an overview of the electronic signature method called the FDH signature method. The FDH signature method is characterized in that, instead of the message M, a hash value (Hash value) is used as an input value used for the generation of an electronic signature. A hash value H is computed by using a hash function (Hash function). Generation processing (C) of the hash value H can be performed by anyone.

In the electronic signature method using the one-way function with trapdoor $F_t$, the verification key pk is the one-way function with trapdoor $F_t$. The signature key sk is the trapdoor of the one-way function with trapdoor Ft. Therefore, the one-way function with trapdoor $F_t$ is released to the verifier 20. On the other hand, the trapdoor is managed by the signatory 10 in secret.

The signature generation algorithm Sig is a computational algorithm to generate the electronic signature σ from the hash value H by using the backward direction operation (B) of the one-way function with trapdoor $F_t$. It is difficult to execute the computational algorithm (B) in the backward direction of the one-way function with trapdoor $F_t$ if the trapdoor is not known. Therefore, others than the signatory 10 cannot generate the electronic signature σ. On the other hand, the signature verification algorithm Ver is a computational algorithm to verify authenticity of the electronic signature σ for the message M by using the forward direction operation (A) of the one-way function with trapdoor $F_t$. The computational algorithm (A) in the forward direction of the one-way function with trapdoor $F_t$ can be executed without knowing the trapdoor. Therefore, anyone knowing the verification key pk (one-way function with trapdoor Ft) can verify the electronic signature σ.

By using the one-way function with trapdoor $F_t$ as described above, the signatory 10 can surely be identified by the electronic signature σattached to the message M. However, it is assumed that an inverse operation of the one-way function with trapdoor $F_t$ is not easily performed by a third party who does not know the trapdoor. If this assumption breaks down, the signatory 10 may not be surely identified by the electronic signature σ.

[1-4. RSA Signature Method]

An RSA function can be cited as the typical one-way function with trapdoor $F_t$ used by an electronic signature system. The RSA function $F_t$ grounds difficulty of a backward direction operation on "difficulty of a computational solution of factorization into prime components of a large composite number (problem of factorization into prime components)". If p and q(p≠q) are prime numbers, N=p*q, e is an integer prime to n−1 each other, d is an integer satisfying d*e≡1(mod n), and $Z^N$ is a residue class ring of modulo N, the RSA function $F_t$ is expressed as the following formula (1):

[Math 1]

$$F_t: Z_n \to Z_N, x \mapsto x^e \bmod N \qquad (1)$$

In the RSA function $F_t$ expressed by the above formula (1), the trapdoor is d. The computational algorithm in the forward direction of the RSA function $F_t$ includes a step of computing $y=F_t(x)=x^e \bmod N$ by using a given $x \in Z^N$. On the other hand, the computational algorithm in the backward direction of the RSA function $F_t$ includes a step of computing $x = y^d \bmod N$ by using a given $y \in Z^N$ and trapdoor d. It is difficult to execute the step if the trapdoor d is not known due to difficulty of a computational solution of a problem of factorization into prime components.

The problem of factorization into prime components has difficulty of a solution in the sense that an efficient solution algorithm by a classic computer does not exist. However, the problem of factorization into prime components is said to be soluble by a quantum computer within a polynomial time. Thus, when a quantum computer becomes commercially available, safety of the electronic signature method (RSA signature method) using the RSA function $F_t$ is no longer secured. Similarly, when a quantum computer becomes commercially available, the discrete logarithm problem is said to be soluble within a polynomial time. In addition, when the RSA signature method is used, an electronic signature of a sufficiently long signature length needs to be used to secure sufficient safety even if only classic computers are assumed, which makes the application of the RSA signature method to small devices such as contactless IC cards inappropriate.

For these reasons, attention focuses on electronic signature methods using the one-way function with trapdoor $F_t$ for which no efficient solution by a quantum computer is known. An example thereof is the MPKC signature method as typified by the HFE signature method and the OV signature method. The MPKC signature method grounds safety on "difficulty of a solution of a nonlinear multivariable polynomial". Moreover, when compared with the RSA signature method or the like, the MPKC signature method needs a shorter signature length to secure equivalent safety. The embodiments described later relates to the MPKC signature method. Particularly, properties of mapping $F_t$ in computational algorithms like the HFE function and OV function and resistance to chosen-message attacks will be discussed.

Figure 3:
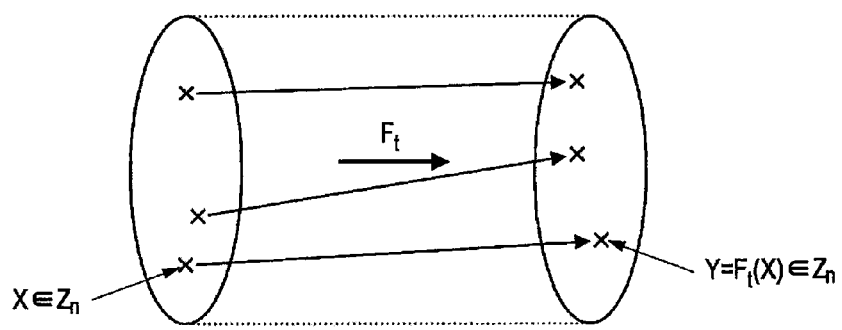
FIG. 3 is an explanatory view showing properties of an RSA function.

Generally, if the bijective one-way function with trapdoor $F_t$ is used, the FDH signature method as shown in FIG. 2 and an extension thereof, the PFDH signature method are said to secure safety from chosen-message attacks. The RSA function $F_t$ expressed by the formula (1) is an example of the bijective one-way function with trapdoor $F_t$. Bijection of the one-way function with trapdoor $F_t$ refers to, as shown in FIG. 3 (the case of the RSA function), a one-to-one correspondence between an element X of the domain and an element Y of the range of the one-way function with trapdoor $F_t$. If the one-way function with trapdoor $F_t$ is bijective, uniform outputs can be obtained from the one-way function with trapdoor $F_t$ when uniform inputs are given to the one-way function with trapdoor $F_t$.

Figure 4:
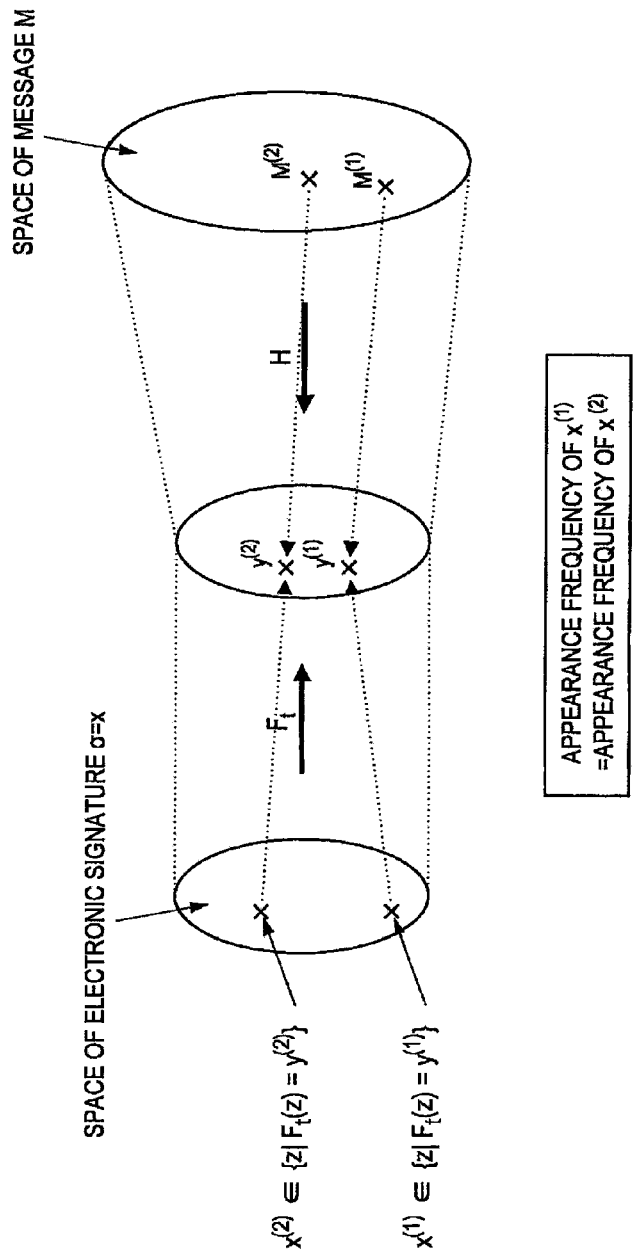
FIG. 4 is an explanatory view providing an overview of the FDH signature method based on the RSA function.

This property is very important to prevent third parties who do not know the signature key sk from obtaining any information of the signature key sk from the verification key pk and a combination of the message M and the electronic signature σ. This point will be considered by citing a combination of the RSA signature method and the FDH signature method (hereinafter, referred to as an RSA+FDH signature method) as a concrete example with reference to FIG. 4. In FIG. 4, a signature generation method (Step 1 to Step 3) in the RSA+FDH signature method and a conceptual diagram of mapping by the hash function H and the RSA function $F_t$.

The signature generation method in the RSA+FDH signature method is performed by the following three steps. An operation of the hash function H in Step. 1 can be performed by anyone. A backward direction operation of the RSA function $F_t$ in Step. 2 is performed by using the trapdoor d (signature key). Because the RSA function $F_t$ is bijective, one x is always output after one y being input. If $y^{(1)}(y^{(2)}$ holds, $x^{(1)}$ ($x^{(2)}$ holds. Therefore, if hash values $y^{(1)}$, $y^{(2)}$ are input into the RSA function $F_t$, $x^{(1)}$, $x^{(2)}$ are output with the same frequency of appearance.

Step. 1: $y \leftarrow H(M)$, $H(\ldots)$ is a hash function
Step. 2: Select one $x \in \{z|F_t(z)=y\}$
Step. 3: Output the electronic signature $\sigma = x$ As described above, if the one-way function with trapdoor $F_t$ is bijective, values having a uniform distribution are output for the input of values having a uniform distribution. If the distribution is biased between input and output, there is a danger that information about the structure of the one-way function with trapdoor $F_t$ may be leaked from the bias. Particularly, when such a bias exists, safety from chosen-message attacks cannot be secured. The HFE function and the OV function used for the MPKC signature method described later are not bijective. Thus, safety from chosen-message attacks is not secured for these MPKC signature methods.

Thus, the inventors of the present application devised a method capable of securing safety from chosen-message attacks by improving distributive characteristics of the one-way function with trapdoor $F_t$ used for the MPKC signature method. In the embodiments described later, application examples of the above method to the HFE signature method, the OV signature method, and a combination of these signature methods are shown.

2. First Embodiment

Application Example to HFE Signature Method

First, the first embodiment according to the present invention will be described. As described above, the HFE function is not bijective and thus, values having a uniform distribution are not output for the input of values having a uniform distribution (hereinafter, referred to as a non-uniform distributive property). In the present embodiment, the computational algorithm in the backward direction of the HFE function is improved to provide the HFE function with improved distributive properties (hereinafter, referred to as the extended HFE function).

[2-1. Properties of HFE Function]

Before describing an extended HFE function, the definition of an HFE function $F_t$ and properties of the HFE function $F_t$ will briefly be described.

<<Definition of Symbols>>

K: Finite ring formed of elements containing q numbers
$K^n$: Direct product of n Ks
$F_t$: $K^n \rightarrow K^n$
A: n-order extension of the finite ring K (number of elements: $q^n$)
B: m-order extension of the finite ring K (number of elements: $q^m$)
φ: Linear mapping A→$K^n$ (see the formula (2) below)
S: Reversible affine transformation on $K^n$ (first secret polynomial transformation)
T: Reversible affine transformation on $K^n$ (second secret polynomial transformation)

f: Center mapping (see the formula (3) below)
trapdoor: S, T, $a_{ij}$, $b_i$, c

[Math 2]

$$\phi(x_0 + x_1 * X + \ldots + x_{n-1} * X^{n-1}) = (x_0, \ldots, x_{n-1}) \quad (2)$$

$$f: A \to A, X \mapsto \sum_{i=0}^{n-1}\sum_{j=0}^{n-1} a_{ij} X^{q^i+q^j} + \sum_{i=0}^{n-1} b_i X^{q^i} + c \quad (3)$$

If d is a not so great integer, "$a_{ij}=0$ holds if $q^i+q^j>d$" and "$b_j=0$ holds if $q^i>d$" for $a_{ij}$, $b_i$, c∈A.

<<Structure of the HFE Function $F_t$>>

The HFE function $F_t$ is represented as composite mapping $F_t=T*F*S$ of mapping by the transformation S, center mapping $F(=\phi^{-1}*f*\phi)$, and mapping by the transformation T (* is composition of mapping). The algorithm to compute $y=F_t(x)$ is as follows:

(Step. 1) Transform given $x=(x_0, \ldots, x_{n-1})\in K^n$ into $x'=(x_0', \ldots, x_{n-1}')\in K^n$ by the transformation S.

(Step. 2) Transform $x' \in K^n$ into $X'\in A$ by $\phi^1$.

(Step. 3) Transform $X' \in A$ into $Y'=f(X')\in A$ by the center mapping f.

(Step. 4) Transform $Y' \in A$ into $y'=(y_0', \ldots, y_{n-1}')\in K^n$ by $\phi$.

(Step. 5) Transform $y' \in K^n$ into $y=(y_0, \ldots, y_{n-1})\in K^n$ by the transformation T.

(Step. 6) Output $y\in K^n$.

Figure 5:
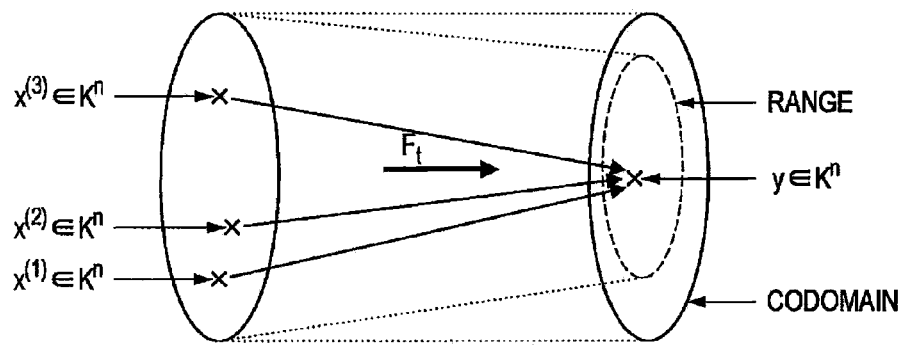
FIG. 5 is an explanatory view showing properties of an HFE function.

As shown in the above formula (3), the HFE function $F_t$ contains the center mapping f based on a non-linear single-variable polynomial. Thus, the inverse image $\{Z\in A|f(Z)=Y'\}$ corresponding to a set of roots of the single-variable polynomial may have a plurality of elements for some element Y' of a codomain A. In this case, as shown in FIG. 5, the number of elements of the inverse image regarding the HFE function $F_t$ is plural (3 in the example of FIG. 5) for an element y of the range.

In addition, no element may exist in the inverse image $\{Z\in A|f(Z)=Y'\}$ for some element Y' of the codomain A. In this case, an element of the codomain for which the inverse image $\{Z\in A|f(Z)=Y'\}$ contains no element is not contained in the range and therefore, as shown in FIG. 5, the codomain and the range are different. Due to the above property, elements of the domain obtained by a backward direction operation of the HFE function $F_t$ are not distributed uniformly even if elements of the codomain are input uniformly.

The computational algorithm of the HFE function $F_t$ will be described in more detail below.

<<Computational Algorithm in the Forward Direction>>

The computational algorithm in the forward direction for the HFE function $F_t$ includes a step of obtaining $y=F_t(x)\in K^n$ by substituting given $x\in K^n$ into the HFE function $F_t(x)$. If one element x of the domain is input into the computational algorithm in the forward direction, one element y of the range is output.

<<Computational Algorithm in the Backward Direction>>

The computational algorithm in the backward direction for the HFE function $F_t$ includes the following Step. 1 to Step. 7.

(Step. 1) Obtain $y'=(y_0', \ldots, y_{n-1}')\in K^n$ by applying given $y=(y_0, \ldots, y_{n-1})\in K^n$ to the inverse transformation $T^{-1}$ of the transformation T.

(Step. 2) Transform $y'=(y_0', \ldots, y_{n-1}')\in K^n$ into $Y'\in A$ by $\phi'$.

(Step. 3) Compute a set $X'\in\{Z\in A|f(Z)=Y'\}$ by using Y'. If $\{Z\in A|f(Z)=Y'\}$ is an empty set, output an exception value err. $X'\in\{Z\in A|f(Z)=Y'\}$ is determined by, for example, factorizing the polynomial $f(X)-Y'$ into factors. If an element Y' in the codomain is randomly selected, the probability that the inverse image $\{Z\in A|f(Z)=Y'\}$ for the element Y' has m elements is approximately given by $1/(m!e)$ (e is the Napier number).

(Step. 4) Select one element X' from a set $X'\{Z\in A|f(Z)=Y'\}$.

(Step. 5) Transform the one element $X' \in A$ selected in Step. 4 into $x'=(x_0', \ldots, x_{n-1}')\in K^n$ by $\phi$.

(Step. 6) Transform $x'\in K^n$ into $x=(x_0, \ldots, x_{n-1})\in K^n$ by the inverse transformation $S^{-1}$ of the transformation S.

(Step. 7) Output $x\in K^n$.

In Step. 3 described above, the number of elements $\alpha=|\{Z\in A|f(Z)=Y'\}|$ of $X'\in\{Z\in A|f(Z)=Y'\}$ may be $\alpha=0$ or $\alpha\geq 2$. Thus, output values of the computational algorithm in the backward direction are not uniformly distributed even if elements of the codomain having a uniform distribution are input. If, as described above, there is such a distribution bias, there is a danger that information about the structure of the HFE function $F_t$ may be leaked by chosen-message attacks. Thus, to secure safety from chosen-message attacks, a contrivance to correct such a distribution bias is needed.

[2-2. HFE Signature Method]

Heretofore, the HFE function $F_t$ has been described. Next, the electronic signature method using the HFE function $F_t$ (HFE signature method) will be described. Here, the PFDH signature method using the HFE function (HFE+PFDH signature method) will be described as an example of the HFE signature method.

<<PFDH Signature Method>>

First, the key generation algorithm Gen, the signature generation algorithm Sig, and the signature verification algorithm Ver in the PFDH signature method will be described. These algorithms of the PFDH signature method use the one-way function with trapdoor $F_t: A\to B$ and the hash function $H: \{0,1\}^*\to B$.

(Key Generation Algorithm Gen)

The key generation algorithm Gen computes (sk,pk) by setting the security parameter as $1^\lambda$, the signature key sk as trapdoor t of $F_t$, and the verification key pk as $F_t$((sk,pk)←Gen($1^\lambda$)).

(Signature Generation Algorithm Sig)

The signature generation algorithm Sig computes the electronic signature σ by the following Step. 1 to Step. 4 after the message M and the signature key sk being input (σ←Sig(sk, M)).

(Step. 1) Generate a random number r.

(Step. 2) Compute $y=H(M,r)\in B$.

(Step. 3) Compute x satisfying $y=F_t(x)$ by executing the computational algorithm in the backward direction of $F_t$ using trapdoor t. If x satisfying $y=F_t(x)$ does not exist, return to Step. 1.

(Step. 4) Output the electronic signature σ=(x,r).

(Signature Verification Algorithm Ver)

The signature verification algorithm Ver verifies authenticity of the electronic signature σ for the message M by the following Step. 1 and Step. 2 after the verification key pk=$F_t$, the message M, and the electronic signature σ=(x,r) being input (0/1←Ver(pk,M,σ)).

(Step. 1) Determine whether or not $F_t(x)=H(M,r)$.

(Step. 2) Output 1 if $F_t(x)=H(M,r)$ and output 0 if $F_t(x)\neq H(M,r)$.

(Difference Between the FDH Signature Method and the PFDH Signature Method)

A main difference between the FDH signature method and the PFDH signature method is whether or not the random number r is used in the signature generation algorithm Sig. By using the random number r as described above, the element y in the codomain of the one-way function with trapdoor $F_t$ can be re-selected for the same message M. In the FDH signature method, if x satisfying $y=F_t(x)$ does not exist for the hash value y of some message M, the electronic signature σ of the message M cannot be generated. If the PFDH signature method is used, however, such a problem of the FDH signature method can be solved.

<<HFE+PFDH Signature Method>>

Next, the signature generation algorithm Sig and the signature verification algorithm Ver in the HFE+PFDH signature method will be described. The HFE+PFDH signature method is the PFDH signature method using the HFE function $F_t$. In the HFE+PFDH signature method, the signature key sk is set to trapdoor S, T, $a_{ij}$, $b_i$, c of the HFE function $F_t$ and the verification key pk is set to $F_t$.

(Signature Generation Algorithm Sig (Computational Algorithm in the Backward Direction))

The signature generation algorithm Sig computes the electronic signature σ by the following Step. 1 to Step. 9 after the message M and the signature key sk being input (σ←Sig(sk, M)).

(Step. 1) Generate a random number r.

(Step. 2) Compute the hash value $y \in K^n \leftarrow H(M,r)$ by using the random number r and the message M.

(Step. 3) Obtain $y'=(y_0', \ldots, y_{n-1}') \in K^n$ by applying $y=(y_0, \ldots, y_{n-1}) \in K^n$ to the inverse transformation $T^{-1}$ of the transformation T.

(Step. 4) Transform $y'=(y_0', \ldots, y_{n-1}') \in K^n$ into $Y' \in A$ by $\phi^{-1}$.

(Step. 5) Compute a set $X'$ {$Z \in A | f(Z)=Y'$}.

(Step. 6) Select one element X' from the set {$Z \in A | f(Z)=Y'$}. If the set {$Z \in A | f(Z)=Y'$} is an empty set, return to processing in Step. 1.

(Step 7) Transform $X' \in A$ into $x'=(x_0', \ldots, x_{n-1}') \in K^n$ by $\phi$.

(Step. 8) Transform $x' \in K^n$ into $x=(x_0, \ldots, x_{n-1}) \in K^n$ by the transformation S.

(Step. 9) Output the electronic signature σ=(x,r).

(Signature Verification Algorithm Ver (Computational Algorithm in the Forward Direction))

The signature verification algorithm Ver verifies authenticity of the electronic signature σ for the message M by the following Step. 1 to Step. 3 after the verification key pk=$F_t$, the message M, and the electronic signature σ=(x,r) being input (0/1←Ver(pk,M,σ)).

(Step. 1) Compute the hash value y←H(M,r) by using r contained in the electronic signature σ and the message M.

(Step. 2) Compute $y''=F_t(x) \in K^n$ by substituting $x \in K^n$ contained in the electronic signature σ into the HFE function $F_t(x)$.

(Step. 3) Output 1 if y=y" and output 0 if y≠y".

(Characteristics of the HFE+PFDH Signature Method)

Figure 6:
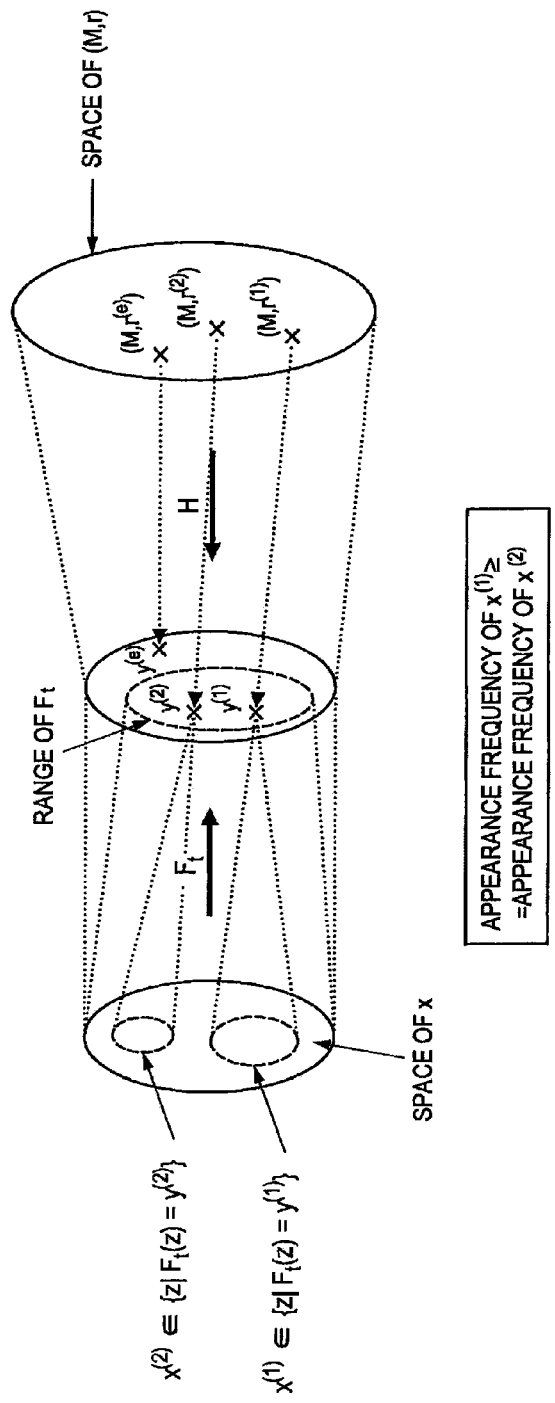
FIG. 6 is an explanatory view providing an overview of the PFDH signature method based on the HFE function.

In the HFE+PFDH signature method, the inverse image of the HFE function $F_t$ may have no element for some element of the codomain. Thus, as shown in FIG. 6, the codomain and the range of the HFE function $F_t$ do not match. In the HFE+PFDH signature method, however, the element y in the codomain of the HFE function $F_t$ can be re-selected for the same message M and thus, the electronic signature σ can be added to any message M. In the example in FIG. 6, $y^{(e)}=H(M,r^{(e)})$ is not contained in the range of the HFE function $F_t$ for the message M. Thus, the random number r is generated again in this case to generate the hash value y by using the different random number r.

Depending on properties of the HFE function $F_t$, the number of elements of the inverse image regarding the HFE function $F_t$ may be plural for one element y contained in the range of the HFE function $F_t$. In the example in FIG. 6, a set of elements $x^{(1)} \in \{z | F_t(z)=y^{(1)}\}$ of the inverse image regarding the HFE function $F_t$ is obtained for the element $y^{(1)}$ contained in the range of the HFE function $F_t$. Similarly, a set of elements $x^{(2)} \in \{z | F_t(z)=y^{(2)}\}$ of the inverse image regarding the HFE function $F_t$ is obtained for the element $y^{(2)}$ contained in the range of the HFE function $F_t$. In the example in FIG. 6, $|\{z|F_t(z)=y^{(1)}\}|>|\{z|F_t(z)=y^{(2)}\}|$ holds. That is, if the element y in the codomain of the HFE function $F_t$ is randomly given, the frequency of appearance of $x^{(1)}$>the frequency of appearance of $x^{(2)}$.

(Non-Uniform Distributive Property of the HFE Function $F_t$)

Figure 7:
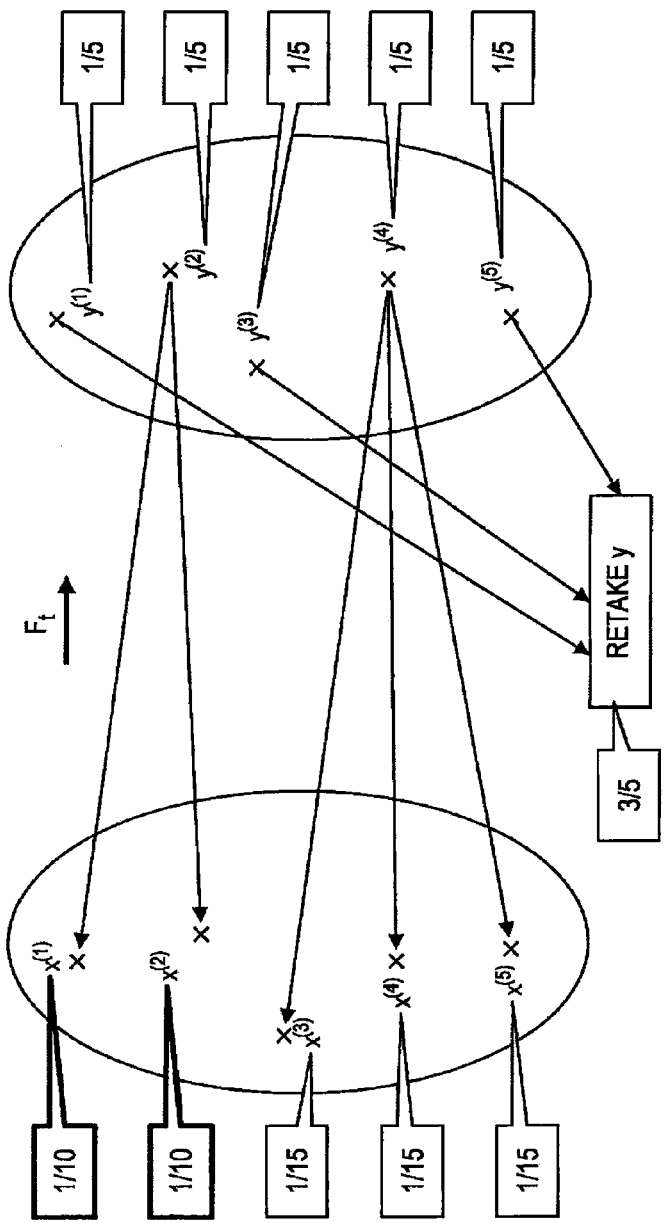
FIG. 7 is an explanatory view showing properties of the HFE function.

This point will be described in more detail with reference to FIG. 7. FIG. 7 shows probabilities of appearance of elements $x^{(1)}, \ldots, x^{(5)}$ of the inverse image of the HFE function $F_t$ for selected elements when elements $y^{(1)}, \ldots, y^{(5)}$ contained in the codomain of the HFE function $F_t$ are selected with the same probability of (1/5). In the example in FIG. 7, it is assumed that $x^{(1)}$ and $x^{(2)}$ are mapped to $y^{(2)}$ by the HFE function $F_t$. It is also assumed that $x^{(3)}$, $x^{(4)}$, and $x^{(5)}$ are mapped to $y^{(4)}$ by the HFE function $F_t$. Further, it is assumed that no element of the inverse image of the HFE function $F_t$ exists for $y^{(1)}$, $y^{(3)}$, and $y^{(5)}$, If each of the $x^{(1)}, \ldots, x^{(5)}$ is input into the computational algorithm in the backward direction of the HFE function $F_t$ with the probability of 1/5, retake processing of y (re-generation of the random number r) is performed for $y^{(1)}$, $y^{(3)}$, and $y^{(5)}$ because no element of the inverse image exists for $y^{(1)}$, $y^{(3)}$, and $y^{(5)}$. The probability with which the retake processing is performed is 3/5. On the other hand, because the number of elements of the inverse image is 2 for $y^{(2)}$, the element $x^{(1)}$ of the inverse image is further selected with the probability of 1/2 and the element $X^{(2)}$ of the inverse image is further selected with the probability of 1/2. That is, the probability of appearance of $x^{(1)}$, $x^{(2)}$ is 1/2*1/5=1/10 for each.

Similarly, because the number of elements of the inverse image is 3 for $y^{(4)}$, the element $x^{(3)}$ of the inverse image is further selected with the probability of 1/3, the element $x^{(4)}$ of the inverse image is further selected with the probability of 1/3, and the element $x^{(5)}$ of the inverse image is further selected with the probability of 1/3. That is, the probability of appearance of $x^{(3)}$, $x^{(4)}$, and $x^{(5)}$ is 1/3*1/5=1/15 for each. Therefore, the probabilities of appearance of the elements $x^{(1)}, \ldots, x^{(5)}$ of the HFE function $F_t$ obtained by using the computational algorithm in the backward direction of the HFE function $F_t$ are not uniform. Thus, the inventors of the present application devised a method (extended HFE signature method) of improving such non-uniformity of probabilities of appearance. The extended HFE signature method will be described below, but the flow of processing in the signature generation algorithm Sig and the signature verification algorithm Ver of the HFE+PFDH signature method will be put together here.

(Details of the Signature Generation Algorithm Sig)

Figure 14:
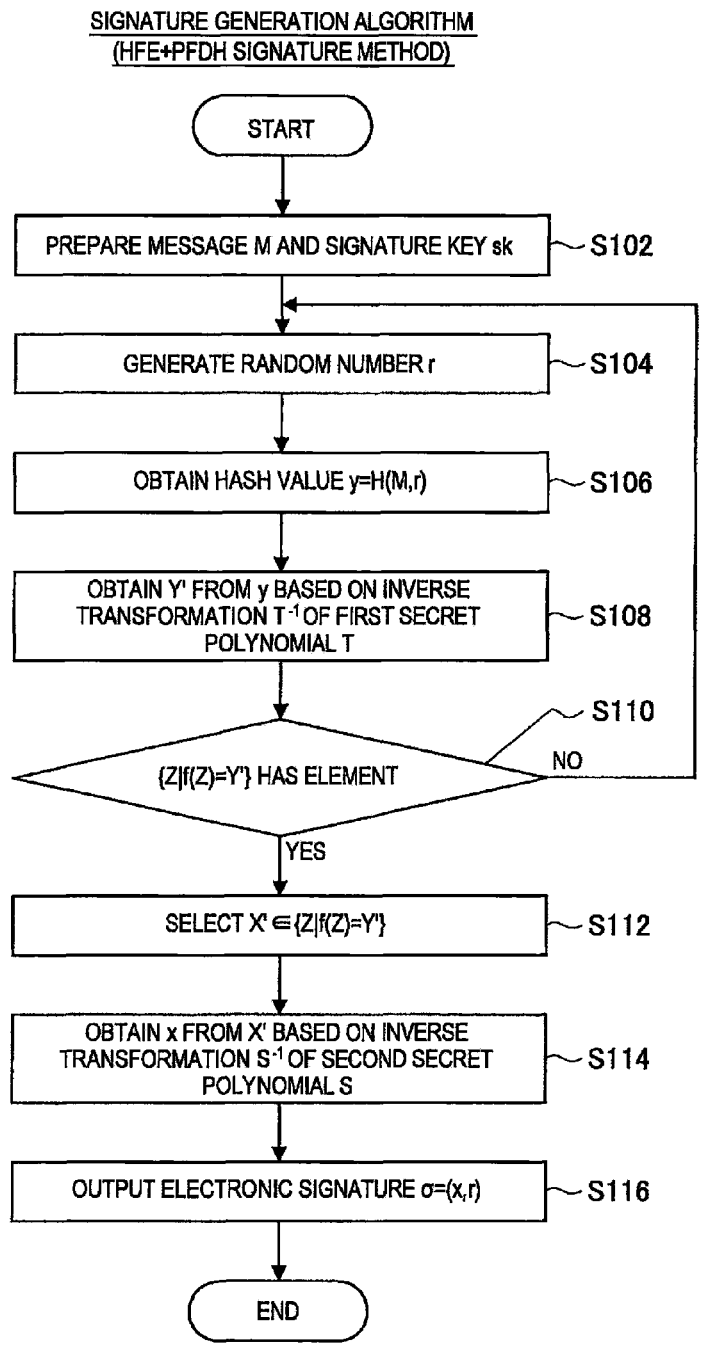
FIG. 14 is an explanatory view exemplifying a signature generation algorithm according to the PFDH signature method based on the HFE function.

First, the flow of processing by the signature generation algorithm Sig of the HFE+PFDH signature method will be described with reference to FIG. 14. FIG. 14 is an explanatory view showing the flow of processing by the signature generation algorithm Sig of the HFE+PFDH signature method.

As shown in FIG. 14, first the signatory 10 prepares the message M and signature key sk (S102) and inputs the message M and signature key sk into the signature generation algorithm Sig. Next, the signature generation algorithm Sig generates the random number r (S104). Next, the signature generation algorithm Sig computes the hash value y=H(M,r) by using the message M and the random number r (S106). Next, the signature generation algorithm Sig computes the element Y'∈A in the codomain of the center mapping f from the hash value y∈K″ based on the inverse transformation $T^{-1}$ of the transformation T (S108).

Next, the signature generation algorithm Sig computes X'∈{Z∈A|f(Z)=Y'} to determine whether the set {Z∈A|f(Z)=Y'} has any element (S110). If the set {Z∈A|f(Z)=Y'} has an element, the signature generation algorithm Sig proceeds to the processing in step S112. On the other hand, if the set {Z∈A|f(Z)=Y'} has no element, the signature generation algorithm Sig returns to the processing in step S104. If the processing proceeds to step S112, the signature generation algorithm Sig selects one element X' of the set {Z∈A|f(Z)=Y'} (S112).

Next, the signature generation algorithm Sig transforms the element X' selected in step S112 into x∈K″ based on the inverse transformation $S^{-1}$ of the transformation S (S114). Next, the signature generation algorithm Sig outputs the electronic signature σ=(x,r) (S116). The non-uniform distributive property of the HFE function $F_t$ is mainly caused by the branch processing in step S110 and the selection processing in step S112.

(Details of the Signature Verification Algorithm Ver)

Figure 15:
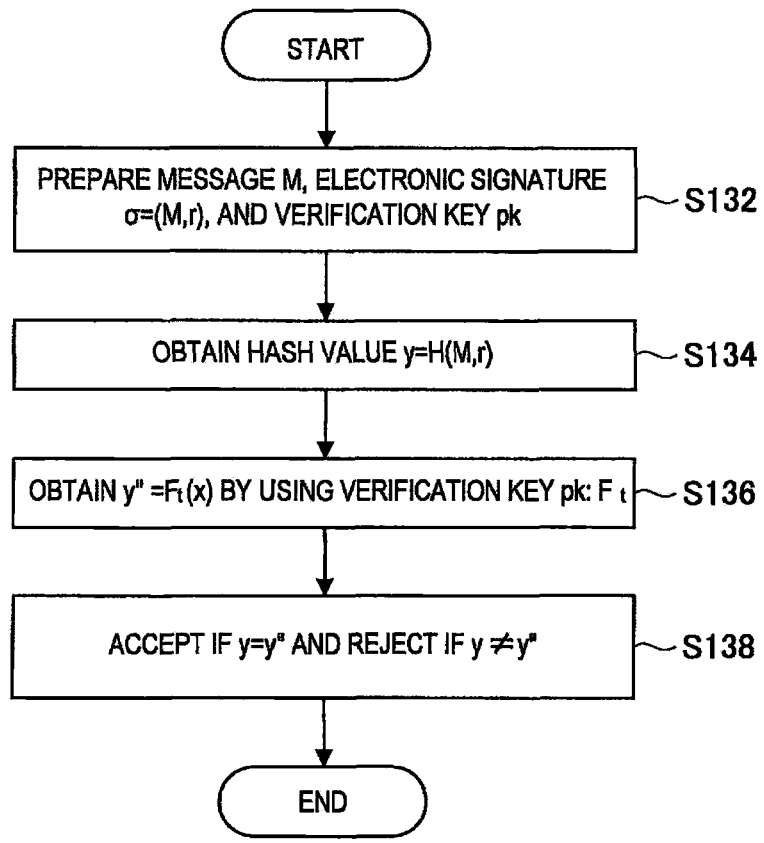
FIG. 15 is an explanatory view exemplifying a signature verification algorithm according to the PFDH signature method based on the HFE function.

Next, the flow of processing by the signature verification algorithm Ver of the HFE+PFDH signature method will be described with reference to FIG. 15. FIG. 15 is an explanatory view showing the flow of processing by the signature verification algorithm Ver of the HFE+PFDH signature method.

As shown in FIG. 15, first the verifier 20 acquires the message M, the electronic signature σ=(M,r), and the verification key pk from the signatory 10 (S132) and inputs the message M, the electronic signature σ=(M,r), and the verification key pk into the signature verification algorithm Ver. Next, the signature verification algorithm Ver computes the hash value y=H(M,r) by using the random number r contained in the electronic signature σ and the message M (S134). Next, the signature verification algorithm Ver computes y″=$F_t$(x) by using the verification key pk ($F_t$) (S136). Next, the signature verification algorithm Ver accepts (outputs 1) if y=y″ and rejects (outputs 0) if y≠y″ (S138).

(Safety Certification of the HFE+PFDH Signature Method)

Figure 29:
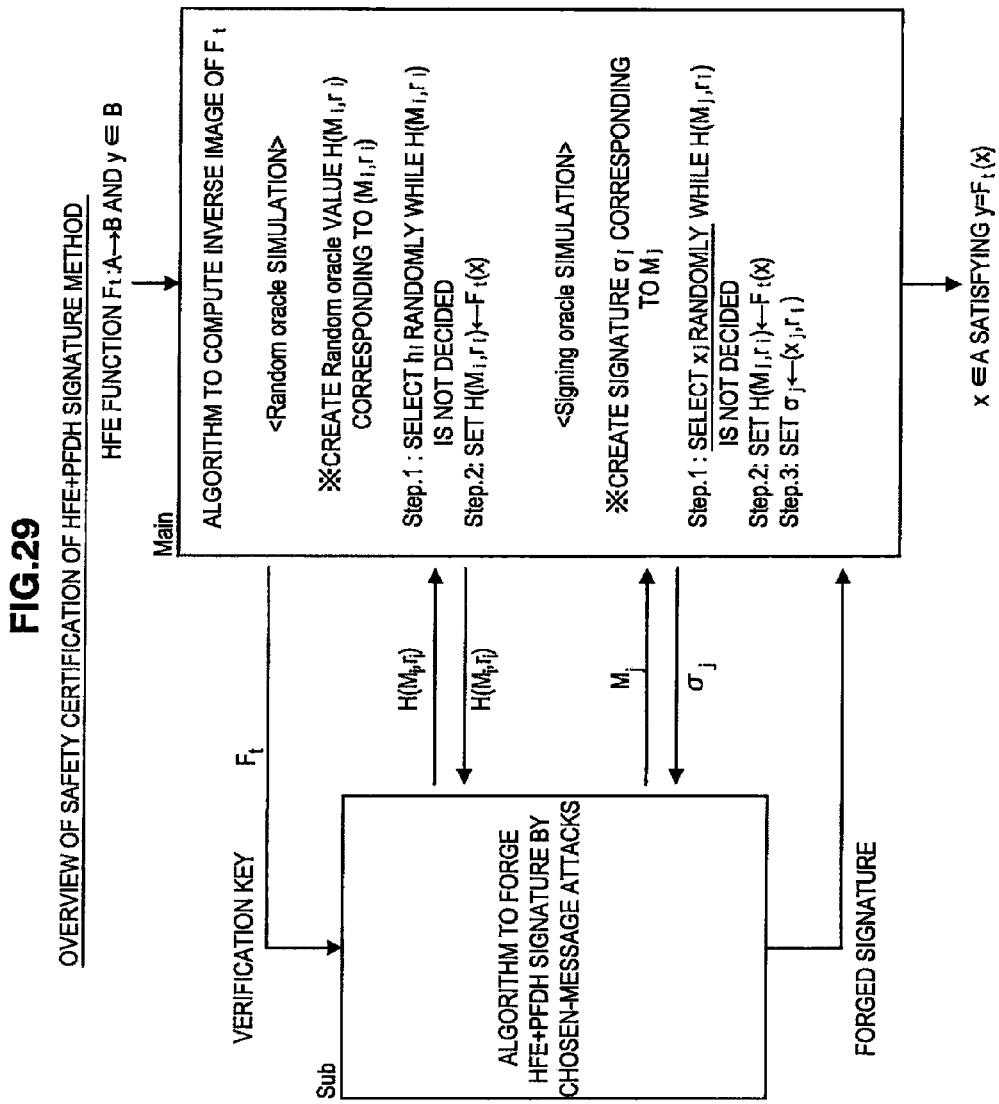
FIG. 29 is an explanatory view providing an overview of safety certification of the PFDH signature method based on the HFE function.

Next, the safety certification of the HFE+PFDH signature method will briefly be considered with reference to FIG. 29. The safety of the HFE+PFDH signature method is normally certified by a simulation as shown in FIG. 29. In the simulation, Step. 1 of the Signing oracle simulation has a problem. In Step. 1 of the Signing oracle simulation, by selecting an element in the codomain randomly, the element $x_j$ of the inverse image of the HFE function $F_t$ is to be randomly selected for the selected element. However, even if the element in the codomain is randomly selected, the element of the inverse image is not selected randomly due to the non-uniform distributive property of the HFE function $F_t$. Thus, safety from chosen-message attacks is not secured for the HFE signature method.

[2-3. Extended HFE Signature Method]

Thus, the inventors of the present application improved the computational algorithm in the backward direction of the HFE function $F_t$ and devised the one-way function with trapdoor $F_t$ (extended HFE function $F_t$) such that if elements in the codomain having a uniform distribution are input, elements of the inverse image for the input elements are uniformly distributed. The electronic signature method using the extended HFE function $F_t$(extended HFE signature method) will be described below.

<<Signature Generation Algorithm Sig for the Extended HFE Signature Method>>

The extended HFE signature method is an extension (hereinafter, referred to as an extension A) of the above HFE+PFDH signature method. The extended HFE signature method is characterized in that when one element x of the inverse image for some element of the codomain is selected regarding the center mapping f in the signature generation algorithm of the above HFE signature method, one element x of the inverse image is selected with a probability p proportional to the number of elements α thereof. That is, according to the extended HFE signature method, even if the inverse image regarding the center mapping f has the element x for some element y of the codomain, retake processing of the element y is performed with a probability of (1-p). Thus, by introducing the probability p proportional to the number of elements α of the inverse image for the element y of the codomain, the frequency of appearance becomes equal for all elements x of the inverse image. The extended HFE signature method will be described in detail below.

(Overview of the Signature Generation Algorithm Sig)

The signature generation algorithm Sig for the extended HFE signature method computes the electronic signature σ by the following Step. 1 to Step. 9 after the message M and the signature key sk being input (σ←Sig(sk,M)). The signature key sk is trapdoor S, T, $a_{ij}$, $b_i$, c of $F_t$ and the verification key pk is $F_t$. The definition of each symbol is the same as the definition used in the description of the HFE+PFDH signature method.

(Step. 1) Generate a random number r.

(Step. 2) Generate the hash value y←H(M,r) by using the random number r and the message M.

(Step. 3) Obtain y'=($y_0'$, . . . , $y_{n-1}'$)∈K″ by applying y=($y_0$, . . . , $y_{n-1}$)∈K″ to the inverse transformation $T^{-1}$ of the transformation T.

(Step. 4) Transform y'=($y_0'$, . . . , $y_{n-1}'$)∈K″ into Y'∈A by $\phi^{-1}$.

(Step. 5) Compute a set X'∈{Z∈A|f(Z)=Y'}.

(Step. 6) One element X' is selected from the set {Z∈A|f(Z)=Y'} with the probability of p=s*α (s is a proportionality coefficient independent of α and a selection probability per element) proportional to the number of elements |{Z∈A|f(Z)=Y'}|=α of the set and the processing returns to Step. 1 with the probability of (1-p) (if the number of elements α=0, the processing always returns to Step. 1).

(Step 7) Transform X'EA into x'=($x_0'$, . . . , $x_{n-1}'$)∈K″ by φ.

(Step. 8) Transform x'∈K″ into x=($x_0$, . . . , $x_{n-1}$)∈K″ by the transformation S.

(Step. 9) Output the electronic signature σ=(x,r).

A main difference between the extended HFE signature method and the HFE signature method is the configuration of Step. 6 described above. In the HFE signature method, if the number of elements α≥1, the processing always proceeds to Step. 7. In the extended HFE signature method, however, even if the number of elements α≥1, the processing returns to Step. 1 with the probability of (1-p). By adopting such a configuration, as shown in FIG. 8, if elements y of the codomain with the same probability are given, the element x of the inverse image for the given element y of the codomain has the same probability of appearance.

Figure 8:
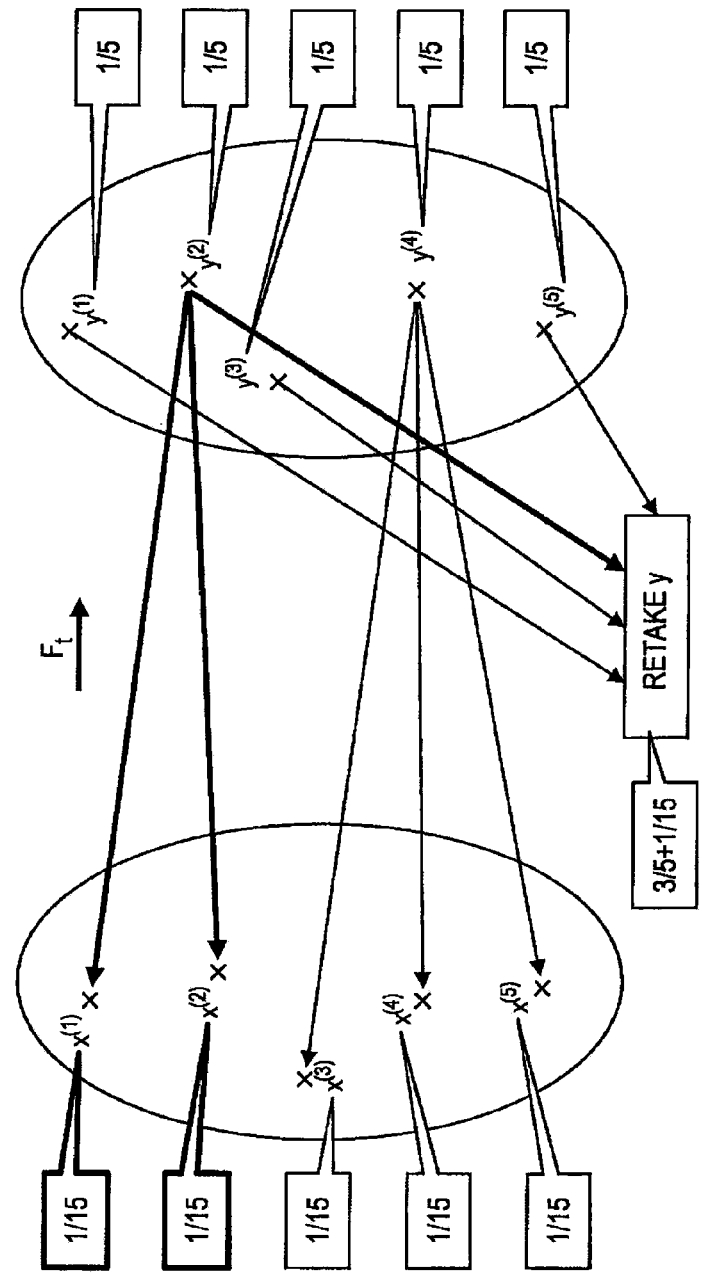
FIG. 8 is an explanatory view showing properties of the HFE function (extended HFE function) to which technology according to a first embodiment of the present invention is applied.

In the example of FIG. 8, $y^{(1)}$, . . . , $y^{(5)}$ are given with the probability of 1/5. Among these, the number of elements α of the inverse image for $y^{(1)}$, $y^{(3)}$, and $y^{(5)}$ is 0. The number of elements α of the inverse image for $y^{(2)}$ is 2. Therefore, if $y^{(2)}$ is input, one of the elements $x^{(1)}$, $x^{(2)}$ of the inverse image is selected with the probability p (p=α/3=2/3 in the example of FIG. 8) proportional to the number of elements α=2 of the inverse image for $y^{(2)}$. That is, the probability of selecting each of the elements $x^{(1)}$, $X^{(2)}$ of the inverse image for $y^{(2)}$ is $p/2*1/5=1/15$.

The number of elements α of the inverse image for $y^{(4)}$ is 3. Therefore, if $y^{(4)}$ is input, one of the elements $x^{(3)}$, $x^{(4)}$, $x^{(5)}$ of the inverse image is selected with the probability p (p=α/3=3/3 in the example of FIG. 8) proportional to the number of elements α=3 of the inverse image for $y^{(4)}$. Therefore, the probability of selecting each of the elements $x^{(3)}$, $X^{(4)}$, $X^{(5)}$ of the inverse image is $p/3*1/5=1/15$. That is, $x^{(1)}, \ldots, x^{(5)}$ have all the same probability of appearance of 1/15.

The probability of the element y of the codomain being retaken is $(1-2/3)*1/5=1/15$ when the element $y^{(2)}$ of the codomain is selected. Then, the probability of the element y of the codomain being retaken is $(1-3/3)*1/5=0$ when the element $y^{(4)}$ of the codomain is selected. Further, the element y of the codomain is retaken when the element $y^{(1)}$, $y^{(3)}$, or $y^{(5)}$ of the codomain is selected and the probability of the element y of the codomain being retaken is $1/15+0+3/5=2/3$ Thus, by applying the extended HFE signature method, the probability of appearance of the element x of the inverse image regarding the extended HFE function $F_t$ becomes uniform for elements of the codomain that are given uniformly. That is, the computational algorithm in the backward direction of the extended HFE function $F_t$ has a uniform distributive property of outputting elements of the inverse image distributed uniformly when elements of the codomain distributed uniformly are input. Therefore, safety from chosen-message attacks is not secured for the extended HFE signature method using the extended HFE function $F_t$.

The flow of processing in the signature generation algorithm Sig and the signature verification algorithm Ver of the extended HFE signature method will be put together below with reference to FIGS. 18 and 19.

(Details of the Signature Generation Algorithm Sig)

First, the flow of processing by the signature generation algorithm Sig of the extended HFE signature method will be described with reference to FIG. 18. FIG. 18 is an explanatory view showing the flow of processing by the signature generation algorithm Sig of the extended HFE signature method.

Figure 18:
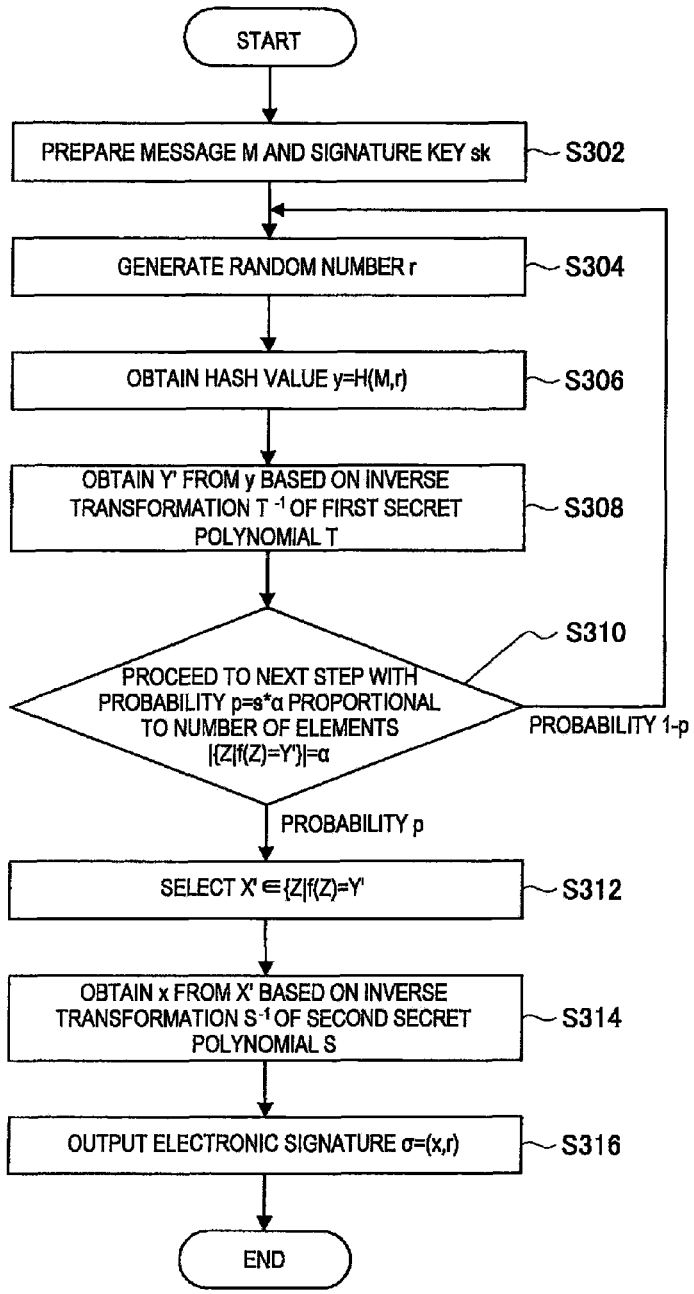
FIG. 18 is an explanatory view exemplifying the signature generation algorithm according to the first embodiment (extended HFE signature method) of the present invention.

As shown in FIG. 18, first the signatory 10 prepares the message M and signature key sk (S302) and inputs the message M and signature key sk into the signature generation algorithm Sig. Next, the signature generation algorithm Sig generates the random number r (S304). Next, the signature generation algorithm Sig computes the hash value y=H(M,r) by using the message M and the random number r (S306). Next, the signature generation algorithm Sig computes the element Y'∈A in the codomain of the center mapping f from the hash value y∈K″ based on the inverse transformation $T^{-1}$ of the transformation T (S308).

Next, the signature generation algorithm Sig computes X'∈{Z∈A|f(Z)=Y'} and proceeds to the processing in step S312 with the probability p proportional to the number of elements α of the set {Z∈A|f(Z)=Y'} (S310). The signature generation algorithm Sig returns the processing to step S304 with the probability of (1-p) (S310). If the processing proceeds to step S312, the signature generation algorithm Sig selects one element X' of the set {Z∈A|f(Z)=Y'} (S312).

Next, the signature generation algorithm Sig transforms the element X' selected in step S312 into x∈K″ based on the inverse transformation $S^{-1}$ of the transformation S (S314). Next, the signature generation algorithm Sig outputs the electronic signature σ=(x,r) (S316). The uniform distributive property of the extended HFE function $F_t$ is realized mainly by the branch processing based on the probability p in step S310.

(Details of the Signature Verification Algorithm Ver)

Next, the flow of processing by the signature verification algorithm Ver of the extended HFE signature method will be described with reference to FIG. 19. FIG. 19 is an explanatory view showing the flow of processing by the signature verification algorithm Ver of the extended HFE signature method.

Figure 19:
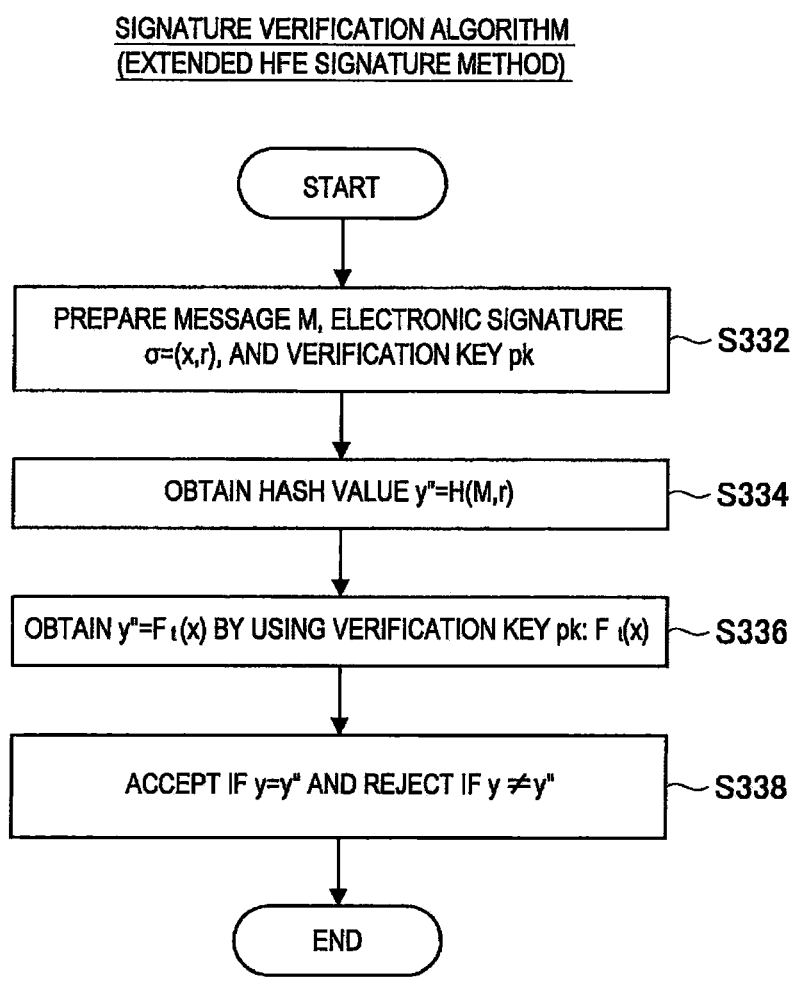
FIG. 19 is an explanatory view exemplifying the signature verification algorithm according to the first embodiment (extended HFE signature method) of the present invention.

As shown in FIG. 19, first the verifier 20 acquires the message M, the electronic signature σ=(M,r), and the verification key pk from the signatory 10 (S332) and inputs the message M, the electronic signature σ=(M,r), and the verification key pk into the signature verification algorithm Ver. Next, the signature verification algorithm Ver computes the hash value y=H(M,r) by using the random number r contained in the electronic signature σ and the message M (S334). Next, the signature verification algorithm Ver computes y″=$F_t$(x) by using the verification key pk(Ft) (S336). Next, the signature verification algorithm Ver accepts (outputs 1) if y=y″ and rejects (outputs 0) if y≠y″ (S338).

Thus, there is no significant difference of the flow of processing by the signature verification algorithm Ver between the extended HFE signature method and the HFE+PFDH signature method.

(Safety Certification of the Extended HFE Signature Method)

The safety of the extended HFE signature method can be certified by using, for example, a simulation called a reduction algorithm. In the HFE+PFDH signature method, as remarked in the description about the safety certification of the HFE+PFDH signature method shown in FIG. 29, the cause for not being able to secure safety from chosen-message attacks is that the element $x_j$ of the inverse image of the HFE function $F_t$ is not selected randomly for a randomly given element of the codomain in a Signing oracle simulation. In the extended HFE signature method, however, due to the uniform distributive property of the extended HFE function $F_t$, the element $x_j$ of the inverse image can randomly be selected by randomly giving the element y of the codomain. Thus, safety from chosen-message attacks is secured for the extended HFE signature method.

The extended HFE signature method according to the first embodiment of the present invention has been described. As described above, safety from chosen-message attacks is secured for the extended HFE signature method. The extended HFE signature method is based on the MPKC signature method that grounds safety on difficulty of solving a set of nonlinear polynomials selected randomly on some finite ring and also has resistance to tampering acts using a quantum computer. Like other MPKC signature methods, compared with the RSA signature method or the like, the extended HFE signature method also achieves an effect of needing a shorter signature length to secure equivalent safety.

3. Second Embodiment

Application Example to OV Signature Method

Next, the second embodiment of the present invention will be described. In the first embodiment described above, the HFE signature method is extended and the extended HFE signature method capable of securing safety from chosen-message attacks by improving the non-uniform distributive property of the HFE function is proposed. In the present embodiment, extended OV signature methods (a first extended OV signature method and a second extended OV signature method) capable of securing safety from chosen-message attacks by improving the non-uniform distributive property of an OV function will be proposed.

[3-1. Properties of OV Function]

Before describing an extended OV function, the definition of an OV function $F_t$ and properties of the OV function $F_t$ will briefly be described. For the sake of simplicity, the number of elements of the codomain of the OV function $F_t$ is set by using the number of elements o of an Oil variable.

<<Definition of Symbols>>

K: Finite ring $F_t$: Mapping $K^n \to K^o$ n: n=o+v ox: $ox=(ox_1, \ldots, ox_o)$: Oil variable vx: $vx=(vx_1, \ldots, vx_v)$: Vinegar variable F: $K^n \to K^o$, center mapping (see the formula (4) and formula (5) below)

S: Reversible affine transformation on $K^n$ (first secret polynomial transformation)

T: Reversible affine transformation on $K^o$ (second secret polynomial transformation)

trapdoor: S, T, $a_{ij}$, $b_{ij}$, $c_i$, $d_i$, e

[Math 3]

$$F = \sum_{i=1}^{o}\sum_{j=1}^{v} a_{ij} ox_i vx_j + \sum_{i=1}^{v}\sum_{j=1}^{v} b_{ij} vx_i vx_j + \sum_{i=1}^{o} c_i ox_i + \sum_{i=1}^{v} d_i vx_i + e \quad (4)$$

$$F(ox_1, \ldots, ox_o, vx_1, \ldots, vx_v) = (f_1, \ldots, f_o) \quad (5)$$

where $a_{ij}$, $b_{ij}$, $c_i$, $d_i$, e∈K and $f_1, \ldots, f_o$ ∈K[$ox_1, \ldots, ox_o, vx_1, \ldots, vx_v$]

<<Structure of the OV Function $F_t$>>

The OV function $F_t$ is represented as composite mapping $F_t=T*F*S$ of mapping by the transformation S, center mapping F, and mapping by the transformation T (* is a direct product). The algorithm to compute $y=F_t(x)$ is as follows:

(Step. 1) Transform given $x=(x_1, \ldots, x_n)\in K^n$ into ov=$(ox_1, \ldots, ox_o, vx_1, \ldots, vx_v)\in K^n$ by the transformation S.

(Step. 2) Transform ov=$(ox_1, \ldots, ox_o, vx_1, \ldots, vx_v)$ into $y'=(y_1', \ldots, y_o')\in K^o$ by the center mapping $F(ox_1, \ldots, ox_o, vx_1, \ldots, vx_v)$.

(Step. 3) Transform $y'\in K^o$ into $y=(y_1, \ldots, y_o)\in K^o$ by the transformation T.

(Step. 4) Output $y\in K^o$.

Figure 9:
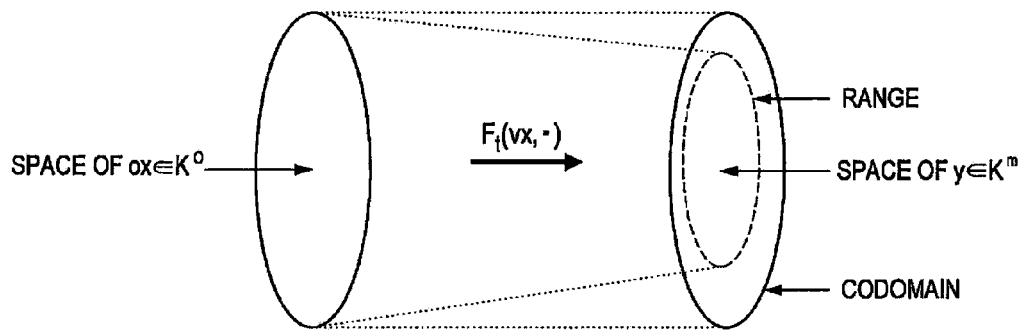
FIG. 9 is an explanatory view showing properties of an OV function.

As shown in the above formulas (4) and (5), the OV function $F_t$ contains the center mapping F based on a non-linear multivariable polynomial. Thus, the inverse image $\{z\in K^o | F(z)=y'\}$ corresponding to a set of roots of the multivariable polynomial may have no element for some element y' of the codomain $K^n$. In this case, an element of the codomain for which the inverse image $\{z\in K | F(z)=y'\}$ contains no element is not contained in the range and therefore, as shown in FIG. 9, the codomain and the range are different. Due to the above property, elements of the domain obtained by a backward direction operation of the OV function $F_t$ are not distributed uniformly even if elements of the codomain are input uniformly.

The computational algorithm of the OV function $F_t$ will be described in more detail below.

<<Computational Algorithm in the Forward Direction>>

The computational algorithm in the forward direction for the OV function $F_t$ includes a step of obtaining $y=F_t(x)\in K^o$ by substituting given $x\in K^n$ into the OV function $F_t(x)$. If one element x of the domain is input into the computational algorithm in the forward direction, one element y of the range is output.

<<Computational Algorithm in the Backward Direction>>

If the set of the Vinegar variable vx is denoted as V, the domain of the OV function $F_t$ is denoted as $A_1$, and the codomain thereof is denoted as $A_2$, the OV function $F_t$ can be represented as $F_t: A_1 \times V \to A_2$, $(x,vx) \to F_t(x,vx)$. Using such a representation, the computational algorithm in the backward direction of the OV function $F_t$ is executed in two steps of (S1) fixing the Vinegar variable vx and (S2) computing the function $F_t(\bullet,vx): A_1 \to A_1$, $x \to F(x,vx)$ in which the Vinegar variable vx is fixed. More specifically, the computational algorithm in the backward direction for the OV function $F_t$ includes the following Step. 1 to Step. 5.

(Step. 1) Obtain $y'=(y_1', \ldots, y_o')\in K^o$ by applying given $y=(y_1, \ldots, y_o)\in K^o$ to the inverse transformation $T^{-1}$ of the transformation T.

(Step. 2) Select the Vinegar variable $vx=(vx_1, \ldots, vx_v)\in K^v$ randomly.

(Step. 3) Compute the Oil variable $ox=(ox_1, \ldots, ox_o)$ satisfying $F(ox_1, \ldots, ox_o, vx_1, \ldots, vx_v)=(y_1, \ldots, y_o)$ by using $y'=(y_1', \ldots, y_o')\in K^o$ and the Vinegar variable $vx\in K^v$. If no solution exists, return to Step. 2 to re-select the Vinegar variable vx.

(Step. 4) Obtain $x=(x_1, \ldots, x_n)\in K^n$ by applying the inverse transformation $S^{-1}$ of the transformation S to $x'=(ox_1, \ldots, ox_o, vx_1, \ldots, vx_v)\in K^n$ constituted of the Oil variable $ox\in K^o$ and the Vinegar variable $vx\in K^v$.

(Step. 5) Output $x\in K^n$.

In the above Step. 3, the inverse image $\{z\in K | F(z,vx)=y\}$ regarding the center mapping F may have no element at all. In such a case, the Vinegar variable vx is retaken by returning to the processing in Step. 2. However, the magnitude of range of the OV function $F_t$ changes depending on the Vinegar variable vx. Thus, even if elements of the codomain having a uniform distribution are input into the OV function $F_t$, output values of the computational algorithm in the backward direction do not have a uniform distribution. If such a bias of the distribution exists, there is a danger that information about the structure of the OV function $F_t$ may be leaked by chosen-message attacks. Thus, to secure safety from chosen-message attacks, a contrivance to correct such a distribution bias is needed.

[3-2. OV Signature Method]

Heretofore, the OV function $F_t$ has been described. Next, the electronic signature method using the OV function $F_t$ (OV signature method) will be described. Here, the FDH signature method using the OV function (OV+FDH signature method) will be described as an example of the OV signature method.

<<OV+FDH Signature Method>>

The signature generation algorithm Sig and the signature verification algorithm Ver in the OV+FDH signature method will be described. In the OV+FDH signature method, the signature key sk is set to trapdoor S, T, $a_{ij}$, $b_i$, $c_i$, $d_i$, e of $F_t$ and the verification key pk is set to $F_t$.

(Signature Generation Algorithm Sig (Computational Algorithm in the Backward Direction))

The signature generation algorithm Sig computes the electronic signature σ by the following Step. 1 to Step. 6 after the message M and the signature key sk being input (σ←Sig(sk, M)).

(Step. 1) Compute the hash value $y\in K^o \leftarrow H(M)$ by using the message M.

(Step. 2) Obtain $y'=(y_1', \ldots, y_o')\in K^o$ by applying $y=(y_1, \ldots, y_o)\in K^o$ to the inverse transformation $T^{-1}$ of the transformation T.

(Step. 3) Select the Vinegar variable $vx=(vx_1, \ldots, vx_v)\in K^v$ randomly.

(Step. 4) Compute the Oil variable $ox=(ox_1, \ldots, ox_o)$ satisfying $F(ox_1, \ldots, ox_o, vx_1, \ldots, vx_v)=(y_1, \ldots, y_o)$ by using y'∈K° and the Vinegar variable vx∈K$^V$. If no solution exists, return to Step. 3 to retake the Vinegar variable.

(Step. 5) Obtain x=(x$_1$, . . . , x$_n$)∈K$^n$ by applying the inverse transformation S$^{-1}$ of the transformation S to x'=(ox$_1$, . . . , ox$_o$, vx$_1$, . . . , vx$_v$)∈K$^n$ constituted of the Oil variable ox∈K° and the Vinegar variable vx∈K$^V$.

(Step. 6) Output the electronic signature σ=x.

(Signature Verification Algorithm Ver (Computational Algorithm in the Forward Direction))

The signature verification algorithm Ver verifies authenticity of the electronic signature σ for the message M by the following Step. 1 to Step. 3 after the verification key pk=F$_t$, the message M, and the electronic signature σ=x being input (0/1←Ver(pk,M,σ)).

(Step. 1) Compute the hash value y←H(M) by using the message M.

(Step. 2) Obtain y" by substituting x=(x$_1$, . . . , x$_n$)∈K$^n$ contained in the electronic signature σ into the OV function F$_t$.

(Step. 3) Output 1 if y=y" and output 0 if y≠y".

<<Characteristics of OV+FDH Signature Method>>

In the OV+FDH signature method, the inverse image of the OV function F$_t$ may have no element for some element of the codomain. Thus, as shown in FIG. 10, the codomain and the range of the OV function F$_t$ do not match. If the inverse image has no element for some element of the codomain, the computational algorithm in the backward direction of the OV function F$_t$ re-selects the Vinegar variable randomly. However, the Vinegar variable greatly depends on the magnitude of range for the Oil variable ox of the OV function F$_t$. Thus, as shown in FIG. 10, the magnitude of range of the OV function F$_t$ changes depending on how the Vinegar variable vx is taken.

In the example of FIG. 10, F$_t$(vx$^{(1)}$,•) has a larger range than F$_t$(vx$^{(2)}$,•). In this case, if elements of the codomain are uniformly input, F$_t$(vx$^{(1)}$,•) has a lower probability of returning to Step. 3 in Step. 4 of the computational algorithm in the backward direction. That is, the probability of appearance of the Vinegar variable vx$^{(1)}$ increases, creating a bias of the distribution of input and output in the computational algorithm in the backward direction of the OV signature method. Thus, the inventors of the present application devised a method (extended OV signature method) of improving such a bias of the distribution. The extended OV signature method will be described below, but the flow of processing in the signature generation algorithm Sig and the signature verification algorithm Ver of the OV+FDH signature method will be put together here.

(Details of the Signature Generation Algorithm Sig)

Figure 16:
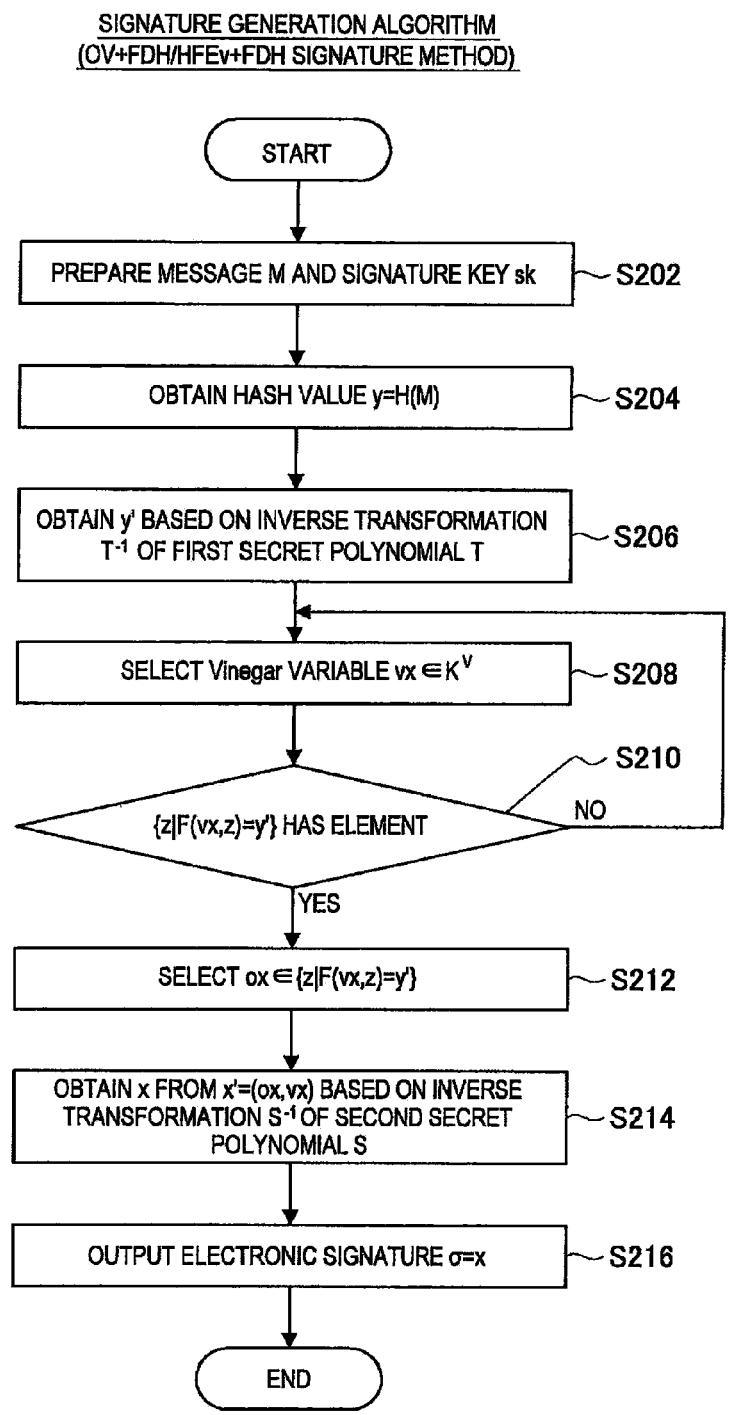
FIG. 16 is an explanatory view exemplifying the signature generation algorithm according to the FDH signature method based on the OV/HFEv function.

First, the flow of processing by the signature generation algorithm Sig of the OV+FDH signature method will be described with reference to FIG. 16. FIG. 16 is an explanatory view showing the flow of processing by the signature generation algorithm Sig of the OV+FDH signature method.

As shown in FIG. 16, first the signatory 10 prepares the message M and signature key sk (S202) and inputs the message M and signature key sk into the signature generation algorithm Sig. Next, the signature generation algorithm Sig computes the hash value y=H(M) by using the message M (S204). Next, the signature generation algorithm Sig computes the element y'∈K° in the codomain of the center mapping F from the hash value y∈K° based on the inverse transformation T$^{-1}$ of the transformation T (S206). Next, the signature generation algorithm Sig selects the Vinegar variable vx∈K$^V$ (S208).

Next, the signature generation algorithm Sig computes ox∈{z∈K°|F(z,vx)=y'} to determine whether the set {z∈K°|F(z,vx)-y'} has any element (S210). If the set {z∈K°|F(z,vx)= y'} has an element, the signature generation algorithm Sig proceeds to the processing in step S212. On the other hand, if the set {z∈K°|F (z,vx)=y'} has no element, the signature generation algorithm Sig returns to the processing in step S208. If the processing proceeds to step S212, the signature generation algorithm Sig selects one element ox of the set {z∈K°|F (z,vx)=y'} (S212).

Next, the signature generation algorithm Sig transforms the element x'=(ox$_1$, . . . , ox$_o$, vx$_1$, . . . , vx$_V$) constituted of the element ox selected in step S212 and the Vinegar variable vx selected in step S208 into x∈K$^n$ based on the inverse transformation S$^{-1}$ of the transformation S (S214). Next, the signature generation algorithm Sig outputs the electronic signature σ=x (S216). The non-uniform distributive property of the OV function F$_t$ is mainly caused by the retake processing of the Vinegar variable in steps S210 and S208.

(Details of the Signature Verification Algorithm Ver)

Figure 17:
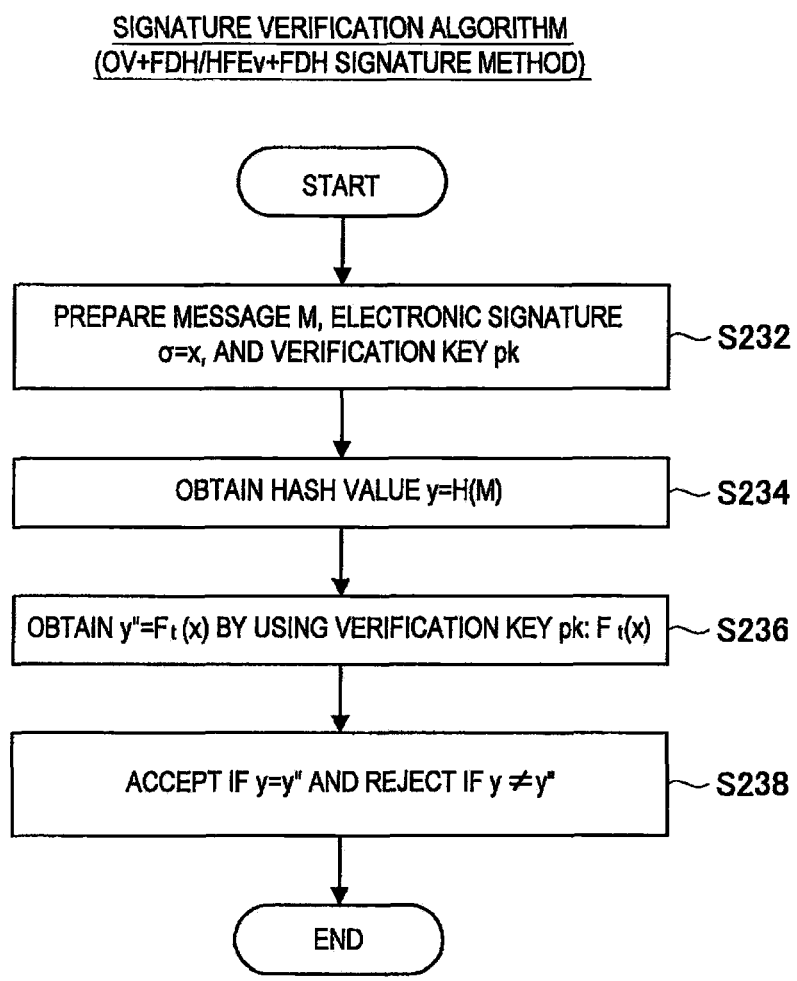
FIG. 17 is an explanatory view exemplifying the signature verification algorithm according to the FDH signature method based on the OV/HFEv function.

Next, the flow of processing by the signature verification algorithm Ver of the OV+FDH signature method will be described with reference to FIG. 17. FIG. 17 is an explanatory view showing the flow of processing by the signature verification algorithm Ver of the OV+FDH signature method.

As shown in FIG. 17, first the verifier 20 acquires the message M, the electronic signature σ=x, and the verification key pk from the signatory 10 (S232) and inputs the message M, the electronic signature o=x, and the verification key pk into the signature verification algorithm Ver. Next, the signature verification algorithm Ver computes the hash value y=H (M) by using the message M (S234). Next, the signature verification algorithm Ver computes y"=F$_t$(x) by using the verification key pk (F$_t$) (S236). Next, the signature verification algorithm Ver accepts (outputs 1) if y=y" and rejects (outputs 0) if y≠y" (S238).

(Safety Certification of the OV+FDH Signature Method)

Figure 30:
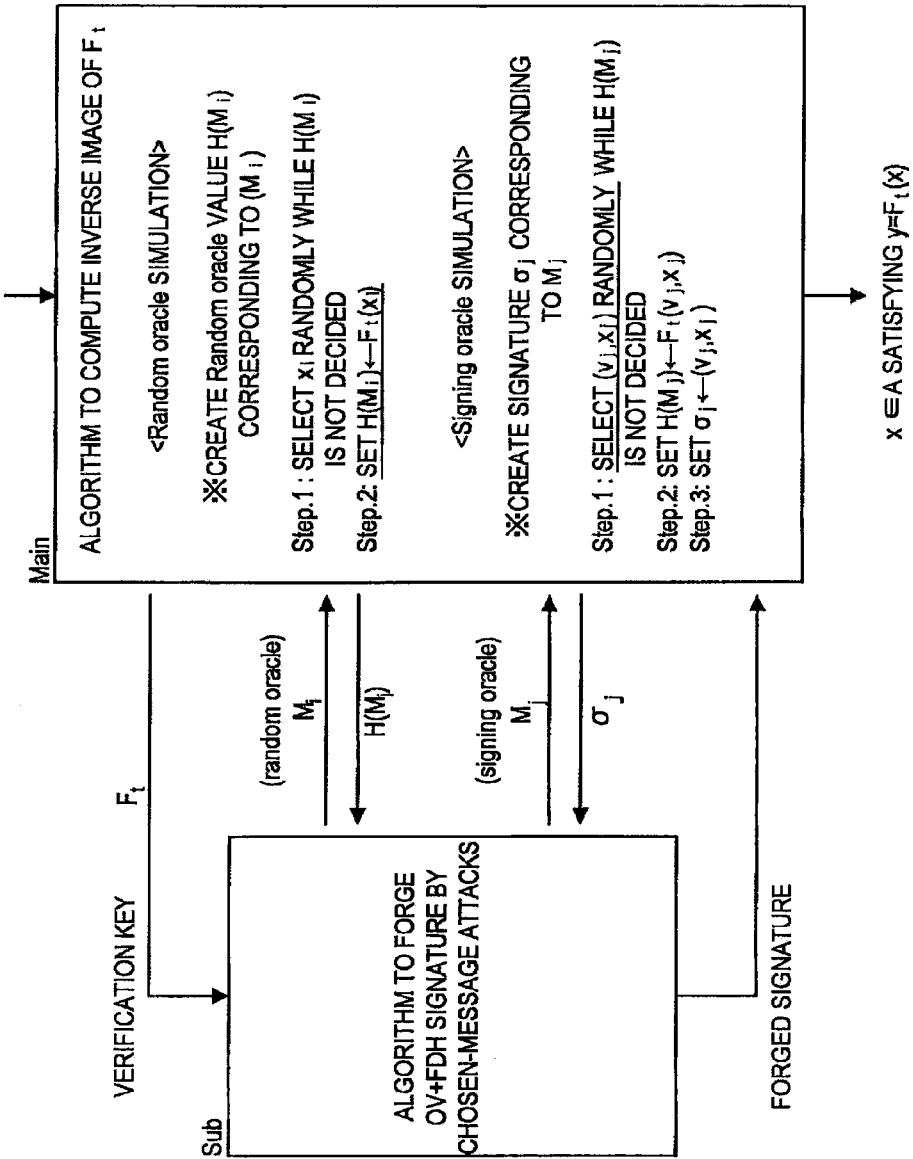
FIG. 30 is an explanatory view providing an overview of safety certification of the FDH signature method based on the OV function.

Next, the safety certification of the OV+FDH signature method will briefly be considered with reference to FIG. 30. The safety of the OV+FDH signature method is normally certified by a simulation as shown in FIG. 30. In the simulation, Step. 2 of the Random oracle simulation and Step. 1 of the Signing oracle simulation have a problem. In Step. 2 of the Random oracle simulation, F$_t$(x$_j$) may not be uniformly distributed even if x$_j$ is randomly selected. Also in Step. 1 of the Signing oracle simulation, (v$_j$, x$_j$) are assumed to be selected randomly, but (v$_j$, x$_j$) are actually not random because the magnitude of range of the OV function depends on the Vinegar variable (here, v$_j$). Thus, safety from chosen-message attacks is not secured for the HFE signature method.

[3-3. First Extended OV Signature Method]

Thus, the inventors of the present application improved the computational algorithm in the backward direction of the OV function F$_t$ and devised the one-way function with trapdoor F$_t$ (hereinafter, referred to as a first extended OV function F$_t$) such that if elements in the codomain having a uniform distribution are input, elements of the inverse image for the input elements are uniformly distributed. The electronic signature method using the first extended OV function F$_t$ (hereinafter, referred to as a first extended OV signature method) will be described below.

The first extended OV signature method is an extension (hereinafter, referred to as an extension B) of the above OV+FDH signature method. The first extended OV signature method is devised to re-select the element y of the codomain, instead of retaking the Vinegar variable vx, if, as shown in FIG. 11, the inverse image regarding the center mapping F in which the Vinegar variable vx is fixed has no element for some element of the codomain. The element y of the codomain does not affect the magnitude of range of the center mapping F. Thus, by applying the first extended OV signature method, the distribution of the Vinegar variable vx output from the center mapping F can be made uniform. As a result, the first extended OV function $F_t$ has the uniform distributive property. The first extended OV signature method will be described in detail below.

(Overview of the signature generation algorithm Sig)

The signature generation algorithm Sig for the first extended OV signature method computes the electronic signature σ by the following Step. 1 to Step. 7 after the message M and the signature key sk being input (σ←Sig(sk,M)). The signature key sk is trapdoor S, T, $a_{ij}$, $b_{ij}$, $c_i$, $d_i$, e of $F_t$ and the verification key pk is $F_t$. The definition of each symbol is the same as the definition used in the description of the OV+FDH signature method.

(Step. 1) Select the Vinegar variable vx=($vx_1, \ldots, vx_v$)∈$K^v$ randomly.

(Step. 2) Generate the random number r.

(Step. 3) Compute the hash value y∈$K^\circ$←H(r,M) by using the random number r and the message M.

(Step. 4) Obtain y'=($y_0', \ldots, y_o'$)∈$K^\circ$ by applying y=($y_1, \ldots, y_o$)∈$K^\circ$ to the inverse transformation $T^{-1}$ of the transformation T.

(Step. 5) Compute the Oil variable ox=($ox_1, \ldots, ox_o$) satisfying F($ox_1, \ldots, ox_o, vx_1, \ldots, vx_v$)=($y_1, \ldots, y_o$) by using y'∈$K^\circ$ and the Vinegar variable vx∈$K^v$. If no solution exists, return to Step. 2 to retake the random number r.

(Step. 6) Obtain x-($x_1, \ldots, x_n$)∈$K^n$ by applying the inverse transformation $S^{-1}$ of the transformation S to x'=($ox_1, \ldots, ox_o, vx_1, \ldots, vx_v$)∈$K^n$ constituted of the Oil variable ox∈$K^\circ$ and the Vinegar variable vx∈$K^v$.

(Step. 7) Output the electronic signature σ=(x,r).

A main difference between the first extended OV signature method and the OV+FDH signature method is the configuration of Step. 5 described above. In the OV+FDH signature method, if no solution of F($ox_1, \ldots, ox_o, vx_1, \ldots, vx_v$)=($y_1, \ldots, y_o$) is obtained, retake processing of the Vinegar variable vx is performed. In the first extended OV signature method, however, the Vinegar variable vx is fixed in Step. 1 and the element y' of the codomain of the center mapping F is retaken. The retake of the element y' does not affect the magnitude of the range so that no bias is caused in the probability of appearance of the Vinegar variable vx. In the first extended OV signature method, moreover, the random number r is introduced like the PFDH signature method to enable the retake of the element y' for the same message M. By forming the configuration as described above, the first extended OV signature method has the uniform distributive property to secure safety from chosen-message attacks.

The flow of processing in the signature generation algorithm Sig and the signature verification algorithm Ver of the first extended OV signature method will be put together below with reference to FIGS. 22 and 23.

(Details of the Signature Generation Algorithm Sig)

First, the flow of processing by the signature generation algorithm Sig of the first extended OV signature method will be described with reference to FIG. 22. FIG. 22 is an explanatory view showing the flow of processing by the signature generation algorithm Sig of the extended OV signature method.

Figure 22:
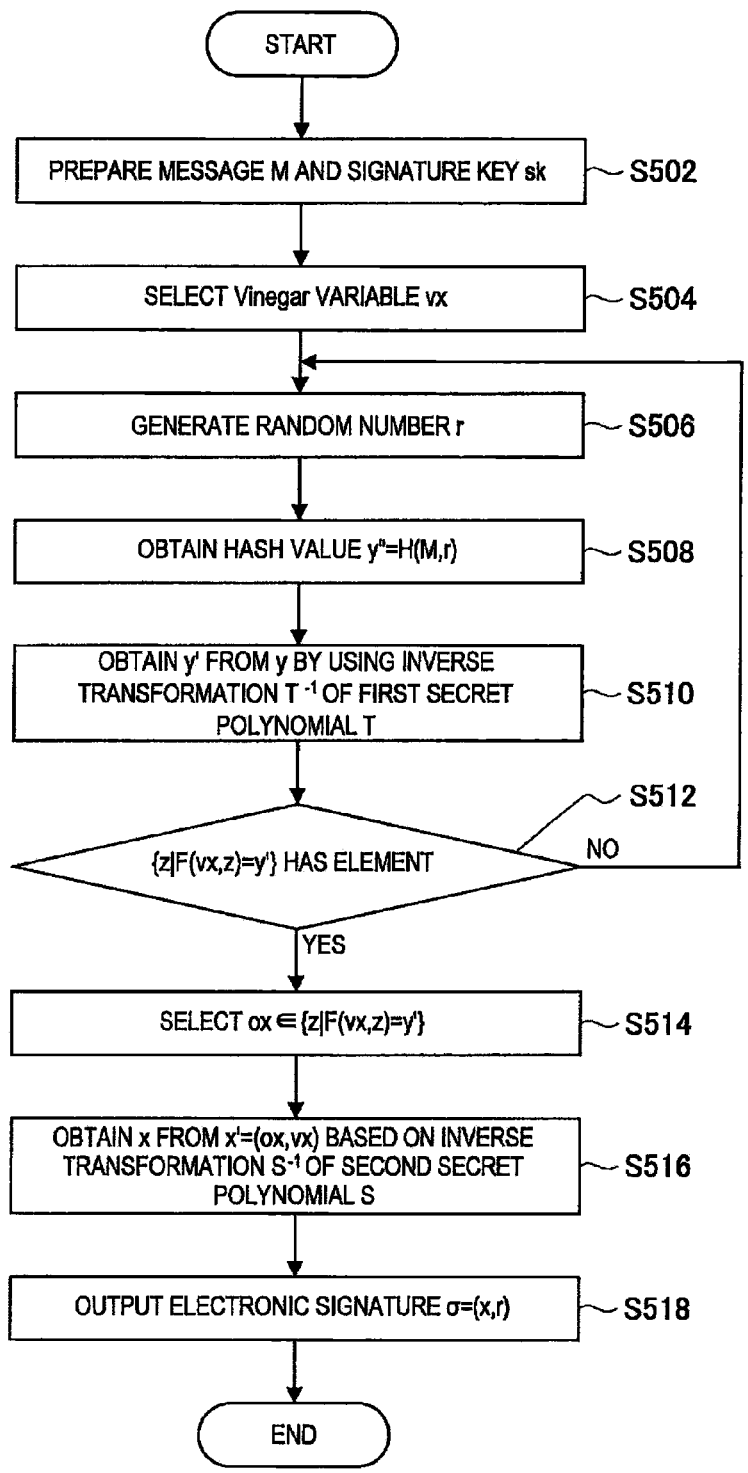
FIG. 22 is an explanatory view exemplifying the signature generation algorithm according to the second embodiment (first extended OV signature method) of the present invention.

As shown in FIG. 22, first the signatory 10 prepares the message M and signature key sk (S502) and inputs the message M and signature key sk into the signature generation algorithm Sig. Next, the signature generation algorithm Sig randomly selects the Vinegar variable vx (S504). Next, the signature generation algorithm Sig generates the random number r (S506). Next, the signature generation algorithm Sig computes the hash value y=H(M,r) by using the message M and the random number r (S508). Next, the signature generation algorithm Sig computes the element y'∈$K^\circ$ in the codomain of the center mapping F from the hash value y∈$K^\circ$ based on the inverse transformation $T^{-1}$ of the transformation T (S510).

Next, the signature generation algorithm Sig computes ox∈{z∈$K^\circ$|F (z,vx)=y'} to determine whether the set {z∈$K^\circ$|F (z,vx)=y'} has any element (S512). If the set {z∈K|F(z,vx)= y'} has an element, the signature generation algorithm Sig proceeds to the processing in step S514. On the other hand, if the set {z∈$K^\circ$|F(z,vx)=y'} has no element, the signature generation algorithm Sig returns to the processing in step S506. If the processing proceeds to step S514, the signature generation algorithm Sig selects one element ox of the set {z∈$K^\circ$|F (z,vx)=y'} (S514).

Next, the signature generation algorithm Sig transforms the element x'=($ox_1, \ldots, ox_o, vx_1, \ldots, vx_v$) constituted of the element ox selected in step S514 and the Vinegar variable vx selected in step S504 into x∈$K^n$ based on the inverse transformation $S^{-1}$ of the transformation S (S516). Next, the signature generation algorithm Sig outputs the electronic signature σ=x (S518). The uniform distributive property of the first extended OV function $F_t$ is realized by re-selecting the random number r in step S506 without retaking the Vinegar variable vx when {z∈K|F(z,vx)=y'} has no element in step S512.

(Details of the Signature Verification Algorithm Ver)

Next, the flow of processing by the signature verification algorithm Ver of the first extended OV signature method will be described with reference to FIG. 23. FIG. 23 is an explanatory view showing the flow of processing by the signature verification algorithm Ver of the extended OV signature method.

Figure 23:
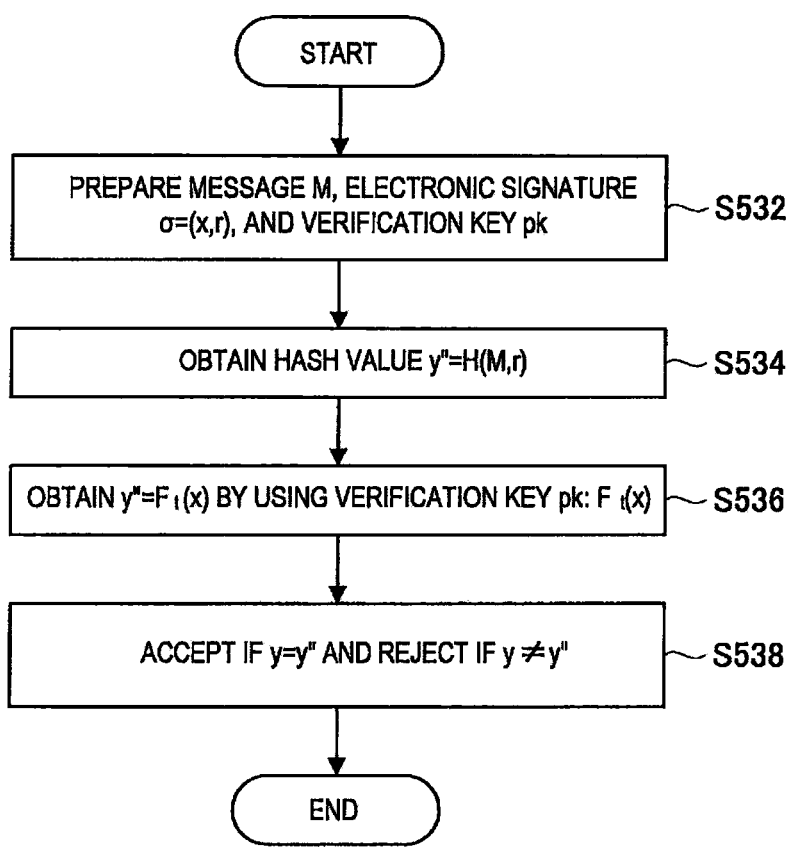
FIG. 23 is an explanatory view exemplifying the signature verification algorithm according to the second embodiment (first extended OV signature method) of the present invention.

As shown in FIG. 23, first the verifier 20 acquires the message M, the electronic signature σ=(M,r), and the verification key pk from the signatory 10 (S532) and inputs the message M, the electronic signature σ=(M,r), and the verification key pk into the signature verification algorithm Ver. Next, the signature verification algorithm Ver computes the hash value y=H(M,r) by using the random number r contained in the electronic signature σ and the message M (S534). Next, the signature verification algorithm Ver computes y"=$F_t$(x) by using the verification key pk ($F_t$) (S536). Next, the signature verification algorithm Ver accepts (outputs 1) if y=y" and rejects (outputs 0) if y≠y" (S538).

Thus, there is no significant difference of the flow of processing by the signature verification algorithm Ver between the first extended OV signature method and the OV+FDH signature method. However, the first extended OV signature method has the random number r introduced thereinto and is different from the OV+FDH signature method in that the random number r is used for signature verification.

The first extended OV signature method according to the second embodiment of the present invention has been described.

[3-4. Second Extended OV Signature Method]

Heretofore, the first extended OV signature method enabled to secure safety from chosen-message attacks by improving the non-uniform distributive property of the OV+FDH signature method has been described. The first extended OV signature method is a method devising the computational algorithm in the backward direction of the OV function $F_t$. Here, other contrivances (hereinafter, referred to as second extended OV signature methods) to improve the non-uniform distributive property of the OV+FDH signature method will be described.

The non-uniform distributive property of the OV+FDH signature method is caused by the retake of the Vinegar variable vx when no solution of the center mapping F(vx,•) in which the Vinegar variable vx is fixed exists. To avoid such a problem, the inventors of the present application proposed a contrivance to avoid the retake of the Vinegar variable vx as the first extended OV signature method. However, the problem of the OV+FDH signature method does not arise if the probability with which no solution of the center mapping F(vx,•) in which the Vinegar variable vx is fixed exists is negligibly small. Thus, as the second extended OV signature method, the inventors of the present application devised contrivances to make the probability with which no solution of the center mapping F(vx,•) in which the Vinegar variable vx is fixed exists is negligibly small.

(Contrivance 1)

In the above description, for the sake of simplicity, the number of elements m of the codomain of the OV function $F_t$ and the number of elements o of the Vinegar variable vx are set to be equal. According to this setting (m=o), the probability with which no solution of the center mapping F(vx,•) in which the Vinegar variable vx is fixed exists is sufficiently high. However, the probability of no solution can be made negligibly small by imposing conditions represented by the following formula (5) on m: It is assumed that β is such that $q^{-\beta}$ is negligibly small (($q^{-\beta} \ll 1$)) for the number of elements q of K.

[Math 4]

$$n \geq m + \beta \quad (6)$$

(Contrivance 2)

In addition, by devising the configuration of the center mapping F as described below, the probability with which no solution of the center mapping F(vx,•) in which the Vinegar variable vx is fixed exists can be made negligibly small. First, the center mapping F is represented as shown in the following formula (8) by using an m×n matrix L showing in the following formula (7). In addition, the m×n matrix L is represented as shown in the following formula (9) by using matrices $L_1$, $L_2$, $L_3$. The matrices $L_1$, $L_3$ are non-singular matrices. The matrix $L_2$ is an upper triangular matrix or a lower triangular matrix having functions $a_{ij}(vx)v$ of vx as elements and 1 as diagonal components. By adopting the above representations, L becomes regular for any vx. Incidentally, L may be represented by using a plurality of matrices having properties equivalent to properties of the matrix $L_2$.

[Math 5]

$$L(vx_1, \ldots, vx_v) = \begin{bmatrix} l_{1,1}(vx_1, \ldots, vx_v) & \cdots & l_{1,n}(vx_1, \ldots, vx_v) \\ \vdots & \ddots & \vdots \\ l_{m,1}(vx_1, \ldots, vx_v) & \cdots & l_{m,n}(vx_1, \ldots, vx_v) \end{bmatrix} \quad (7)$$

$$F(ox_1, \ldots, ox_o, vx_1, \ldots, vx_v) = \quad (8)$$
$$L(vx_1, \ldots, vx_v)(ox_1, \ldots, ox_o)^T + g(vx_1, \ldots, vx_v)$$

$$L(vx_1, \ldots, vx_v) = L_1 \times L_2(vx_1, \ldots, vx_v) \times L_3 \quad (9)$$

(Computational Algorithm (when Contrivance 1 or Contrivance 2 is Applied))

The signature generation algorithm Sig and the signature verification algorithm Ver of the OV signature method devised as described above (second extended OV signature method) are as follows:

<<Definition of Symbols>>

K: Finite ring
$F_t$: Mapping $K^n \to K^m$
n: n=o+v
ox: ox=$(ox_1, \ldots, ox_o)$: Oil variable
vx: vx=$(vx_1, \ldots, vx_v)$: Vinegar variable
F: Mapping $K^n \to K^m$, center mapping (see the above formula (10) and formula (11))
S: Reversible affine transformation on $K^n$ (first secret polynomial transformation)
T: Reversible affine transformation on $K^m$ (second secret polynomial transformation)

[Math 6]

$$F = \sum_{i=1}^{o}\sum_{j=1}^{v} a_{ij} ox_i vx_j + \sum_{i=1}^{v}\sum_{j=1}^{v} b_{ij} vx_i vx_j + \sum_{i=1}^{o} c_i ox_i + \sum_{i=1}^{v} d_i vx_i + e \quad (10)$$

$$F(ox_1, \ldots, ox_o, vx_1, \ldots, vx_v) = (f_1, \ldots, f_m) \quad (11)$$

where $a_{ij}$, $b_{ij}$, $c_i$, $d_i$, $e \in K$ and $f_1, \ldots, f_m \in K[ox_1, \ldots, ox_o, vx_1, \ldots, vx_v]$ <<Signature Generation Algorithm Sig>>

Figure 26:
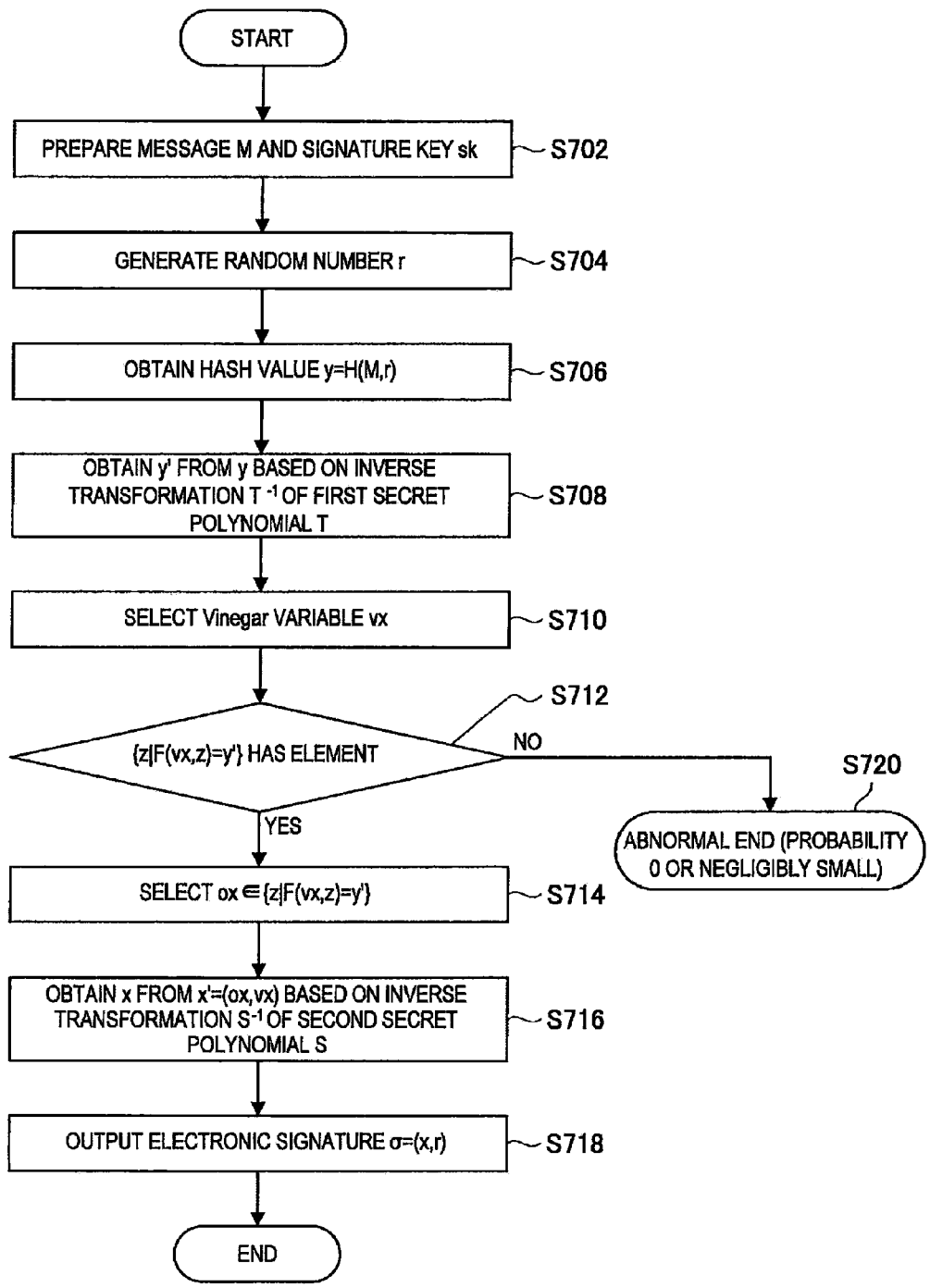
FIG. 26 is an explanatory view exemplifying the signature generation algorithm according to the second embodiment (second extended OV signature method) of the present invention.

The flow of processing by the signature generation algorithm Sig of the second extended OV signature method will be described with reference to FIG. 26. FIG. 26 is an explanatory view showing the flow of processing by the signature generation algorithm Sig of the second extended OV signature method.

As shown in FIG. 26, first the signatory 10 prepares the message M and signature key sk (S702) and inputs the message M and signature key sk into the signature generation algorithm Sig. Next, the signature generation algorithm Sig selects the random number r (S704). Next, the signature generation algorithm Sig computes the hash value y=H(M,r) by using the message M (S706). Next, the signature generation algorithm Sig computes the element y'∈$K^m$ in the codomain of the center mapping F from the hash value y∈$K^m$ based on the inverse transformation $T^{-1}$ of the transformation T (S708). Next, the signature generation algorithm Sig selects the Vinegar variable vx∈$K^v$ (S710).

Next, the signature generation algorithm Sig computes ox∈{z∈$K^o$|F(z,vx)=y'} to determine whether the set {z∈$K^o$|F(z,vx)=y'} has any element (S712). If the set {z∈K|F(z,vx)=y'} has an element, the signature generation algorithm Sig proceeds to the processing in step S714. On the other hand, if the set {z∈$K^o$|F(z,vx)=y'} has no element, the signature generation algorithm Sig proceeds to the processing in step S720 to end abnormally (S720). Note that in the second extended OV signature method, the processing proceeds to step S720 with a negligibly small probability or a probability of 0 due to the above contrivances, If the processing proceeds to step S714, the signature generation algorithm Sig selects one element ox of the set {z∈$K^o$|F(z,vx)=y'} (S714). Next, the signature generation algorithm Sig transforms the element x'=$(ox_1, \ldots, ox_o, vx_1, \ldots, vx_v)$ constituted of the element ox selected in step S714 and the Vinegar variable vx selected in step S710 into x∈$K^n$ based on the inverse transformation $S^{-1}$ of the transformation S (S716). Next, the signature generation algorithm Sig outputs the electronic signature σ=(x,r) (S718). The uniform distributive property of the second extended OV function $F_t$ is realized by not proceeding to step S720 in the branch processing in step S712.

<<Signature Verification Algorithm Ver>>

Figure 27:
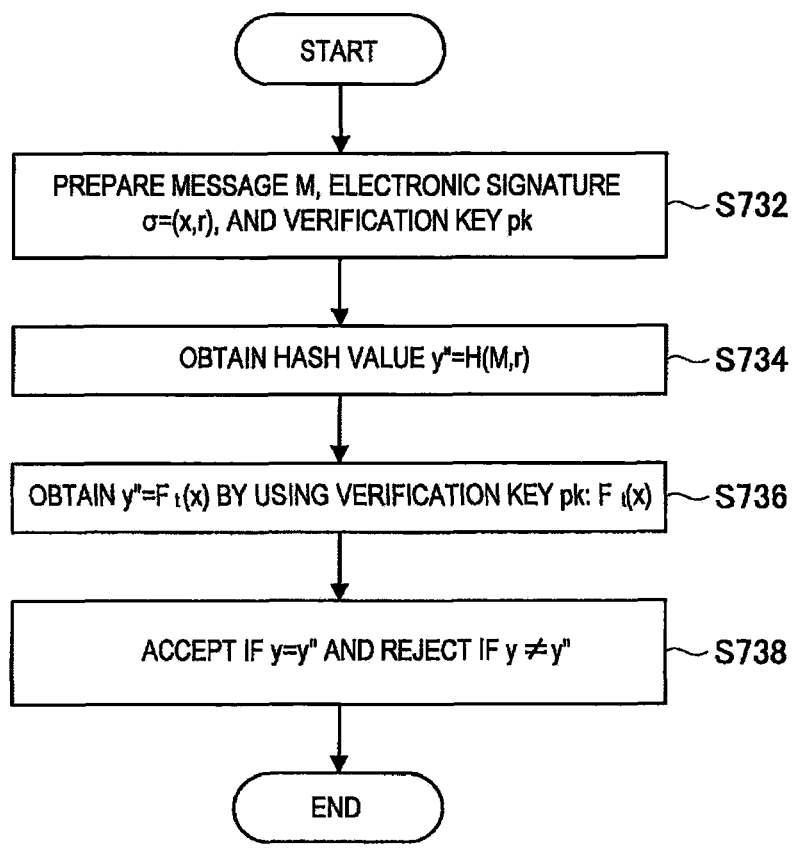
FIG. 27 is an explanatory view exemplifying the signature verification algorithm according to the second embodiment (second extended OV signature method) of the present invention.

Next, the flow of processing by the signature verification algorithm Ver of the second extended OV signature method will be described with reference to FIG. 27. FIG. 27 is an explanatory view showing the flow of processing by the signature verification algorithm Ver of the second extended OV signature method.

As shown in FIG. 27, first the verifier 20 acquires the message M, the electronic signature σ=(x,r), and the verification key pk from the signatory 10 (S732) and inputs the message M, the electronic signature σ=(M,r), and the verification key pk into the signature verification algorithm Ver. Next, the signature verification algorithm Ver computes the hash value y=H(M,r) by using the message M (S734). Next, the signature verification algorithm Ver computes y"=$F_t$(x) by using the verification key pk(Ft) (S736). Next, the signature verification algorithm Ver accepts (outputs 1) if y=y" and rejects (outputs 0) if y≠y" (S738).

The second extended OV signature method according to the second embodiment of the present invention has been described.

The second embodiment of the present invention relates to, as described above, contrivances to improve the non-uniform distributive property of the MPKC signature method using the Vinegar variable vx. By performing the above contrivances, the uniform distributive property is realized also in the MPKC signature method using the Vinegar variable vx so that safety from chosen-message attacks can be secured.

4. Third Embodiment

Application Example to HFEv Signature Method

Next, the third embodiment of the present invention will be described. In the first embodiment described above, the HFE signature method is extended and the extended HFE signature method capable of securing safety from chosen-message attacks by improving the non-uniform distributive property of the HFE function is proposed. In the second embodiment described above, the OV signature method is extended and the first and second extended OV signature methods capable of securing safety from chosen-message attacks by improving the non-uniform distributive property of the OV function are proposed. In the present embodiment, extended HFEv signature methods (a first extended HFEv signature method and a second extended HFEv signature method) capable of securing safety from chosen-message attacks by improving the non-uniform distributive property of an HFEv function combining an HFE function and an OV function will be proposed.

[4-1. Properties of HFEv Function]

Figure 12:
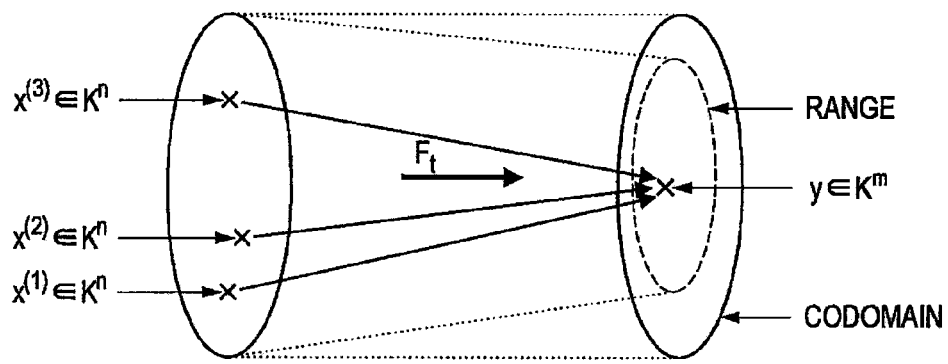
FIG. 12 is an explanatory view showing properties of an HFEv function.

Before describing an extended HFEv function, the definition of an HFEv function $F_t$ and properties of the HFEv function $F_t$ will briefly be described. As described above, the HFEv function $F_t$ is a combination of an HFE function and an OV function. Thus, as shown in FIG. 12, the number of elements of the inverse image may be plural or none at all for some element y of the range. In addition, the magnitude of range of the HFEv function $F_t$ changes depending on how the Vinegar variable vx is taken. For the above reasons, the HFEv function is biased between input and output. The HFEv function will be described in detail below.

<<Definition of Symbols>>
$K^n$: Finite ring with n elements
$F_t$: Mapping $K^n \to K^m$
n: n=o+v
ox: ox=$(ox_1, \ldots, ox_o)$: Oil variable
vx: vx=$(vx_1, \ldots, vx_v)$: Vinegar variable
f: $A \times K^v \to A$, center mapping (see the formula (12) below)
A: o-order extension of the finite ring K (number of elements: q)
B: m-order extension of the finite ring K (number of elements: q)
$\phi_o$: Linear mapping $A \to K^o$ (see the formula (13) below)
$\phi_m$: Linear mapping $B \to K^m$ (see the formula (14) below)
S: Reversible affine transformation on $K^n$ (first secret polynomial transformation)
T: Reversible affine transformation on $K^m$ (second secret polynomial transformation)
trapdoor: S, T, $a_{ij}$, $b_i$(function of $X_2$), c(function of $X_2$)

[Math 7]

$$f: A \times K^v \to A, (X_1, X_2) \mapsto \sum_{i=0}^{n-1}\sum_{j=0}^{n-1} a_{ij}X_1^{q^i+q^j} + \sum_{i=0}^{n-1} b_i(X_2)X_1^{q^i} + c(X_2) \quad (12)$$

$$\phi_o(y_1 + y_2 * Y + \ldots + y_o * Y^{n-1}) = (y_1, \ldots, y_o) \quad (13)$$

$$\phi_m(y_1 + y_2 * Y + \ldots + y_m * Y^{m-1}) = (y_1, \ldots, y_m) \quad (14)$$

If d is a not so great integer, "$a_{ij}$=0 holds if $q^i+q^j>d$" and "$b_j$=0 holds if $q^i>d$" for $a_{ij}$, $b_i$, c∈A.

<<Structure of the HFEv Function Ft>>

The HFEv function $F_t$ is represented as composite mapping $F_t$=T*F*S of mapping by the transformation S, center mapping F(=$\phi_m^{-1}$*f*$\phi_o$), and mapping by the transformation T (* is a direct product). The algorithm to compute y=$F_t$(x) is as follows:

(Step. 1) Transform x=$(ox_1, \ldots, ox_o, vx_1, \ldots, vx_v) \in K^n$ into x'=$(ox_1', \ldots, ox_o', vx_1', \ldots, vx_v') \in K^n$ by the transformation S.

(Step. 2) Transform ox'∈$K^o$ into $X_1' \in A$ by $\phi_o^{-1}$. $X_2'$ is set as $X_2$'vx∈$K^v$.

(Step. 3) Transform $(X_1', X_2') \in A \times K^v$ into Y'=f($X_1', X_2'$)∈B by the center mapping f.

(Step. 4) Transform Y'∈B into y'=$(y_1', \ldots, y_m') \in K^m$ by $\phi_m$.

(Step. 5) Transform y'∈$K^m$ into y=$(y_1, \ldots, y_m) \in K^m$ by the transformation T.

(Step. 6) Output y∈$K^m$.

As shown in the above formula (12), the HFEv function $F_t$ contains, like the HFE function, the center mapping f based on a non-linear multivariable polynomial. Thus, the inverse image {Z∈A|f(Z)=Y'} corresponding to a set of roots of the multivariable polynomial may have a plurality of elements for some element Y' of the codomain A. In this case, as shown in FIG. 12, the number of elements of the inverse image regarding the HFE function $F_t$ is plural (3 in the example of FIG. 12) for an element y of the range.

In addition, no element may exist in the inverse image {Z∈A|f(Z)=Y'} for some element Y' of the codomain A. In this case, an element of the codomain for which the inverse image {Z∈A|f(Z)=Y'} contains no element is not contained in the range and therefore, as shown in FIG. 12, the codomain and the range are different. Due to the above property, elements of the domain obtained by a backward direction operation of the HFEv function $F_t$ are not distributed uniformly even if elements of the codomain are input uniformly.

The computational algorithm of the HFEv function $F_t$ will be described in more detail below.

<<Computational Algorithm in the Forward Direction>>

The computational algorithm in the forward direction for the HFEv function $F_t$ includes a step of obtaining y=$F_t$(x)∈$K^n$ by substituting given x∈$K^n$ into the HFEv function $F_t$(x). If one element x of the domain is input into the computational algorithm in the forward direction, one element y of the range is output.

<<Computational Algorithm in the Backward Direction>>

The computational algorithm in the backward direction for the HFE function $F_t$ includes the following Step. 1 to Step. 8.

(Step. 1) Obtain $y'=(y_1', \ldots, y_m') \in K^m$ by applying given $y=(y_1, \ldots, y_m) \in K^m$ to the inverse transformation $T^{-1}$ of the transformation T.

(Step. 2) Select $vx'=(vx_1', \ldots, vx_v') \in K^v$ randomly.

(Step. 3) Transform $y'=(y_1', \ldots, y_m') \in K^m$ into $Y' \in B$ by $\phi_m^{-1}$. $vx \in K^v$ is set as $X_2' \in K^v$.

(Step. 4) Compute a set $\{Z \in A | f(Z, X_2') = Y'\}$.

(Step. 5) Select one element $X_1'$ from the set $\{Z \in A | f(Z, X_2') = Y'\}$. If the set $\{Z \in A | f(Z, X_2') = Y'\}$ is an empty set, return to Step. 2 to re-select the Vinegar variable vx'. The set $\{Z \in A | f(Z, X_2') = Y'\}$ is determined by, for example, factorizing the polynomial $f(X_1, X_2') = Y'$ into factors about $X_2'$.

(Step. 6) Obtain $x'=(ox_1', \ldots, ox_o', vx_1', \ldots, vx_v')$ by transforming $X_1' \in A$ into $ox=(ox_1, \ldots, ox_o) \in K^o$ by $\phi_o$.

(Step. 7) Transform $x' \in K''$ into $x=(ox_1, \ldots, ox_o, vx_1, \ldots, vx_v) \in K^n$ by the inverse transformation $S^{-1}$ of the transformation S.

(Step. 8) Output $x \in K^n$.

In Step. 4 described above, the number of elements $\alpha = |\{Z \in A | f(Z, X_2') = Y'\}|$ of the set $\{Z \in A | f(Z, X_2') = Y'\}$ may be $\alpha = 0$ or $\alpha \geq 2$. Thus, output values of the computational algorithm in the backward direction are not uniformly distributed even if elements of the codomain having a uniform distribution are input. In addition, in Step. 5 described above, if the number of elements $\alpha$ is 0, the processing returns to Step. 2 to re-select the Vinegar variable vx'. If the Vinegar variable vx' is re-selected, the range of the HFEv function $F_t$ changes and therefore, the output distribution of the computational algorithm in the backward direction is not uniform even if the input shows a uniform distribution. Thus, to secure safety from chosen-message attacks, a contrivance to correct such a distribution bias is needed.

[4-2. HFEv Signature Method]

Heretofore, the HFEv function $F_t$ has been described. Next, the electronic signature method using the HFEv function $F_t$ (HFEv signature method) will be described. Here, the FDH signature method using the HFEv function (HFEv+FDH signature method) will be described as an example of the HFEv signature method.

<<HFEv+FDH Signature Method>>

The signature generation algorithm Sig and the signature verification algorithm Ver in the HFEv+FDH signature method will be described. In the HFEv+FDH signature method, the signature key sk is set to trapdoor S, T, $a_{ij}$, $b_{ij}$, $c_i$ of $F_t$ and the verification key pk is set to $F_t$, where $a_{ij} \in A$ and $b_{ij}$, $c: K^v \to A$.

(Signature Generation Algorithm Sig (Computational Algorithm in the Backward Direction))

The signature generation algorithm Sig computes the electronic signature σ by the following Step. 1 to Step. 9 after the message M and the signature key sk being input (σ→Sig(sk,M)).

(Step. 1) Compute the hash value $y \in K^m \leftarrow H(M)$ by using the message M.

(Step. 2) Obtain $y'=(y_1', \ldots, y_m') \in K^m$ by applying $y=(y_1, \ldots, y_m) \in K^m$ to the inverse transformation $T^{-1}$ of the transformation T.

(Step. 3) Select $vx'=(vx_1', \ldots, vx_v') \in K^v$ randomly.

(Step. 4) Transform $y'=(y_1', \ldots, y_m') \in K^m$ into $Y' \in B$ by $\phi_m^{-1}$. $vx \in K^v$ is set as $X_2' \in K^v$.

(Step. 5) Compute a set $\{Z \in A | f(Z, X_2) = Y'\}$.

(Step. 6) Select one element $X_1'$ from the set $\{Z \in A | f(Z, X_2') = Y'\}$. If the set $\{Z \in A | f(Z, X_2') = Y'\}$ is an empty set, return to Step. 3 to re-select the Vinegar variable vx'. The set $\{Z \in A | f(Z, X_2') = Y'\}$ is determined by, for example, factorizing the polynomial $f(X_1, X_2') = Y'$ into factors about $X_2'$.

(Step. 7) Obtain $x'=(ox_1', \ldots, ox_o', vx_1', \ldots, vx_v')$ by transforming $X_1' \in A$ into $ox=(ox_1, \ldots, ox_o) \in K^o$ by $\phi_o$.

(Step. 8) Transform $x' \in K^n$ into $x=(ox_1, \ldots, ox_o, vx_1, \ldots, vx_v) \in K^n$ by the inverse transformation $S^{-1}$ of the transformation S.

(Step. 9) Output the electronic signature σ=x.

(Signature Verification Algorithm Ver (Computational Algorithm in the Forward Direction))

The signature verification algorithm Ver verifies authenticity of the electronic signature σ for the message M by the following Step. 1 to Step. 3 after the verification key $pk=F_t$, the message M, and the electronic signature σ=x being input (0/1←Ver(pk,M,σ)).

(Step. 1) Compute the hash value y←H(M) by using the message M.

(Step. 2) Obtain y" by substituting $x=(ox_1, \ldots, ox_o, vx_1, \ldots, vx_v) \in K^n$ contained in the electronic signature σ into the OV function $F_t$.

(Step. 3) Output 1 if y=y" and output 0 if y≠y".

(Characteristics of the HFEv+Fdh Signature Method)

Figure 13:
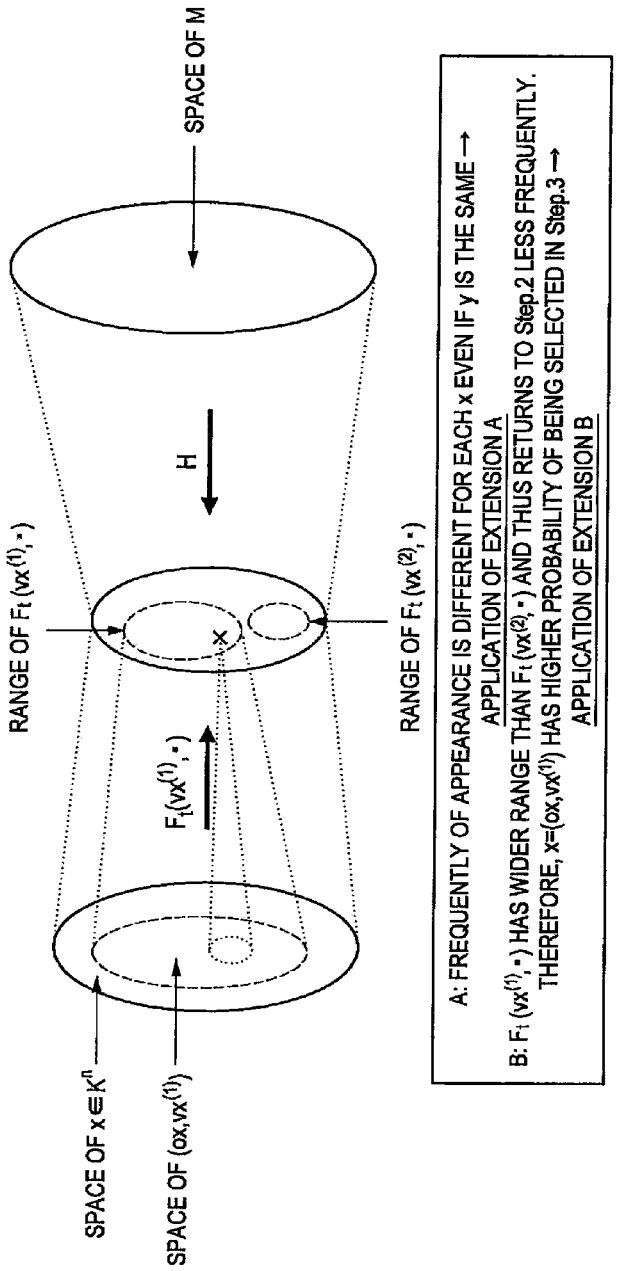
FIG. 13 is an explanatory view providing an overview of the FDH signature method based on the HFEv function and showing an extension method according to a third embodiment of the present invention.

As described above, the HFEv function $F_t$ is a combination of an HFE function and an OV function. Thus, as shown in FIG. 13, (A) due to characteristics of the HFE function, even if the same element y of the codomain is given, the number of the elements of the inverse image for the element y may not be 1. (B) due to characteristics of the OV function, the magnitude of the range changes depending on how the Vinegar variable vx is selected and thus, the probability of appearance of the element x changes in accordance with the Vinegar variable vx contained in the element x of the inverse image for some element y of the codomain. Therefore, the HFEv signature method cannot secure safety from chosen-message attacks.

Thus, the inventors of the present application devised a method (extended HFEv signature method) capable of solving such a problem. The extended HFEv signature method will be described below, but the flow of processing in the signature generation algorithm Sig and the signature verification algorithm Ver of the HFEv+FDH signature method will be put together here.

(Details of the Signature Generation Algorithm Sig)

First, the flow of processing by the signature generation algorithm Sig of the HFEv+FDH signature method will be described with reference to FIG. 16. FIG. 16 is an explanatory view showing the flow of processing by the signature generation algorithm Sig of the HFEv+FDH signature method.

As shown in FIG. 16, first the signatory 10 prepares the message M and signature key sk (S202) and inputs the message M and signature key sk into the signature generation algorithm Sig. Next, the signature generation algorithm Sig computes the hash value y=H(M) by using the message M (S204). Next, the signature generation algorithm Sig computes the element $y' \in K^o$ in the codomain of the center mapping F from the hash value y $\in K^o$ based on the inverse transformation $T^{-1}$ of the transformation T (S206). Next, the signature generation algorithm Sig selects the Vinegar variable $vx \in K^v$ (S208).

Next, the signature generation algorithm Sig computes $ox \in \{z \in K^o | F(z,vx)=y'\}$ to determine whether the set $\{z \in K^o | F(z,vx)=y'\}$ has any element (S210). If the set $\{z \in K^o | F(z,vx)=y'\}$ has an element, the signature generation algorithm Sig proceeds to the processing in step S212. On the other hand, if the set $\{z \in K^o | F(z,vx)=y'\}$ has no element, the signature generation algorithm Sig returns to the processing in step S208. If the processing proceeds to step S212, the signature generation algorithm Sig selects one element ox of the set $\{z \in K^o | F(z,vx)=y'\}$ (S212).

Next, the signature generation algorithm Sig transforms the element $x'=(ox_1, \ldots, ox_o, vx_1, \ldots, vx_v)$ constituted of the element ox selected in step S212 and the Vinegar variable vx selected in step S208 into $x \in K^n$ based on the inverse transformation $S^{-1}$ of the transformation S (S214). Next, the signature generation algorithm Sig outputs the electronic signature $\sigma=x$ (S216). The non-uniform distributive property of the HFEv function $F_t$ is mainly caused by the retake processing of the Vinegar variable in steps S210 and S208 and the selection processing in step S212.

(Details of the Signature Verification Algorithm Ver)

Next, the flow of processing by the signature verification algorithm Ver of the HFEv+FDH signature method will be described with reference to FIG. 17. FIG. 17 is an explanatory view showing the flow of processing by the signature verification algorithm Ver of the HFEv+FDH signature method.

As shown in FIG. 17, first the verifier 20 acquires the message M, the electronic signature $\sigma=x$, and the verification key pk from the signatory 10 (S232) and inputs the message M, the electronic signature $\sigma=x$, and the verification key pk into the signature verification algorithm Ver. Next, the signature verification algorithm Ver computes the hash value y=H(M) by using the message M (S234). Next, the signature verification algorithm Ver computes $y''=F_t(x)$ by using the verification key pk ($F_t$) (S236). Next, the signature verification algorithm Ver accepts (outputs 1) if y=y'' and rejects (outputs 0) if y≠y'' (S238).

The HFEv signature method has been described.

[4-3. First Extended HFEv Signature Method]

Next, the first extended HFEv signature method according to the third embodiment of the present invention will be described. The first extended HFEv signature method is a method that re-selects, like the above extended HFE signature method, the Vinegar variable with a probability proportional to the number of elements of the inverse image for some element in the range. The signature generation algorithm Sig and the signature verification algorithm Ver of the first extended HFEv signature method will be described below with reference to FIGS. 20 and 21.

<<Signature Generation Algorithm Sig>>

Figure 20:
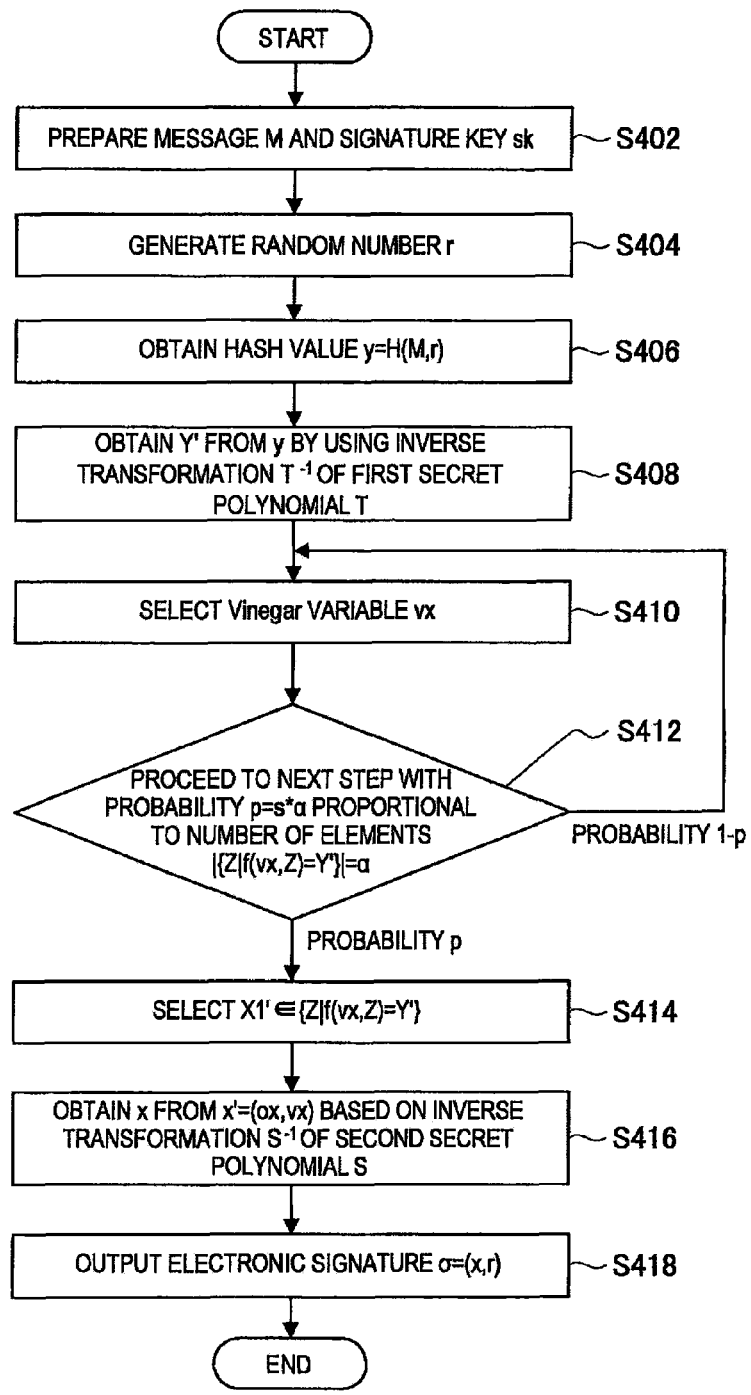
FIG. 20 is an explanatory view exemplifying the signature generation algorithm according to the third embodiment (first extended HFEv signature method) of the present invention.

As shown in FIG. 20, first the signatory 10 prepares the message M and signature key sk (S402) and inputs the message M and signature key sk into the signature generation algorithm Sig. Next, the signature generation algorithm Sig generates the random number r (S404). Next, the signature generation algorithm Sig computes the hash value y=H(M,r) by using the message M and the random number r (S406). Next, the signature generation algorithm Sig computes the element Y'∈A in the codomain of the center mapping f from the hash value $y \in K^n$ based on the inverse transformation $T^{-1}$ of the transformation T (S408).

Next, the signature generation algorithm Sig randomly selects the Vinegar variable $vx=X_2'$ (S410). Next, the signature generation algorithm Sig computes $X_1' \in \{Z \in A | f(Z,X_2')=Y'\}$ and proceeds to the processing in step S414 with the probability p proportional to the number of elements α of the set $\{Z \in A | f(Z,X_2')=Y'\}$ (S412). On the other hand, the signature generation algorithm Sig returns the processing to step S410 with the probability of (1-p). If the processing proceeds to step S414, the signature generation algorithm Sig selects one element $X_1'$ of the set $\{Z \in A | f(Z,X_2')=Y'\}$ (S414).

Next, the signature generation algorithm Sig obtains $x=(ox,vx) \in K^n$ from the element $X_1'$ selected in step S414 and the Vinegar variable $X_2'$ selected in step S410 based on the inverse transformation $S^{-1}$ of the transformation S (S416). Next, the signature generation algorithm Sig outputs the electronic signature $\sigma=(x,r)$ (S418). Thus, the uniform distributive property of the first extended HFEv function $F_t$ is realized by performing the branch processing in step S412 based on the probability p proportional to the number of elements α of the inverse image $\{Z \in A | f(Z,X_2')=Y'\}$.

<<Signature Verification Algorithm Ver>>

Figure 21:
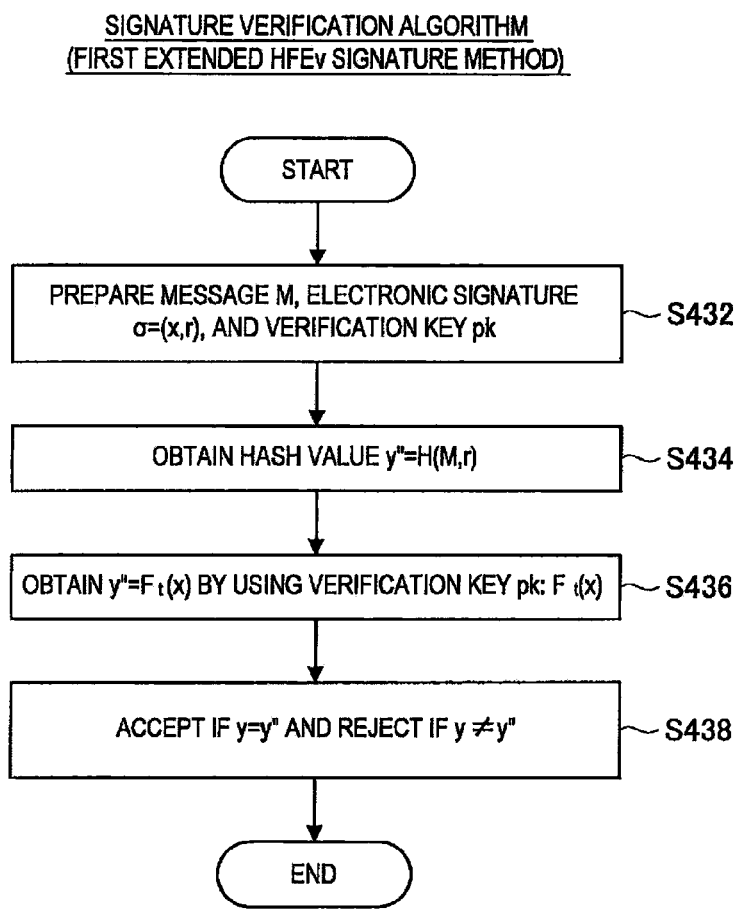
FIG. 21 is an explanatory view exemplifying the signature verification algorithm according to the third embodiment (first extended HFEv signature method) of the present invention.

Next, the flow of processing by the signature verification algorithm Ver of the HFEv+FDH signature method will be described with reference to FIG. 21. FIG. 21 is an explanatory view showing the flow of processing by the signature verification algorithm Ver of the HFEv+FDH signature method.

As shown in FIG. 21, first the verifier 20 acquires the message M, the electronic signature $\sigma=(M,r)$, and the verification key pk from the signatory 10 (S432) and inputs the message M, the electronic signature $\sigma=(M,r)$, and the verification key pk into the signature verification algorithm Ver. Next, the signature verification algorithm Ver computes the hash value y=H(M,r) by using the random number r contained in the electronic signature σ and the message M (S434). Next, the signature verification algorithm Ver computes $y''=F_t(x)$ by using the verification key pk ($F_t$) (S436). Next, the signature verification algorithm Ver accepts (outputs 1) if y=y'' and rejects (outputs 0) if y≠y'' (S438).

The first extended HFEv signature method according to the third embodiment of the present invention has been described.

[4-4. Second Extended HFEv Signature Method]

Next, the second extended HFEv signature method according to the third embodiment of the present invention will be described. The second extended signature method obtained by applying the contrivance of the extension A for the extended HFE signature method and the contrivance of the extension B for the first extended OV signature method to the HFEv signature method. That is, the second extended HFEv signature method is a method of re-selecting the element of the range with a probability proportional to the number of elements of the inverse image for some element of the range. The signature generation algorithm Sig and the signature verification algorithm Ver of the second extended HFEv signature method will be described below with reference to FIGS. 24 and 25.

<<Signature Generation Algorithm Sig>>

Figure 24:
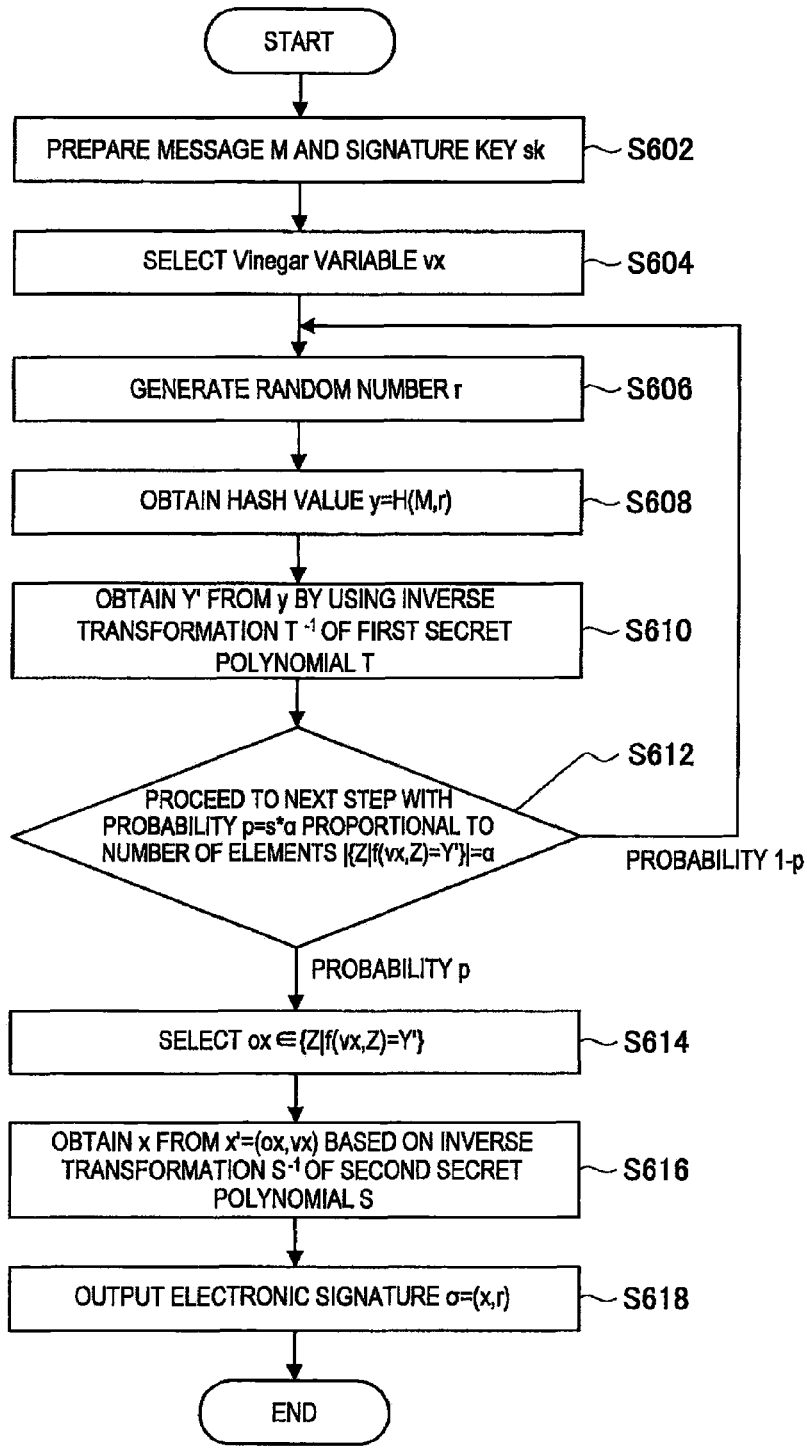
FIG. 24 is an explanatory view exemplifying the signature generation algorithm according to the third embodiment (second extended HFEv signature method) of the present invention.

As shown in FIG. 24, first the signatory 10 prepares the message M and signature key sk (S602) and inputs the message M and signature key sk into the signature generation algorithm Sig. Next, the signature generation algorithm Sig randomly selects the Vinegar variable $vx=X_2'$ (S604). Next, the signature generation algorithm Sig generates the random number r (S606). Next, the signature generation algorithm Sig computes the hash value y=H(M,r) by using the message M and the random number r (S608). Next, the signature generation algorithm Sig computes the element Y'∈A in the codomain of the center mapping f from the hash value $y \in K^n$ based on the inverse transformation $T^{-1}$ of the transformation T (S610).

Next, the signature generation algorithm Sig computes $X_1' \in \{Z \in A | f(Z,X_2')=Y'\}$ and proceeds to the processing in step S614 with the probability p proportional to the number of elements α of the set $\{Z \in A | f(Z,X_2')=Y'\}$ (S612). On the other hand, the signature generation algorithm Sig returns the processing to step S606 with the probability of (1-p). If the processing proceeds to step S614, the signature generation algorithm Sig selects one element $X_1'$ of the set $\{Z \in A | f(Z,X_2')=Y'\}$ (S614).

Next, the signature generation algorithm Sig obtains $x=(ox,vx) K''$ from the element $X_1'$ selected in step S614 and the Vinegar variable $X_2'$ selected in step S604 based on the inverse transformation $S^{-1}$ of the transformation S (S616). Next, the signature generation algorithm Sig outputs the electronic signature $\sigma=(x,r)$ (S618). Thus, the uniform distributive property of the second extended HFEv function $F_t$ is realized by performing the branch processing in step S612 based on the probability p proportional to the number of elements $\alpha$ of the inverse image $\{Z \in A | f(Z,X_2)=Y'\}$ and re-selecting the random number r with the probability of (1-p) instead of the new Vinegar variable vx.

<<Signature Verification Algorithm Ver>>

Figure 25:
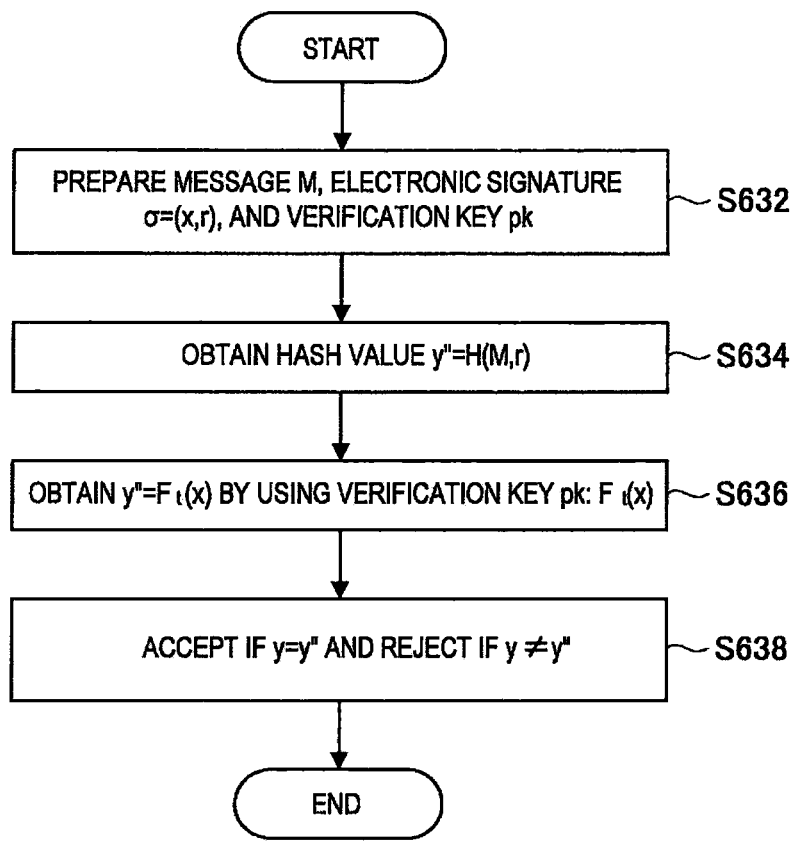
FIG. 25 is an explanatory view exemplifying the signature verification algorithm according to the third embodiment (second extended HFEv signature method) of the present invention.

As shown in FIG. 25, first the verifier 20 acquires the message M, the electronic signature $\sigma=(M,r)$, and the verification key pk from the signatory 10 (S632) and inputs the message M, the electronic signature $\sigma=(M,r)$, and the verification key pk into the signature verification algorithm Ver. Next, the signature verification algorithm Ver computes the hash value $y=H(M,r)$ by using the random number r contained in the electronic signature $\sigma$ and the message M (S634). Next, the signature verification algorithm Ver computes $y''=F_t(x)$ by using the verification key pk(Ft) (S636). Next, the signature verification algorithm Ver accepts (outputs 1) if $y=y''$ and rejects (outputs 0) if $y \neq y''$ (S638).

The second extended HFEv signature method according to the third embodiment of the present invention has been described.

The third embodiment of the present invention relates to, as described above, an application example of the extension A to the HFEv signature method and an application example of the extension A+ extension B. By applying the extension A when the inverse image of the center mapping f can have a plurality of elements for some element of the codomain and applying the extension A together with the extension B for a signature method further using the Vinegar variable as described above, a bias in the distribution between input and output is eliminated so that safety from chosen-message attacks can be secured.

The first extended OV signature method is an application example of only the extension B. The number of elements of the inverse image of the center mapping f for some element of the codomain may not be 1 in many cases and the extension A needs to be used together. For the OV function, however, the extension A does not have to be used together because of a special property that "if z satisfying $F(vx,z)=y$ for any element y of the codomain exists when a portion vx of the inverse image is fixed, the number thereof is constant regardless of y". Thus, by appropriately using the extension A, the extension B, and the extension A+extension B depending on the type of the MPKC signature method, a bias in the distribution between input and output of the function $F_t$ can be eliminated. Incidentally, instead of the extension B, the second extended OV signature method may be combined.

5. Supplements

The first to third embodiments of the present invention have been described. These embodiments are only examples embodying a technical idea according to the present invention and the scope of the present invention is not limited to these examples. In the above description, for example, the HFE signature method, the OV signature method, the HFEv signature method, and derived forms thereof are cited as examples, but the present invention is not limited to these examples and can also be applied to other MPKC signature methods. Regarding such applications, the scope conceived from content mentioned in the description of the above embodiments and the scope conceived by a person skilled in the art by considering technology at the time of application are naturally included in the technical scope as embodiments according to the present invention.

Some signature methods described above use the random number r. The random number r used here may be, however, a number considered by a third party as substantially a random number. For example, instead of the random number r, the signatory 10 may use $r=H'(M,r)$ obtained by inputting a value $\delta$ (value managed in secret) specific to the signatory 10 into a hash function H' together with the message M. In each of the above extended OV signature methods, modifications such as using identity mapping as the transformation of a second secret polynomial and omitting processing related to the transformation (or inverse transformation) of the second secret polynomial may be made. Such modifications also belong to the technical scope of embodiments according to the present invention.

[5-1. Extension to PSS Signature Method]

PSS (Probabilistic Signature Scheme) may be combined with the signature generation method according to each embodiment of the present invention. PSS is a mechanism to generate the random number r or a portion thereof from a portion of the electronic signature $\sigma$ in the PFDH method.

[5-2. Extension to Multilayer OV Signature Method]

In the second embodiment described above, the basic configuration of an OV function is illustrated for the sake of simplicity, but a multilayer OV function (for example, an OV function of the Rainbow signature method) may also be applied. A multilayer OV function includes an algorithm that sequentially computes the Oil variable in steps shown below.

(First-Layer Operation Step)

Select the first-layer Vinegar variable and compute the Oil variable. Next, set the first-layer Vinegar variable and the computed Old variable as a second-layer Vinegar variable.

(Second-Layer Operation Step)

Compute the Oil variable by using the second-layer Vinegar variable. Next, set the second-layer Vinegar variable and the computed Old variable as a third-layer Vinegar variable.

(Third-Layer Operation Step)

Compute the Oil variable by using the third-layer Vinegar variable. Next, set the third-layer Vinegar variable and the computed Old variable as a fourth-layer Vinegar variable.

. . .

(N-th-Layer Operation Step)

Compute the N-th-layer Oil variable by using the (N−1)th-layer vinegar variable.

A bias in the distribution between input and output can also be eliminated by appropriately applying the above extension A or extension B to such a multilayer OV function so that the uniform distributive property can be realized. By performing such an extension, an electronic signature method in which safety from chosen-message attacks is secured can be realized.

[5-3. Minus Extension Method of HFE Function $F_t$]

In the first embodiment described above, the extended HFE function $F_t$ is used as the verification key pk, but a modification in which a portion of the extended HFE function $F_t$ is used as the verification key pk (hereinafter, referred to as a minus extension method) is also possible. If, for example, the extended HFE function $F_t$ contains n polynomials, (n-m) polynomials after excluding m (m<n) polynomials from these n polynomials are provided to the verifier 20 as the verification key pk. When using the verification key pk as described above, a hash function H that outputs the hash value y having (n-m) elements is used. A configuration in which other elements than (n-m) elements of output values of the hash function H that outputs the hash value y having n elements may also be adopted.

The verification of the electronic signature σ is conducted by comparing (n-m) values y" obtained by applying the electronic signature σ to the verification key pk and (n-m) hash values y obtained by applying the message M and the random number r to the hash function H. On the other hand, the electronic signature σ is generated by computing an inverse image by applying n elements containing (n-m) elements obtained by applying the message M and the random number r to the hash function H and m random numbers to a computational algorithm in the backward direction and including the computation result in a portion of the electronic signature σ. Thus, the technology according to the first embodiment described above can be applied to the minus extension method. By applying the minus extension method, strength of the HFE function $F_t$ can further be improved.

6. Hardware Configuration Example

Figure 31:
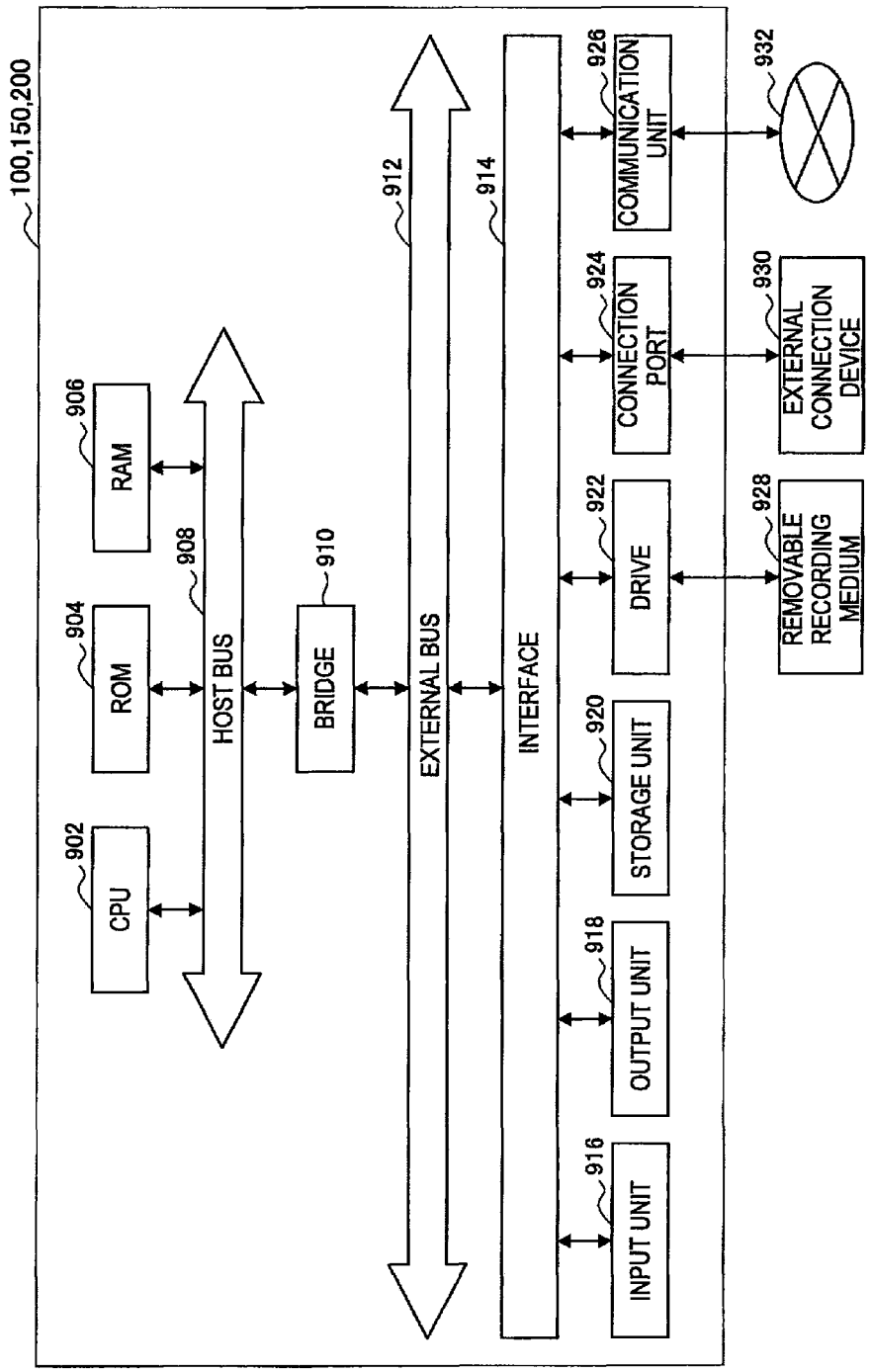
FIG. 31 is an explanatory view showing a hardware configuration example of various apparatuses of the system capable of realizing the electronic signature method according to the first to third embodiments of the present invention.

The function of each structural element of the key generation apparatus 100, the signature generation apparatus 150, and the signature verification apparatus 200 can be realized by, for example, a hardware configuration of information processing apparatuses shown in FIG. 31. That is, the function of each structural element is realized by controlling hardware shown in FIG. 31 by using a computer program. The form of hardware is arbitrary and includes, for example, a mobile information terminal such as a personal computer, mobile phone, PHS, and PDA, a game machine, a contact or contactless IC chip, a contact or contactless IC card, and various home electronic appliances. The above PHS is an abbreviation of Personal Handy-phone System. The above PDA is an abbreviation of Personal Digital Assistant.

As shown in FIG. 31, the hardware mainly includes a CPU 902, a ROM 904, a RAM 906, a host bus 908, and a bridge 910. Further, the hardware includes an external bus 912, an interface 914, an input unit 916, an output unit 918, a storage unit 920, a drive 922, a connection port 924, and a communication unit 926. The above CPU is an abbreviation of Central Processing Unit. The above ROM is an abbreviation of Read Only Memory. The above RAM is an abbreviation of Random Access Memory.

The CPU 902 functions, for example, as an arithmetic processing unit or control apparatus and controls an overall operation or a portion thereof each structural element based on various programs recorded in the ROM 904, the RAM 906, the storage unit 920, or a removable recording medium 928. The ROM 904 is a unit to store programs read into the CPU 902 or data used for operations. The RAM 906 temporarily or permanently stores programs read into the CPU 902 or various parameters changing as appropriate during execution of the programs.

These structural elements are mutually connected via the host bus 908 capable of, for example, transmitting data at high speed. On the other hand, the host bus 908 is connected to the external bus 912 whose data transmission speed is relatively low via the bridge 910. As the input unit 916, for example, a mouse, keyboard, touch panel, button, switch, or lever is used. Further, as the input unit 916, a remote controller capable of transmitting a control signal by using an infrared ray or other radio waves.

The output unit 918 is an apparatus capable of notifying a user of acquired information visually or auditorily, for example, a display apparatus such as a CRT, LCD, PDP, and ELD, an audio output apparatus such a speaker and headphone, a printer, a mobile phone, and a facsimile. The above CRT is an abbreviation of Cathode Ray Tube. The above LCD is an abbreviation of Liquid Crystal Display. The above PDP is an abbreviation of Plasma Display Panel. Further, the above ELD is an abbreviation of Electro-Luminescence Display.

The storage unit 920 is an apparatus to store various kinds of data. As the storage unit 920, for example, a magnetic storage device such as a hard disk drive (HDD), a semiconductor storage device, an optical storage device, or a magneto-optical storage device is used. The above HDD is an abbreviation of Hard Disk Drive.

The drive 922 is an apparatus that reads information recorded in the removable recording medium 928 such as a magnetic disk, optical disk, magneto-optical disk, or semiconductor memory or writes information into the removable recording medium 928. The removable recording medium 928 is, for example, a DVD medium, Blu-ray medium, HD DVD medium, or various semiconductor storage media. The removable recording medium 928 may also be, for example, an IC card on which a contactless IC chip is mounted or an electronic device. The above IC is an abbreviation of Integrated Circuit.

The connection port 924 is a port to connect an external connection device 930, for example, a USB port, IEEE1394 port, SCSI, RS-232C port, or optical audio terminal. The external connection device 930 is, for example, a printer, mobile music player, digital camera, digital camcorder, or IC recorder. The above USB is an abbreviation of Universal Serial Bus. The above SCSI is an abbreviation of Small Computer System Interface.

The communication unit 926 is a communication device to connect to a network 932 and is, for example, a wire or wireless LAN, communication card for Bluetooth (registered trademark) or WUSB, optical communication router, ADSL router, or a device for contact or contactless communication device. The network 932 connected to the communication unit 926 is configured by a network connected by wire or wirelessly and is, for example, the Internet, home LAN, infrared communication, visible light communication, broadcasting, or satellite communication. The above LAN is an abbreviation of Local Area Network. The above WUSB is an abbreviation of Wireless USB. The above ADSL is an abbreviation of Asymmetric Digital Subscriber Line.

7. Summary

Lastly, technical content according to the embodiments of the present invention will briefly be summarized. The technical content described here can be applied to, for example, various information processing apparatuses such as a PC, mobile phone, mobile game machine, mobile information terminal, home electronic appliance, and car navigation system and a contactless or contact smart card and reader/writer.

The functional configuration of the above information processing apparatus can be represented by two ways described below.

(1) The information processing apparatus includes a first inverse transformation unit that transforms an element y of a finite ring $K^n$ containing elements constituted of n numbers into an element y' of the finite ring $K^n$ by an inverse transformation $T^{-1}$ of a first secret polynomial T, an element computation unit that considers the element y' of the finite ring $K^n$ obtained by the first inverse transformation unit as an element Y of an n-order extension A of a finite ring K and computes an element $X \in \{Z \in A | f(Z) = Y\}$ of an inverse image of mapping f (f: A→A) represented by a predetermined multivariable polynomial by using the element Y, an element selection unit that selects one element X of the inverse image computed by the element computation unit with a probability p proportional to a number of elements α of the inverse image and outputs an exception value with the probability (1-p), and a second inverse transformation unit that considers the element X selected by the element selection unit as an element x' of the finite ring $K''$ and transforms the element x' of the finite ring $K''$ into an element x of the finite ring $K''$ by an inverse transformation $S^{-1}$ of a second secret polynomial S.

As described above, the probability with which each element of the inverse image is selected becomes equal by the element X of the inverse image being selected by the element selection unit with the probability p proportional to the number of elements α of the inverse image. Thus, if the element y of a set having a uniform distribution on the finite ring $K''$ is input into the first inverse transformation unit, the element x obtained by undergoing processing of the first inverse transformation unit, the element computation unit, the element selection unit, and the second inverse transformation unit has a uniform distribution on the finite ring $K''$. That is, the mapping $F_t$ corresponding to the processing of the first inverse transformation unit, the element computation unit, the element selection unit, and the second inverse transformation unit is bijective. With the mapping $F_t$ being bijective in this manner, safety from chosen-message attacks is secured for an electronic signature system based on the mapping $F_t$.

(2) The key generation apparatus includes a partial element selection unit that selects an element vx of a finite ring $K^v$ containing elements constituted of v numbers, a number generation unit that generates a number r, a data generation unit that generates an element y of a finite ring $K^m$ containing elements constituted of m numbers by using the number r generated by the number generation unit and electronic data M, a first inverse transformation unit that transforms the element y of the finite ring $K^m$ generated by the data generation unit into an element y' of the finite ring $K^m$ by an inverse transformation $T^{-1}$ of a first secret polynomial T, an element computation unit that computes an element ox∈{Z∈$K^o$|f(Z, vx)=y'} of mapping f (f: $K^n$→$K^o$, n=o+v) represented by a predetermined multivariable polynomial by using the element y' of the finite ring $K^m$ obtained by the first inverse transformation unit and the element vx selected by the partial element selection unit, an element selection unit that selects the element ox of the inverse image computed by the element computation unit if the element of the inverse image exists and causes the number generation unit to generate the different number r and selects the element ox of the inverse image computed by processing of the data generation unit, the first inverse transformation unit, and the element computation unit by using the different number r if the element of the inverse image does not exist, a second inverse transformation unit that transforms an element x'=(ox,vx) of the finite ring $K''$(n=o+v) containing the element ox selected by the element selection unit into an element x of the finite ring $K''$ by an inverse transformation $S^{-1}$ of a second secret polynomial S, and a signature generation unit that generates an electronic signature σ containing the element x of the finite ring $K''$ obtained by the second inverse transformation unit.

As described above, if no inverse image element exists, instead of re-selecting the element vx related to the number of elements of the inverse image, the element y is changed by re-generating the number r to realize bijection of the mapping $F_t$ corresponding to processing of the first inverse transformation unit, the element computation unit, and the second inverse transformation unit. With the mapping $F_t$ being bijective in this manner, safety from chosen-message attacks is secured for an electronic signature system based on the mapping $F_t$.

(Lastly)

The signature generation algorithm of the extended HFE signature method shown in FIG. 18 can be executed by the signature generation apparatus 150 shown in FIG. 28 using, for example, the hardware shown in FIG. 31. The signature generation algorithm of the extended HFE signature method shown in FIG. 19 can be executed by the signature verification apparatus 200 shown in FIG. 28 using, for example, the hardware shown in FIG. 31.

The signature generation algorithm of the first extended HFEv signature method shown in FIG. 20 can be executed by the signature generation apparatus 150 shown in FIG. 28 using, for example, the hardware shown in FIG. 31. The signature generation algorithm of the first extended HFEv signature method shown in FIG. 21 can be executed by the signature verification apparatus 200 shown in FIG. 28 using, for example, the hardware shown in FIG. 31.

The signature generation algorithm of the first extended OV signature method shown in FIG. 22 can be executed by the signature generation apparatus 150 shown in FIG. 28 using, for example, the hardware shown in FIG. 31. The signature generation algorithm of the first extended OV signature method shown in FIG. 23 can be executed by the signature verification apparatus 200 shown in FIG. 28 using, for example, the hardware shown in FIG. 31.

The signature generation algorithm of the second extended HFEv signature method shown in FIG. 24 can be executed by the signature generation apparatus 150 shown in FIG. 28 using, for example, the hardware shown in FIG. 31. The signature generation algorithm of the second extended HFEv signature method shown in FIG. 25 can be executed by the signature verification apparatus 200 shown in FIG. 28 using, for example, the hardware shown in FIG. 31.

The signature generation algorithm of the second extended OV signature method shown in FIG. 26 can be executed by the signature generation apparatus 150 shown in FIG. 28 using, for example, the hardware shown in FIG. 31. The signature generation algorithm of the second extended OV signature method shown in FIG. 27 can be executed by the signature verification apparatus 200 shown in FIG. 28 using, for example, the hardware shown in FIG. 31.

Various signature generation algorithms described in the above embodiments can be executed by the signature generation apparatus 150 shown in FIG. 28 using, for example, the hardware shown in FIG. 31. Further, various signature generation algorithms described in the above embodiments can be executed by the signature verification apparatus 200 shown in FIG. 28 using, for example, the hardware shown in FIG. 31.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

| Reference Signs List | |
|---|---|
| 100 | Key generation apparatus |
| 150 | Signature generation apparatus |
| 200 | Signature verification apparatus |

The invention claimed is:

1. An information processing apparatus, comprising:

a processor, which comprises, a first inverse transformation unit that transforms an element y of a finite ring $K^n$ containing elements constituted of n numbers into an element y' of the finite ring $K^n$ by an inverse transformation $T^{-1}$ of a first secret polynomial T;

an element computation unit that considers the element y' of the finite ring $K^n$ obtained by the first inverse transformation unit as an element Y of an n-order extension A of a finite ring K and computes an element $X \in \{Z \in A | f(Z)=Y\}$ of an inverse image of mapping f(f: A→A) represented by a predetermined multivariable polynomial by using the element Y;

an element selection unit that selects one element X of the inverse image computed by the element computation unit with a probability p proportional to a number of elements α of the inverse image and outputs an exception value with a probability (1-p); and a second inverse transformation unit that considers the element X selected by the element selection unit as an element x' of the finite ring $K^n$ and transforms the element x' of the finite ring $K^n$ into an element x of the finite ring $K^n$ by an inverse transformation $S^{-1}$ of a second secret polynomial S.

2. An information processing apparatus, comprising:

a processor, which comprises a partial element selection unit that selects an element vx of a finite ring $K^v$ containing elements constituted of v numbers;

a first inverse transformation unit that transforms an element y of a finite ring $K^m$ containing elements constituted of m elements into an element y' of the finite ring $K^m$ by an inverse transformation $T^{-1}$ of a first secret polynomial T;

an element computation unit that considers the element y' of the finite ring $K^m$ obtained by the first inverse transformation unit as an element Y of an m-order extension A of a finite ring K and computes an element $X \in \{Z \in B | f(Z,vx)=Y\}$ of an inverse image of mapping f(f: $A*K^v$→B, B is an O-order extension of the finite ring K) represented by a predetermined multivariable polynomial by using the element Y and the element vx selected by the partial element selection unit;

an element selection unit that selects one element X of the inverse image computed by the element computation unit with a probability p proportional to a number of elements α of the inverse image and outputs an exception value with a probability (1-p); and a second inverse transformation unit that considers the element X selected by the element selection unit as an element ox of a finite ring $K^o$ and transforms an element x'=(ox,vx) of the finite ring $K^n$(n=o+v) into an element x of the finite ring $K^n$ by an inverse transformation $S^{-1}$ of a second secret polynomial S.

3. The information processing apparatus according to claim 1, further comprising:

a number generation unit that generates a number r;

a data generation unit that generates the element y of the finite ring $K^n$ by using the number r generated by the number generation unit and electronic data M; and a signature generation unit that inputs the element y of the finite ring $K^n$ generated by the data generation unit into the first inverse transformation unit to generate an electronic signature σ containing the element x of the finite ring $K^n$ obtained by processing of the first inverse transformation unit, the element computation unit, the element selection unit, and the second inverse transformation unit, wherein if an exception value is output by the element selection unit, the signature generation unit causes the number generation unit to generate the different number r and inputs the element y of the finite ring $K^n$ generated by the data generation unit based on the different number r into the first inverse transformation unit to generate the electronic signature σ containing the element x of the finite ring $K^n$ obtained by the processing of the first inverse transformation unit, the element computation unit, the element selection unit, and the second inverse transformation unit.

4. The information processing apparatus according to claim 2, further comprising:

a number generation unit that generates a number r;

a data generation unit that generates the element y of the finite ring $K^n$ by using the number r generated by the number generation unit and electronic data M; and a signature generation unit that inputs the element y of the finite ring $K^n$ generated by the data generation unit into the first inverse transformation unit to generate an electronic signature σ containing the element x of the finite ring $K^n$ obtained by processing of the first inverse transformation unit, the element computation unit, the element selection unit, and the second inverse transformation unit, wherein if an exception value is output by the element selection unit, the signature generation unit causes the number generation unit to generate the different number r and inputs the element y of the finite ring $K^n$ generated by the data generation unit based on the different number r into the first inverse transformation unit to generate the electronic signature σ containing the element x of the finite ring $K^n$ obtained by the processing of the first inverse transformation unit, the element computation unit, the element selection unit, and the second inverse transformation unit.

5. A key generation apparatus, comprising:

a processor, which comprises a secret key generation unit that generates a secret key used by a computational algorithm having a first inverse transformation unit that transforms an element y of a finite ring $K^n$ containing elements constituted of n numbers into an element y' of the finite ring $K_n$ by an inverse transformation $T^{-1}$ of a first secret polynomial T, an element computation unit that considers the element y' of the finite ring $K^n$ obtained by the first inverse transformation unit as an element Y of an n-order extension A of a finite ring K and computes an element $X \in \{Z \in A | f(Z)=Y\}$ of an inverse image of mapping f(f: A→A) represented by a predetermined multivariable polynomial by using the element Y, an element selection unit that selects one element X of the inverse image computed by the element computation unit with a probability p proportional to a number of elements α of the inverse image and outputs an exception value with a probability (1-p), and a second inverse transformation unit that considers the element X selected by the element selection unit as an element x' of the finite ring K" and transforms the element x' of the finite ring K" into an element x of the finite ring K" by an inverse transformation $S^{-1}$ of a second secret polynomial S and containing information about the first secret polynomial T, the second secret polynomial S, and the predetermined multivariable polynomial; and a public key generation unit that generates a public key containing information about composite mapping F constituted of the first secret polynomial T, the mapping f, and the second secret polynomial S.

6. A key generation apparatus, comprising:

processor, which comprises, a partial element selection unit that selects an element vx of a finite ring $K^v$ containing elements constituted of v numbers;

a secret key generation unit that generates a secret key used by a computational algorithm having a first inverse transformation unit that transforms an element y of a finite ring $K^m$ containing elements constituted of m elements into an element y' of the finite ring $K^m$ by an inverse transformation $T^{-1}$ of a first secret polynomial T;

an element computation unit that considers the element y' of the finite ring $K^m$ obtained by the first inverse transformation unit as an element Y of an m-order extension A of a finite ring K and computes an element $X\epsilon\{Z\epsilon B|f(Z,vx)=Y\}$ of an inverse image of mapping f(f: $A*K^v \to B$, B is an o-order extension of the finite ring K) represented by a predetermined multivariable polynomial by using the element Y and the element vx selected by the partial element selection unit;

an element selection unit that selects one element X of the inverse image computed by the element computation unit with a probability p proportional to a number of elements α of the inverse image and outputs an exception value with a probability (1-p); and a second inverse transformation unit that considers the element X selected by the element selection unit as an element ox of a finite ring $K^o$ and transforms an element x'=(ox,vx) of the finite ring K"(n=o+v) into an element x of the finite ring K an inverse transformation $S^{-1}$ of a second secret polynomial S and containing information about the first secret polynomial T, the second secret polynomial S, and the predetermined multivariable polynomial; and a public key generation unit that generates a public key containing information about composite mapping F constituted of the first secret polynomial T, the mapping f, and the second secret polynomial S.

7. An information processing apparatus, comprising:

a processor, which comprises, a partial element selection unit that selects an element vx of a finite ring $K^v$ containing elements constituted of v numbers;

a number generation unit that generates a number r;

a data generation unit that generates an element y of a finite ring $K^m$ containing elements constituted of m numbers by using the number r generated by the number generation unit and electronic data M;

a first inverse transformation unit that transforms the element y of the finite ring $K^m$ generated by the data generation unit into an element y' of the finite ring $K^m$ by an inverse transformation $T^{-1}$ of a first secret polynomial T;

an element computation unit that computes an element $ox\epsilon\{Z\epsilon K^o|f(Z,vx)=y'\}$ of mapping f(f: $K^n \to K^o$, n=o+v) represented by a predetermined multivariable polynomial by using the element y' of the finite ring $K^m$ obtained by the first inverse transformation unit and the element vx selected by the partial element selection unit;

an element selection unit that selects the element ox of the inverse image computed by the element computation unit if the element of the inverse image exists and causes the number generation unit to generate the different number r and selects the element ox of the inverse image computed by processing of the data generation unit, the first inverse transformation unit, and the element computation unit by using the different number r if the element of the inverse image does not exist;

a second inverse transformation unit that transforms an element x'=(ox,vx) of the finite ring K"(n=o+v) containing the element ox selected by the element selection unit into an element x of the finite ring K" by an inverse transformation $S^{-1}$ of a second secret polynomial S; and a signature generation unit that generates an electronic signature σ containing the element x of the finite ring K" obtained by the second inverse transformation unit.

8. An information processing apparatus, comprising:

a processor, which comprises, a data generation unit that generates an element y of a finite ring $K^m$ containing elements constituted of m numbers by using electronic data M;

a partial element selection unit that selects an element vx of a finite ring $K^v$ containing elements constituted of v numbers;

a first inverse transformation unit that transforms the element y of the finite ring $K^m$ generated by the data generation unit into an element y' of the finite ring $K^m$ by an inverse transformation $T^{-1}$ a first secret polynomial T;

an element computation unit that computes an element $ox\epsilon\{Z\epsilon K^m|f(Z,vx)=y'\}$ of mapping f (f: $K^n \to K^o$, n=o+v) represented by a predetermined multivariable polynomial by using the element y' of the finite ring $K^m$ obtained by the first inverse transformation unit and the element vx selected by the partial element selection unit;

an element selection unit that selects the element ox of the inverse image computed by the element computation unit if the element of the inverse image exists and causes the partial element selection unit to select the different number vx and selects the element ox of the inverse image computed by processing of the first inverse transformation unit and the element computation unit by using the different number vx if the element of the inverse image does not exist;

a second inverse transformation unit that transforms an element x'=(ox,vx) of the finite ring K"(n=o+v) containing the element ox selected by the element selection unit into an element x of the finite ring K" by an inverse transformation $S^{-1}$ of a second secret polynomial S; and a signature generation unit that generates an electronic signature σ containing the element x of the finite ring $K^n$ obtained by the second inverse transformation unit, wherein the m satisfies a n≥m+β condition and the β satisfies a $q^{-β}\ll 1$ condition for a number of elements q of the finite ring K.

9. An information processing apparatus, comprising:
   a processor, which comprises,
   a data generation unit that generates an element y of a finite ring $K^m$ containing elements constituted of m numbers by using electronic data M;
   a partial element selection unit that selects an element vx of a finite ring $K^v$ containing elements constituted of v numbers;
   a first inverse transformation unit that transforms the element y of the finite ring $K^m$ generated by the data generation unit into an element y' of the finite ring $K^m$ by an inverse transformation $T^{-1}$ of a first secret polynomial T; an element computation unit that computes an element ox∈{Z∈$K^o$|f(Z,vx)=y'} of mapping f(f: $K^n$→$K^o$, n=o+v) represented by a predetermined multivariable polynomial by using the element y' of the finite ring $K^m$ obtained by the first inverse transformation unit and the element vx selected by the partial element selection unit;
   an element selection unit that selects the element ox of the inverse image computed by the element computation unit if the element of the inverse image exists and causes the partial element selection unit to select the different number vx and selects the element ox of the inverse image computed by processing of the first inverse transformation unit and the element computation unit by using the different number vx if the element of the inverse image does not exist;
   a second inverse transformation unit that transforms an element x'=(ox,vx) of the finite ring $K^n$(n=o+v) containing the element ox selected by the element selection unit into an element x of the finite ring $K^n$ an inverse transformation $S^{-1}$ of a second secret polynomial S; and
   a signature generation unit that generates an electronic signature σ containing the element x of the finite ring $K^n$ obtained by the second inverse transformation unit, wherein the mapping f is represented for ox=($ox_1$, ..., $ox_o$) and vx=($vx_1$, ..., $vx_v$) as f($ox_1$, ..., $ox_o$, ..., $vx_1$, ..., $vx_v$)=L($vx_1$, ..., $vx_v$)($ox_1$, ..., $ox_o$)$^T$+g($vx_1$, ..., $vx_v$), the L is represented as L($vx_1$,...,$vx_v$)=$L_1$ $L_2$ ($vx_1$,...,$vx_v$) $L_3$ where the $L_1$ and $L_3$ are non-singular matrices, and the $L_2$ is an upper or lower triangular matrix having a function $1_{ij}$($vx_1$, ..., $vx_v$) of $vx_1$, ..., $vx_1$ as an i-th row j-th column element and 1 as a diagonal component.

10. The information processing apparatus according to claim 7, wherein the second secret polynomial S is identity mapping.

11. The information processing apparatus according to claim 8, wherein the second secret polynomial S is identity mapping.

12. The information processing apparatus according to claim 9, wherein the second secret polynomial S is identity mapping.

13. A key generation apparatus, comprising:
   a processor, which comprises,
   a secret key generation unit that generates a secret key used by a computational algorithm having a partial element selection unit that selects an element vx of a finite ring $K^v$ containing elements constituted of v numbers, a number generation unit that generates a number r;
   a data generation unit that generates an element y of a finite ring $K^m$ containing elements constituted of m numbers by using the number r generated by the number generation unit and electronic data M, a first inverse transformation unit that transforms the element y of the finite ring $K^m$ generated by the data generation unit into an element y' of the finite ring $K^m$ by an inverse transformation $T^{-1}$ of a first secret polynomial T, an element computation unit that computes an element ox∈{Z∈$K^o$|f(Z,vx)=y'} of mapping f (f: $K^n$→$K^o$, n=o+v) represented by a predetermined multivariable polynomial by using the element y' of the finite ring $K^m$ obtained by the first inverse transformation unit and the element vx selected by the partial element selection unit, an element selection unit that selects the element ox of the inverse image computed by the element computation unit if the element of the inverse image exists and causes the number generation unit to generate the different number r and selects the element ox of the inverse image computed by processing of the data generation unit, the first inverse transformation unit, and the element computation unit by using the different number r if the element of the inverse image does not exist, a second inverse transformation unit that transforms an element x'=(ox,vx) of the finite ring $K^n$(n=o+v) containing the element ox selected by the element selection unit into an element x of the finite ring $K^n$ by an inverse transformation $S^{-1}$ of a second secret polynomial S, and a signature generation unit that generates an electronic signature σ containing the element x of the finite ring $K^n$ obtained by the second inverse transformation unit and containing information about the first secret polynomial T, the second secret polynomial S, and the predetermined multivariable polynomial; and
   a public key generation unit that generates a public key containing information about composite mapping F constituted of the first secret polynomial T, the mapping f, and the second secret polynomial S.

14. A signature verification apparatus, comprising;
   a processor, which comprises,
   an acquisition unit that acquires information about composite mapping F constituted of a first secret polynomial T, mapping f, and a second secret polynomial S, an electronic signature σ, and electronic data M from a signature generation apparatus having a partial element selection unit that selects an element vx of a finite ring $K^v$ containing elements constituted of v numbers, a number generation unit that generates a number r;
   a first data generation unit that generates an element y of a finite ring $K^m$ containing elements constituted of m numbers by using the number r generated by the number generation unit and the electronic data M, a first inverse transformation unit that transforms the element y of the finite ring $K^m$ generated by the first data generation unit into an element y' of the finite ring $K^m$ by an inverse transformation $T^{-1}$ of the first secret polynomial T, an element computation unit that computes an element ox∈{Z∈$K^o$|f(Z,vx)=y'} of the mapping f(f: $K^n$→$K^o$, n=o+v) represented by a predetermined multivariable polynomial by using the element y' of the finite ring $K^m$ obtained by the first inverse transformation unit and the element vx selected by the partial element selection unit, an element selection unit that selects the element ox of the inverse image computed by the element computation unit if the element of the inverse image exists and causes the number generation unit to generate the different number r and selects the element ox of the inverse image computed by processing of the first data generation unit, the first inverse transformation unit, and the element computation unit by using the different number r if the element of the inverse image does not exist, a second inverse transformation unit that transforms an element x'=(ox,vx) of the finite ring $K''(n=o+v)$ containing the element ox selected by the element selection unit into an element x of the finite ring $K''$ by an inverse transformation $S^{-1}$ of the second secret polynomial S, and a signature generation unit that generates the electronic signature σ containing the element x of the finite ring $K''$ obtained by the second inverse transformation unit and the number r generated by the number generation unit;

a second data generation unit that generates an element y1 of the finite ring $K'''$ by using the number r contained in the electronic signature σ and the electronic data M;

a third data generation unit that generates an element y2 of the finite ring $K'''$ by applying the element x of the finite ring $K''$ contained in the electronic signature σ to the composite mapping F; and a verification unit that verifies whether the element y1 of the finite ring $K'''$ generated by the second data generation unit and the element y2 of the finite ring $K'''$ generated by the third data generation unit match.

15. An computer-complemented method for information processing, comprising:

a first inverse transformation step of transforming an element y of a finite ring $K''$ elements constituted of n numbers into an element y' of the finite ring $K''$ by an inverse transformation $T^{-1}$ of a first secret polynomial T;

an element computation step of considering the element y' of the finite ring $K''$ obtained in the first inverse transformation step as an element Y of an n-order extension A of a finite ring K and computing an element X∈{Z∈A|f(Z)=Y} of an inverse image of mapping f(f: A→A) represented by a predetermined multivariable polynomial by using the element Y;

an element selection step of selecting one element X of the inverse image computed in the element computation step with a probability p proportional to a number of elements α of the inverse image and outputting an exception value with a probability (1-p); and a second inverse transformation step of considering the element X selected in the element selection step as an element x' of the finite ring $K''$ and transforming the element x' of the finite ring $K''$ into an element x of the finite ring $K''$ by an inverse transformation $S^{-1}$ of a second secret polynomial S.

16. A computer-implemented method for information processing, comprising:

a partial element selection step of selecting an element vx of a finite ring $K^v$ containing elements constituted of v numbers;

a first inverse transformation step of transforming an element y of a finite ring $K'''$ containing elements constituted of m elements into an element y' of the finite ring $K'''$ by an inverse transformation $T^{-1}$ of a first secret polynomial T;

an element computation step of considering the element y' of the finite ring $K'''$ obtained in the first inverse transformation step as an element Y of an m-order extension A of a finite ring K and computing an element X∈{Z∈B|f(Z,vx)=Y} of an inverse image of mapping f(f: A*$K^v$→B, B is an o-order extension of the finite ring K) represented by a predetermined multivariable polynomial by using the element Y and the element vx selected in the partial element selection step;

an element selection step of selecting one element X of the inverse image computed in the element computation step with a probability p proportional to a number of elements α of the inverse image and outputting an exception value with a probability (1-p); and a second inverse transformation step of considering the element X selected in the element selection step as an element ox of a finite ring $K^o$ and transforming an element x'=(ox,vx) of the finite ring $K''(n=o+v)$ into an element x of the finite ring $K''$ by an inverse transformation $S^{-1}$ of a second secret polynomial S.

17. A computer-implemented method for signature generation, comprising:

a partial element selection step of selecting an element vx of a finite ring $K^v$ containing elements constituted of v numbers;

a number generation step of generating a number r;

a data generation step of generating an element y of a finite ring $K'''$ containing elements constituted of m numbers by using the number r generated in the number generation step and electronic data M;

a first inverse transformation step of transforming the element y of the finite ring $K'''$ generated in the data generation step into an element y' of the finite ring $K'''$ by an inverse transformation $T^{-1}$ of a first secret polynomial T;

an element computation step of computing an element ox∈{Z∈$K^o$|f(Z,vx)=y'} of mapping f(f; $K''$→$K^o$, n=o+v) represented by a predetermined multivariable polynomial by using the element y' of the finite ring $K'''$ obtained in the first inverse transformation step and the element vx selected in the partial element selection step;

an element selection step of selecting the element ox of the inverse image computed in the element computation step if the element of the inverse image exists and causes the number generation step to generate the different number r and selecting the element ox of the inverse image computed by processing of the data generation step, the first inverse transformation step, and the element computation step by using the different number r if the element of the inverse image does not exist;

a second inverse transformation step of transforming an element x'=(ox,vx) of the finite ring $K''(n=o+v)$ containing the element ox selected in the element selection step into an element x of the finite ring $K''$ by an inverse transformation $S^{-1}$ of a second secret polynomial S; and a signature generation step of generating an electronic signature σ containing the element x of the finite ring $K''$ obtained in the second inverse transformation step.

18. A computer program product including instructions encoded on a computer-readable medium and configured to enable a processor, to perform a method for signature generation, comprising:

a first inverse transformation step of transforming an element y of a finite ring $K''$ containing elements constituted of n numbers into an element y' of the finite ring $K''$ by an inverse transformation $T^{-1}$ of a first secret polynomial T;

an element computation step of considering the element y' of the finite ring $K''$ obtained in the first inverse transformation step as an element Y of an n-order extension A of a finite ring K and computing an element X∈{Z∈A|f(Z)=

Y} of an inverse image of mapping f(f: A→A) represented by a predetermined multivariable polynomial by using the element Y;

an element selection step of selecting one element X of the inverse image computed in the element computation step with a probability p proportional to a number of elements α of the inverse image and outputting an exception value with a probability (1-p); and a second inverse transformation step of considering the element X selected in the element selection step as an element x' of the finite ring $K''$ and transforming the element x' of the finite ring $K''$ into an element x of the finite ring $K''$ by an inverse transformation $S^{-1}$ of a second secret polynomial S.

* * * * *